US010142836B2

United States Patent
Block

(10) Patent No.: US 10,142,836 B2
(45) Date of Patent: Nov. 27, 2018

(54) SECURE MOBILE DEVICE

(71) Applicant: Airport America, Miami, FL (US)

(72) Inventor: David Block, Miami, FL (US)

(73) Assignee: AIRPORT AMERICA, LLC, Miami, FL (US)

( * ) Notice: Subject to any disclaimer, the term of this patent is extended or adjusted under 35 U.S.C. 154(b) by 170 days.

(21) Appl. No.: 15/253,073

(22) Filed: Aug. 31, 2016

(65) Prior Publication Data

US 2017/0064551 A1 Mar. 2, 2017

(51) Int. Cl.
| | |
|---|---|
| *G06F 21/74* | (2013.01) |
| *H04W 12/06* | (2009.01) |
| *H04L 29/06* | (2006.01) |
| *G08B 21/02* | (2006.01) |
| *G06K 9/00* | (2006.01) |
| *H02J 7/35* | (2006.01) |
| *H02J 7/00* | (2006.01) |
| *H05K 9/00* | (2006.01) |
| *H04B 1/3827* | (2015.01) |
| *G06Q 10/02* | (2012.01) |
| *G06Q 20/20* | (2012.01) |
| *H04B 1/38* | (2015.01) |

(52) U.S. Cl.
CPC ............ *H04W 12/06* (2013.01); *G06F 21/74* (2013.01); *G06K 9/00892* (2013.01); *G06Q 10/02* (2013.01); *G06Q 20/206* (2013.01); *G08B 21/0233* (2013.01); *H02J 7/0045* (2013.01); *H02J 7/355* (2013.01); *H04B 1/3838* (2013.01); *H04L 63/0861* (2013.01); *H05K 9/0007* (2013.01); *H04B 2001/3894* (2013.01)

(58) Field of Classification Search
CPC .......... G06F 21/32; G06F 21/70; G06F 21/74; H04L 63/0861; H04W 12/06
See application file for complete search history.

(56) References Cited

U.S. PATENT DOCUMENTS

| | | |
|---|---|---|
| 3,622,995 A | 11/1971 | Dilks |
| 4,375,097 A | 2/1983 | Ulug |
| 4,862,357 A | 8/1989 | Ahlstrom et al. |
| 5,021,953 A | 6/1991 | Webber et al. |
| 5,195,130 A | 3/1993 | Weiss et al. |
| 5,225,990 A | 7/1993 | Bunce et al. |
| 5,237,499 A | 8/1993 | Garback |
| 5,331,546 A | 7/1994 | Weber et al. |
| 5,401,944 A | 3/1995 | Bravman et al. |
| 5,432,508 A | 7/1995 | Jackson |
| 5,521,966 A | 5/1996 | Friedes et al. |
| 5,570,283 A | 10/1996 | Shoolery et al. |
| 5,598,477 A | 1/1997 | Berson |
| 5,623,552 A | 4/1997 | Lane |
| 5,724,520 A | 3/1998 | Goheen |
| 5,732,398 A | 3/1998 | Tagawa |
| 5,764,981 A | 6/1998 | Brice et al. |

(Continued)

OTHER PUBLICATIONS

"Robert Axline of Plastic Card Systems Calls for Improved Secure ID at Airports—Plastic Card Systems Helps Secure Airports From Lax to Boston's Logan", Mar. 23, 2000, PR Newswire, pp. 1.

*Primary Examiner* — David J Pearson
(74) *Attorney, Agent, or Firm* — Oliff PLC

(57) ABSTRACT

The present invention is a communication device with secure data storage having a secure platform with no network connection and a main mobile platform with at least one network connection.

16 Claims, 52 Drawing Sheets

(56) References Cited

U.S. PATENT DOCUMENTS

| | | |
|---|---|---|
| 5,781,892 A | 7/1998 | Hunt |
| 5,793,639 A | 8/1998 | Yamazaki |
| 5,832,453 A | 11/1998 | O'Brien |
| 5,832,454 A | 11/1998 | Jafri et al. |
| 5,832,541 A | 11/1998 | Flake |
| 5,864,818 A | 1/1999 | Feldman |
| 5,866,888 A | 2/1999 | Bravman |
| 5,884,271 A | 3/1999 | Pitroda |
| 5,897,620 A | 4/1999 | Walker et al. |
| 5,906,946 A | 5/1999 | Sausa et al. |
| 5,912,981 A | 6/1999 | Hansmire et al. |
| 5,914,671 A | 6/1999 | Tuttle |
| 5,920,053 A | 7/1999 | DeBrouse |
| 5,926,798 A | 7/1999 | Carter |
| 5,948,040 A | 9/1999 | DeLorme et al. |
| 5,953,705 A | 9/1999 | Oneda |
| 5,953,706 A | 9/1999 | Patel |
| 6,002,605 A | 12/1999 | Iwasaki et al. |
| 6,003,009 A | 12/1999 | Nishimura |
| 6,018,715 A | 1/2000 | Lynch |
| 6,023,679 A | 2/2000 | Acebo et al. |
| 6,038,551 A | 3/2000 | Barlow et al. |
| 6,044,353 A | 3/2000 | Pugliese, III |
| 6,085,976 A | 7/2000 | Sehr |
| 6,089,611 A | 7/2000 | Blank |
| 6,094,640 A | 7/2000 | Goheen |
| 6,101,241 A | 8/2000 | Boyce et al. |
| 6,101,477 A | 8/2000 | Hohle et al. |
| 6,105,010 A | 8/2000 | Musgrave |
| 6,108,636 A | 8/2000 | Yap et al. |
| 6,119,096 A | 9/2000 | Mann et al. |
| 6,119,932 A | 9/2000 | Maloney et al. |
| 6,122,620 A | 9/2000 | Weber |
| 6,122,642 A | 9/2000 | Mehovic |
| 6,144,848 A | 12/2000 | Walsh et al. |
| 6,158,658 A | 12/2000 | Barclay |
| 6,199,077 B1 | 3/2001 | Inala et al. |
| 6,229,621 B1 | 5/2001 | Kulakowski et al. |
| 6,233,683 B1 | 5/2001 | Chan et al. |
| 6,249,767 B1 | 6/2001 | Okayama et al. |
| 6,275,808 B1 | 8/2001 | DeMarcken |
| 6,289,315 B1 | 9/2001 | Calvi |
| 6,292,830 B1 | 9/2001 | Taylor et al. |
| 6,295,521 B1 | 9/2001 | DeMarcken |
| 6,304,850 B1 | 10/2001 | Keller et al. |
| 6,309,098 B1 | 10/2001 | Wong |
| 6,314,402 B1 | 11/2001 | Monaco et al. |
| 6,317,594 B1 | 11/2001 | Gossman et al. |
| 6,324,517 B1 | 11/2001 | Bingham et al. |
| 6,360,205 B1 | 3/2002 | Lyengar et al. |
| 6,698,653 B1 | 3/2004 | Diamond et al. |
| 6,735,632 B1 | 5/2004 | Kiraly et al. |
| 6,748,359 B1 | 6/2004 | Colnot |
| 6,910,628 B1 | 6/2005 | Sehr |
| 6,925,440 B1 | 8/2005 | Shkedi |
| 7,039,951 B1 | 5/2006 | Chaudhari et al. |
| 7,588,180 B1 | 9/2009 | Carmichael et al. |
| 8,395,348 B1 * | 3/2013 | Saatchi ............... H01M 2/1022 320/101 |
| 2001/0016825 A1 | 8/2001 | Pugliese et al. |
| 2001/0037303 A1 | 11/2001 | Mizrahi |
| 2001/0044321 A1 | 11/2001 | Ausems et al. |
| 2001/0056473 A1 | 12/2001 | Arneson et al. |
| 2002/0013718 A1 | 1/2002 | Cornwell |
| 2002/0073646 A1 | 6/2002 | Von Gutfeld et al. |
| 2002/0107947 A1 | 8/2002 | Moragne et al. |
| 2002/0174073 A1 | 11/2002 | Nordman et al. |
| 2002/0178034 A1 | 11/2002 | Gardner et al. |
| 2003/0127511 A1 | 7/2003 | Kelly et al. |
| 2003/0210139 A1 | 11/2003 | Brooks et al. |
| 2004/0186902 A1 | 9/2004 | Stewart |
| 2005/0005172 A1 | 1/2005 | Haala |
| 2005/0033634 A1 | 2/2005 | Pugliese, III |
| 2006/0061453 A1 | 3/2006 | Tuttle |
| 2006/0243799 A1 | 11/2006 | Kelly et al. |
| 2006/0288229 A1 | 12/2006 | Hamid et al. |
| 2007/0254697 A1 * | 11/2007 | Sugio ............... H04M 1/72538 455/556.2 |
| 2008/0209024 A1 | 8/2008 | Shapira et al. |
| 2009/0200661 A1 * | 8/2009 | Ellis .................... A43B 3/0005 257/712 |
| 2012/0064759 A1 * | 3/2012 | Liu ........................ H03M 1/12 439/501 |
| 2013/0091543 A1 * | 4/2013 | Wade ..................... G06F 21/54 726/1 |
| 2013/0137456 A1 * | 5/2013 | Ringli .................. H04W 64/00 455/456.1 |
| 2013/0298208 A1 * | 11/2013 | Ayed ..................... G06F 21/00 726/6 |
| 2015/0269537 A1 * | 9/2015 | Steeves .................. H04L 63/08 705/44 |
| 2016/0188896 A1 * | 6/2016 | Zatko ................ G06F 21/6218 726/30 |

\* cited by examiner

Air Cargo/Air Freight
Aircraft Maintenance
Airlines
Airlineterminals.com
Airport area business
Airport area Lodging
Baggage checkin
Business information
Business Opportunities
Car rentals/limo
City Map
City Trains
Commercial Aviation Centers
Concessions
Connecting
Contractors
Customer Feedback
Departing
Directions
Executive Conference Center
Ezairlinetickets
Ezairportpark.com
Ezcharters.com
Ezflightinfo.com
Ezflightinsurance.com
Facts
Free email address for AA members
Jet Fuel
Lost & Found
Parking
Parking Locator
Parking EzAirportTracking
Parking/ezairportpark
Realtimeflightinfo.com
Search Airport name (see also worldmap Homepage)
Terminal/Layout Maps
USAirportinformation.com Quick Search ———— 60
Our Mission is to give you the BEST AIRPORT FLIGHT    54a
and TRAVEL EXPERIENCE you ever had making it ez,
fast, cheap and friendly by exceeding your expectations!

Getting to: Atlantahartsfield Airport-car-train-cab
City Trains:
City of Atlanta
Useful Links Are you in a hurry? Go
Are you late? Go
Did you miss your flight? Go
Link Justntimeticketing.com Go
(includes tickets printed out from your computer or via l-
cell phone to your credit t card and printout) in
Airportamericakiosk
AirportAmerica VIP Lounge Go Please remember to tune in to Airport America Radio
800 am WQAA for the Latest Parking Information. There
always be 5 spaces for AirportAmerica customers, just
email us at airportamerica@aol.com or visit us online
@ezairportpark.com

| 55 | 56 | 57 | 58 | 59 |
|---|---|---|---|---|
| JustnTime | Arriving | Departure | Connecting | General Info |
| Ticketing | | | | Passenger Info |

Figure 7

Quick Search

[ ]

From Air cargo Subheading     62

Cargo Airlines
Cargo Facts
Cargo Handlers
Intl Courier Services
Crating & Packing
Customs Brokers
Foreign Forwarders
Overland Carriers
Perishables & Animal Complexes
Railroads
Warehousing

Figure 8

Ezairportparking.com   74

| Parking Lot | Current Status | Parking Lot | Current Status |
|---|---|---|---|
| North Daily | OPEN | South Daily | OPEN |
| North Economy | FULL | South Economy | FULL |
| North Hourly | OPEN | South Hourly | OPEN |
| Park-N-Ride-A | FULL | Park-N-Ride-B | OPEN |
| Park-N-Ride-C | OPEN | | |

*Updated last on May 30, 2000 at 10:15 A.M.
E-mail us 30 minutes prior departure for your immediate slot and pin number at ezairportparking.com Departing Passengers Flight Information  75        Terminal Information  76        Parking  77

Flight Search                 Terminals                      Terminals
See worldmap at Home          Airlines at City               Airlines at City
Page Worldairportinfo.com     Ticketing and Baggage          Ticketing and Baggage
                              Check-in                       Check-in
                              Concessions                    Concessions
                              Terminal Layout                Terminal Layout

Figure 10

From General Information/Passenger Information     90

| Passenger Information | 92 |

AirportAmerica Kiosk Locations
Customer Service
Concessions
US Customs
Air Cargo
Airport Tours
Security
Lost and Found
US Post Office
Banks and ATMs
VIP Lounges Medical Care
Interfaith Chapel
Currency Exchange
Airportsearch.com (details on all world major airports)

| Ground Transportation | 93 |

Ground Transportation
Getting to: Name of City
City Trains
Taxicabs
Limousine/Sedans
Metro and Non Metro Share
Ride Shuttles
Car Rentals/Valet Parking

| Other Interest | 94 |

Facts
Tell us how are we doing?

Figure 12

Justntime Ticketing    100

Quick Search

60

AirportAmerica Discounts    102

On Line Discount Insurance
Cheapezairlinetickets.com
Buyeasyairlinetickets.com
Bid4pennies.com
Rent4cents.com
Great Vacation-us
Luggage Locker
Computers
Low cost calls
Flytheretoday.com
Ezairportparking.com
Shopezfly.com
Shopnflyairports.com

Figure 13

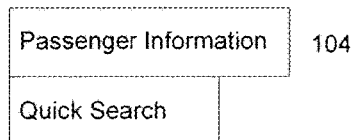

Passenger Information  104

Quick Search

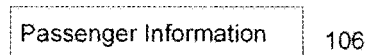

Passenger Information  106

Flight Information
Customer Service
Concessions
Consulates
Chambers of Commerce
Airport Area Hotels/Inns
US Customs
Air Cargo
Airport Tours
Lost & Found
Security
US Post Office
Banks & ATMs
AirportAmericabanc.com
AirportAmericabank.com
Airportbanc.com
Airportbankamerica.com
VIP Lounges
Medical Care
Interfaith Chapel
Currency Exchange
Shopezfly.com
Shopnflyairports.com

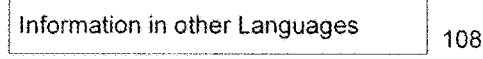

Information in other Languages  108

Spanish
French
Portuguese
Italian
Japanese

Figure 14

Concourse: [____] 112

Type: [____] 114

Submit  115

( ) Concessions

Figure 15

Flight Information: Time and date    130

| From Arriving | 132 | From Departing | 134 |

| From Connecting | 136 |

Figure 17

SECURITY LEVELS
MEMBER GRADATION LEVELS

| 1 |

| 1 | 2 |

| 1 | 2 | 3 |

| 1 | 2 | 3 | 4 |

| 1 | 2 | 3 | 4 | 5 |

| 1 | 2 | 3 | 4 | 5 | 6 |

(Min. Security level least amount of info supplied by member)

(Max. Security level complete amount of info supplied by member)

Figure 25

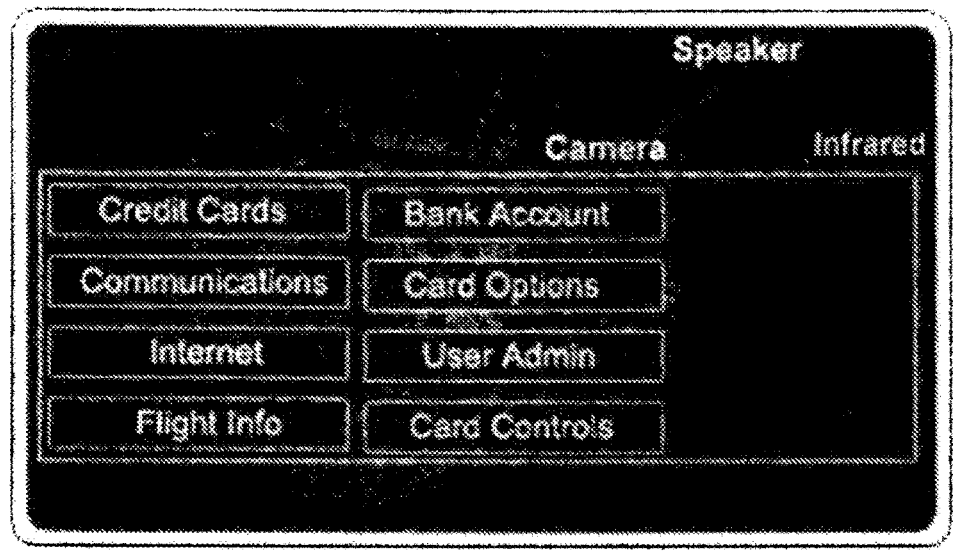
210
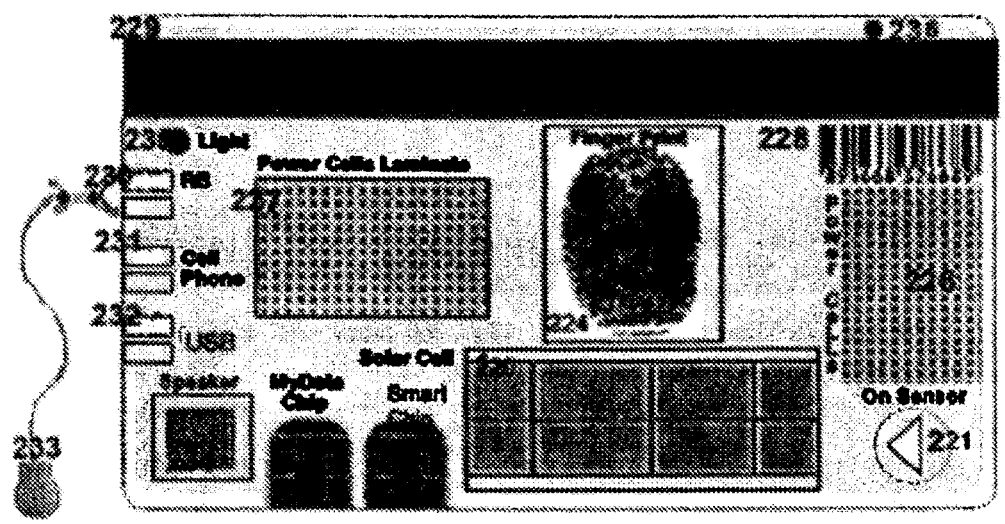
210
Figure 26

AA OneTouch
247
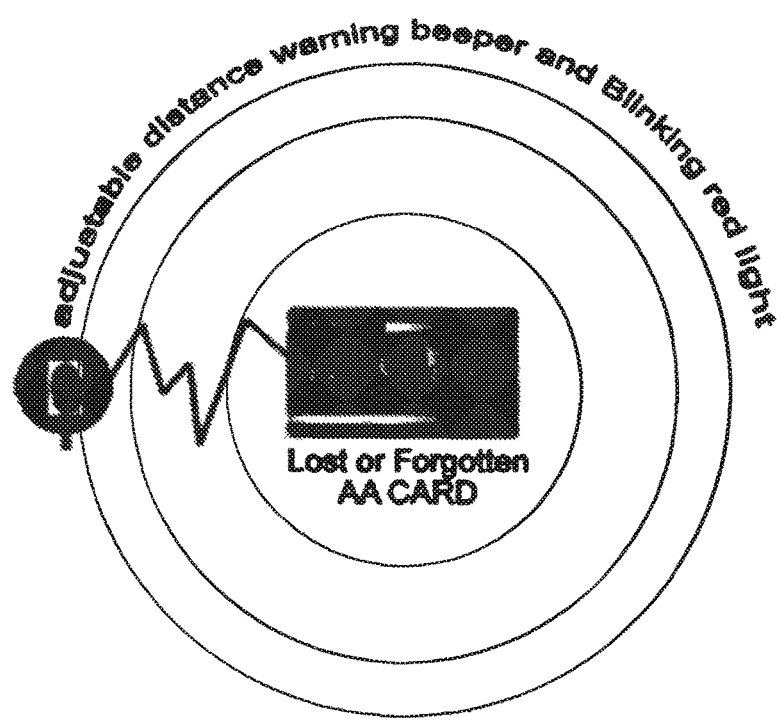
210
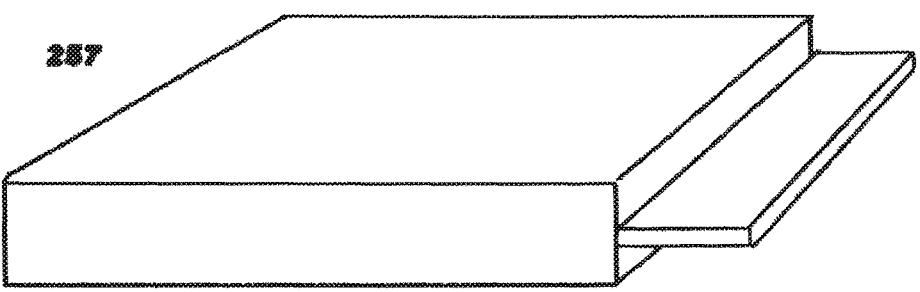
Figure 28

255
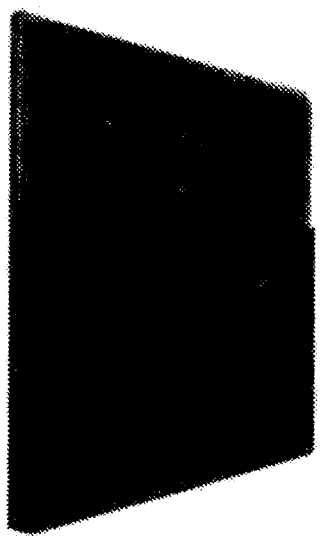
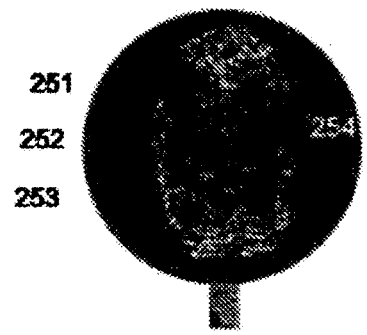
251
252
253
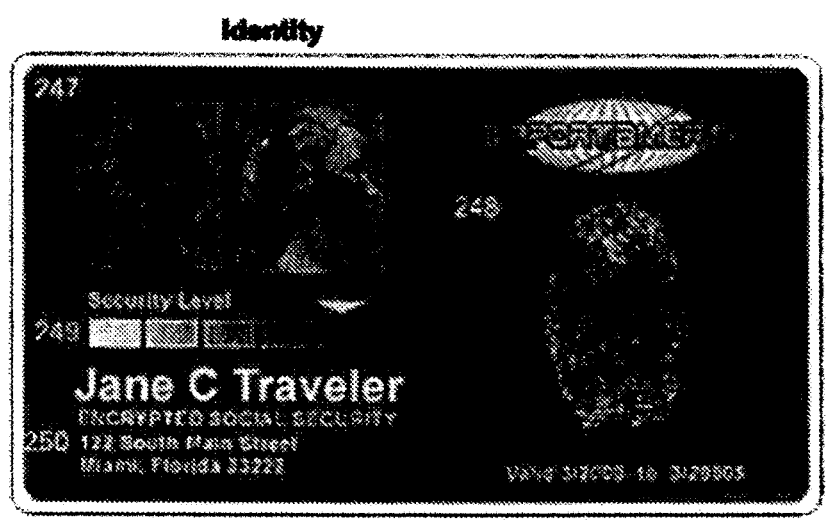
Figure 29

ExternalTransceiver Device

Ringer Beeper

SECURE MOBILE DEVICE

RELATED APPLICATIONS

This application is a continuation-in-part of and claims priority from U.S. patent application Ser. No. 12/572,778 filed Oct. 2, 2009, which is a divisional application of and claims priority to U.S. patent application Ser. No. 10/210,182, now U.S. Pat. No. 7,599,847, filed Aug. 2, 2002, which is continuation-in-part of and claims priority to U.S. patent application Ser. No. 09/875,454, filed Jun. 6, 2001, which claims priority to U.S. Provisional Patent Application No. 60/210,498, filed Jun. 9, 2000, all of which are incorporated herein by reference.

FIELD OF THE INVENTION

The present invention relates generally to information management and security systems. The present invention is particularly useful in the fields of travel management systems, improved methods of communication, and device management and consolidation. Specific embodiments of the present invention more particularly relate to security systems and protection of data on a mobile device.

BACKGROUND OF THE INVENTION

Over the past ten years both business and personal travel have been increasing at a dramatic rate. In order to accommodate and facilitate the increased travel being made by both business and personal travelers, whether by air, train, ship, bus, limousine, personal automobile, or other modes of transportation, much time, effort, and resources have been spent on an ongoing basis by the travel industry. The travel industry includes airlines, charter services, railroads, hotels, rental car companies, cruise lines, limousine companies, credit card and debit card companies, restaurants, tour operators, travel agents, government entities, airports, ports, train stations, helicopter operators, and so forth. It is important to the travel industry as a whole, and particularly to the airline industry, to provide user friendly, secured, and rapid response reservation and travel planning systems. Such efforts have led the industry to make extensive use of the Internet, for permitting travelers to make numerous travel arrangements and plans through use of their personal computer linked to the Internet to access a desired travel related website. However, it is recognized that the travel industry has much room for improvement in providing travelers easier, less expensive, more user friendly and faster methods and systems for both planning travel needs and making appropriate reservations for such travel. Travelers want to feel secure but do not want to sacrifice precious time more than absolutely required. Travelers also want a balance between preserving individual privacy and receiving measures of security.

SUMMARY OF THE INVENTION

An object of the present invention is to provide an improved method and system for enabling travelers to rapidly and interactively communicate via the Internet or other networks with desired websites or other devices for making all necessary travel arrangements for a desired trip.

It is another object of the invention to provide travelers with a means for making last minute ticketing and travel reservations with travel carriers, simultaneous with planning their itineraries.

Yet another object of the invention is to provide travelers and other interested parties with a means for receiving alerts, messages and travel advisories at any given time, no matter where the traveler or user of the inventive system might be located.

It is another object of the invention to provide travelers with expedited clearance to facilitate processing through transportation facilities, such as airport security checkpoints.

It is still another object of the invention to provide travelers with an interactive device permitting access to enhanced travel features, the travelers' preferences and identification verification information in conjunction with other convenient uses such as credit card and/or debit card functionality and communication functionality.

It is another object of this invention to honor the personal preferences of the traveler by enabling any entry of personal data to be a voluntary decision and to assure the traveler that private data will remain encrypted and secured from all other persons, even persons associated with the system.

With these and many other objects in mind, the present invention provides a method and system that permits travelers to register as members for receiving access to the main website of the system and that interactively provides the member with access to numerous other websites for facilitating whatever travel arrangements the member wishes to make. The member is provided with means to log onto the system website through use of the member's personal computer, mobile telephone, hand-held palm computer, web tv, Internet cell phone, iCell (for example the OneTouch disclosed below), cell phone, or other specially designed, integrated device for communicating through the system to secure travel reservations with air, land, and sea carriers, and to secure reservations for lodging, restaurants, entertainment, and other desired services. The system includes voice recognition means for permitting a user to communicate via voice commands, even while the user or member may already be pursuing travel on a last minute basis, while using the system to complete all further and necessary travel arrangements. The system further provides means for permitting a member to select specific travel carriers or service providers, and also provides means for analyzing the general travel requirement of the user, such as a desired airport, departure date and time, arrival city, length of stay, and so forth. The system will provide a user with reservations for a carrier or travel provider best able to meet the member's travel needs, such as hotel reservations, limousine services, and so forth. These services are all based upon a member's previously provided travel preferences and personal needs, all of which are stored in the system in the member's profile or portfolio. The system allows the member to use interactive voice response (IVR) systems to call in and book a reservation by voice or keypad. Dialing in or connecting from a compatible, identifiable, communication device allows the system to identify the member instantly, expediting the arrangements for travel including making the ticket buying process faster. Member preferences and payment settings are already pre-stored to expedite processing.

The system includes an Intranet or like system for better communication within the airport. The system also provides an Internet for communication between airports within and participating in the system. Both the system's Intranet and the Internet provide standard templates used for intranet and internet sites for use by airport employees and other travel provider employees to notify the system about situations that affect travelers. Anything that would delay or change a traveler's plans is recorded by an authorized user that has been granted security access to do so. These events trigger actions specified by the traveler to notify them and interested parties (including but not limited to those expecting to meet the traveler). The system intranet may access more detailed gate information as posted by the various airlines and as maintained typically on flight boards that are visible throughout the airport. By accessing the Flight Board information or other travel provider information by using their OneTouch either within or outside of the travel facility, members will have a chance to see, for example, the flight status, the departure gate, the status of boarding, if a gate is changed, or if the flight is cancelled. The same principle applies to non-airport related modes of travel, such as trains, buses, ships, and so forth.

Besides fulfilling personal preferences, the system directly recognizes members with special needs such as those requiring wheelchairs for travel or those who have special dietary needs or medical conditions. Any data that will help fulfill a member's travel requirements are available for storage in the member's portfolio.

Data available for storage are voluntarily provided by the member and not accessible to any unauthorized person without the express knowledge and approval of the member.

BRIEF DESCRIPTION OF THE DRAWINGS

Various embodiments of the invention are described in detail below, with reference to the drawings, in which like items are identified by the same reference designation wherein:

FIG. 7 shows a pull-down menu of the invention for a particular airport for accessing desired information;

FIG. 8 shows a pull-down menu of the invention obtained through selection of the sub-menu of FIG. 7;

FIG. 10 shows a pull-down menu of the invention for obtaining departing passenger information (such as departure gate and real time status, such as "Boarding," "Delayed," or "Gate Change") and other information;

FIG. 12 shows a pull-down menu of the invention for obtaining "General Information/Passenger Information;"

FIG. 13 shows a pull-down menu of the invention for obtaining "Justntime ticketing;"

FIG. 14 shows a pull-down menu of the invention for obtaining certain "Passenger Information;"

FIG. 15 shows another pull-down menu of the invention for obtaining information regarding the concourse of an airport, and the type of airport;

FIG. 17 shows a pull-down menu of the invention for obtaining additional flight information specific to the time and date of flights at a particular airport;

FIG. 25 shows a diagram of gradation levels for AA members indicating various levels of security levels that the AA member agrees to provide;

FIG. 26 shows a diagram of the various components of an OneTouch and a view of the front and back of the OneTouch;

FIG. 28 shows a device that may be attached to clothing or anywhere else that beeps/rings if the OneTouch has been lost or misplaced;

FIG. 29 shows another view of the OneTouch, approximately the size of seven credit cards combined with a view of images of the member as well as the member's fingerprint.

DETAILED DESCRIPTION OF THE INVENTION

Figure 1:
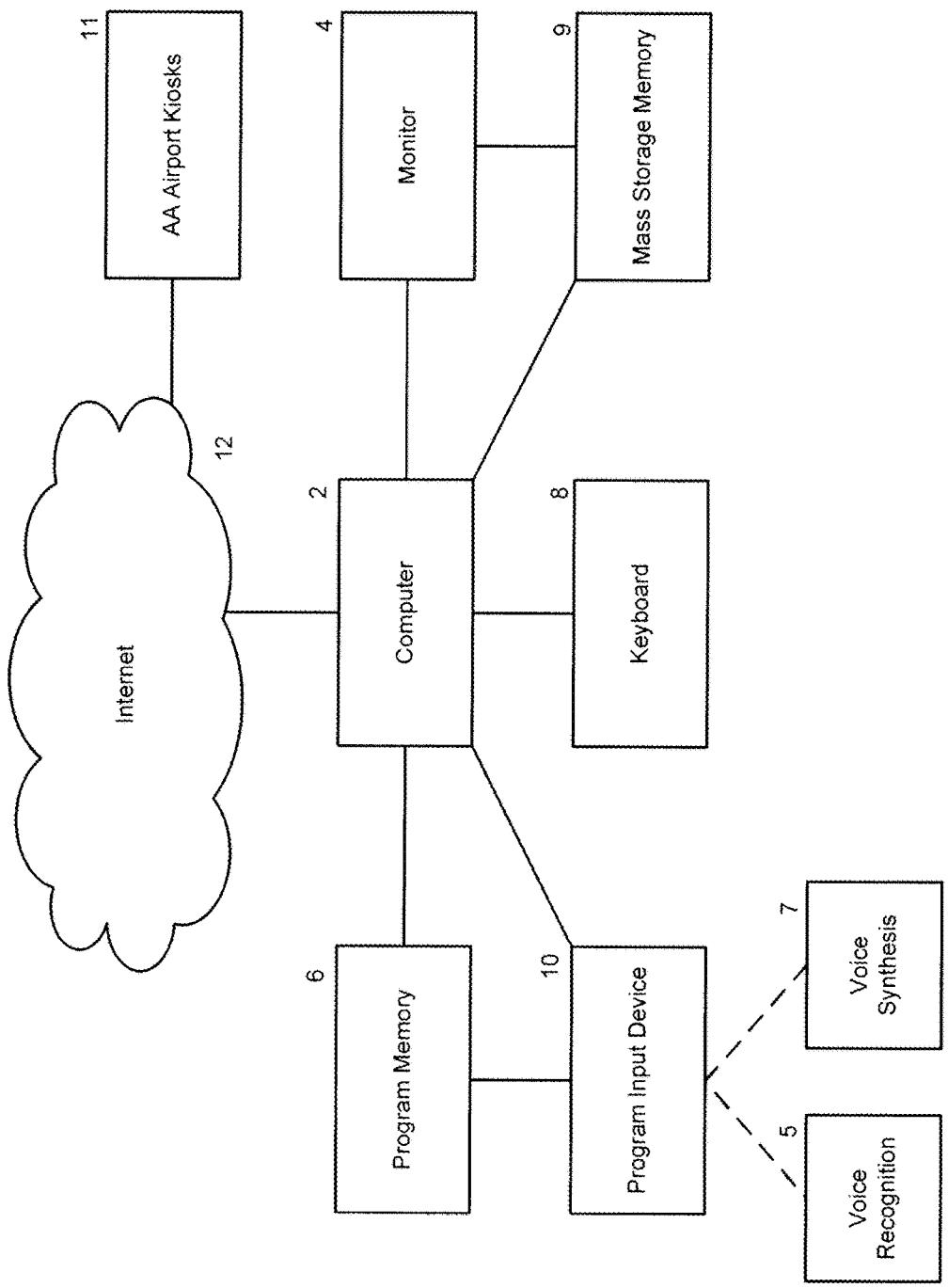
FIG. 1 shows a simplified block schematic diagram of a computer system connected to the Internet for providing the home website for the present invention that provides a Portal for members to obtain desired travel services.

As shown in FIG. 1, a computer 2 connected to a monitor 4, program memory 6, and input device 10, are necessary for providing the website of the present system. The computer 2 is connected to the Internet 12 for permitting members or system users access to the main website of the system. For purposes of illustration, the present invention is described below mainly in association with air travel, and trip planning and reservations associated with such travel, including pre-flight and post flight travel. However, the invention is not meant to be so limited, and is equally applicable in association with multiple other forms of travel beside air travel, including railroad travel, ship travel, helicopter travel, and so forth. With further reference to FIG. 1, note that the program memory 6 is loaded with programs via the program input device 10 for providing the operating system of the present invention, and necessary programming for carrying out the methodology of the invention. Programs for voice recognition 5, and voice synthesis 7 are used in one embodiment.

Figure 2:
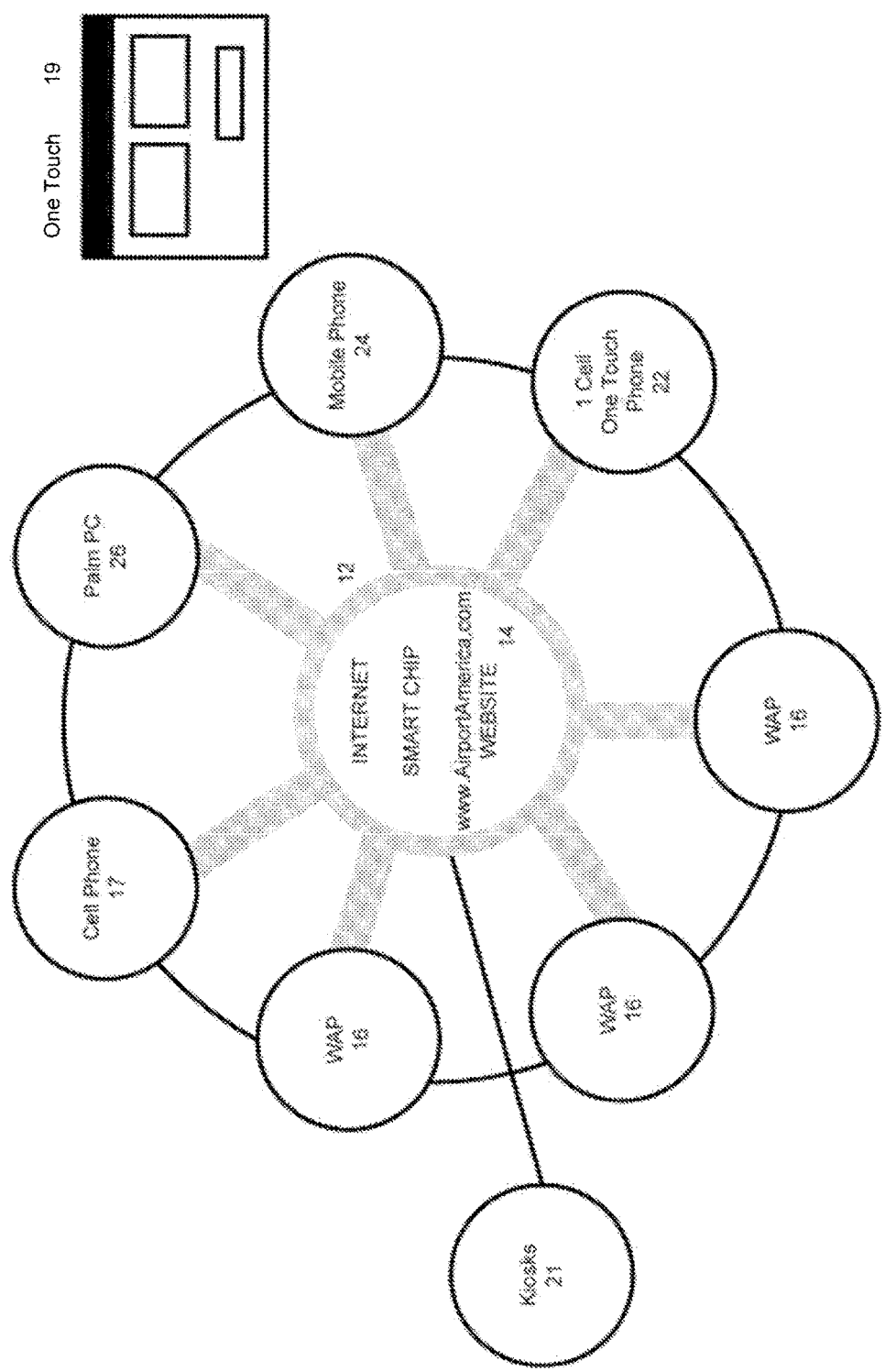
FIG. 2 is a simplified block schematic diagram showing how members can communicate through the Internet with the system website of the present invention.

Access to the website of the system is via the Internet 12, as previously indicated. As shown in FIG. 2, members or users of the present inventive system can gain access to the system website 14 via a number of available devices. As shown in FIG. 2, these devices include but are not limited to a Wireless Application Protocol (WAP) 16, a cell phone 17, a WebTV 18, a personal computer 20, an iCell, phone 22, a OneTouch 19, a kiosk 21, a mobile telephone 24, or a palm computer 26. As will be described in greater detail below, users of the system must join or become members. Each member has a profile stored within the system in association with the member's identification verification information, which may include a PIN number, biometrics and so forth. At the present time the inventor has named the present system "AirportAmerica" (A Trademark of AirportAmerica.com). In portions of the following description, AirportAmerica is referred to under the acronym "AA" (A Trademark owned by AirportAmerica.com). Throughout this document, the features of the invented system may be referred to as either AirportAmerica or AA or AirportAmerica.com or aa.

In order for a user to have access to the present system, the user must first enroll on the system. In doing so, the user must provide a profile including name, address, telephone number, credit card information, desired class of air travel (e.g., coach, business, first), airline carrier preference, seating preference, self park or valet parking, rental car preferences, and so forth. The users profile is stored in the system, and the user is provided a PIN number, to permit the new member user to gain access to the system.

Once access is obtained, the user is presented a home page, where the user or member can then select a number of pull-down menus for making reservations and other travel arrangements. As previously indicated, the member can make various selections through direct inputs from a personal computer 20, OneTouch 19, or WebTV 18, whereby typed data or cursor selected responses are provided to the system 14. Otherwise, voice commands can be used via a iCell phone, OneTouch 22, or the mobile telephone 24, or cell phone 17, for example.

Figure 3:
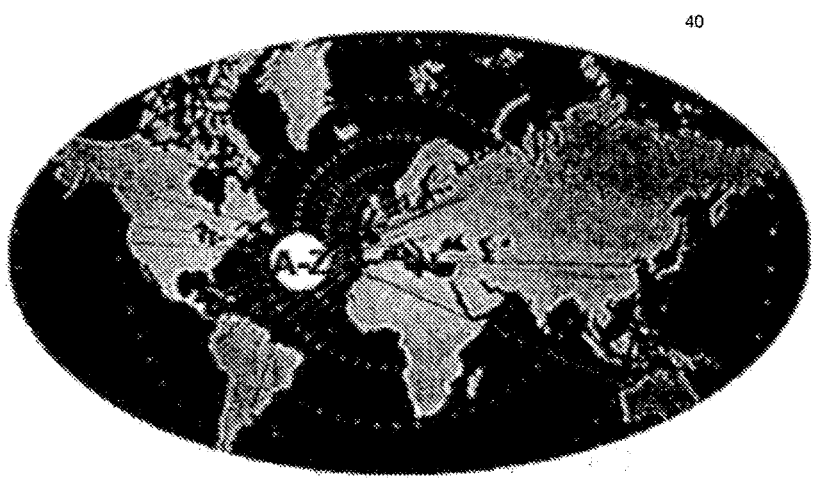
FIG. 3 shows a pull down menu for an embodiment of the invention for selectively obtaining flight information, or traveler information, or park/drive information, or weather information, or shopping information, and also for addressing a Portal for selecting a particular airport or other travel facility.

A pull-down menu 26 can be obtained, as shown in FIG. 3. Through use of this menu, a user or member can select flight information, traveler information, parking and related driving information, weather information, and shopping information, relative to a particular flight. With regard to the flight itself, first the member must select a particular airport for departure, and another airport for arrival. In one embodiment of the invention, the member moves a cursor into the world map region 40, and selects the central Portal 42 of FIG. 4, to obtain the pull-down menu 44 of FIG. 4. By placing the cursor on any one of the identified airports shown in FIG. 4 by both airport name, and code, the member then obtains access to that particular airport in a very particular manner. Once the airport is selected, the member can return to the pull-down menu of FIG. 3 for selecting specific information relative to that airport, as provided on the left hand side of the pull-down menu 26. Such specific information may include such information as gradation level as discussed below.

Figure 5:
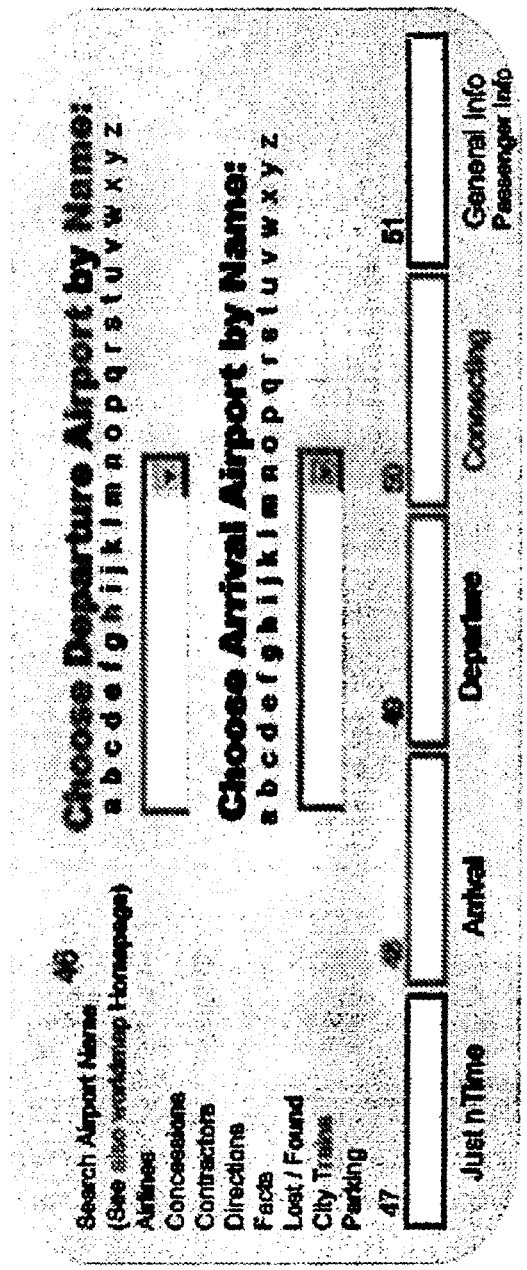
FIG. 5 shows a pull-down menu of the invention for choosing a departure and an arrival airport by name, and specific information regarding the selected airport.

The member can also select a pull-down menu 46, as shown in FIG. 5, for selecting a departure airport by name, and an arrival airport by name. Once the airports are selected, the member can click onto any one of the word icons shown, such as 47 through 51, for example, or on any one of the icons shown at the left of menu 46. In another embodiment, the user may interact with the system via voice or interactive video.

Figure 6:
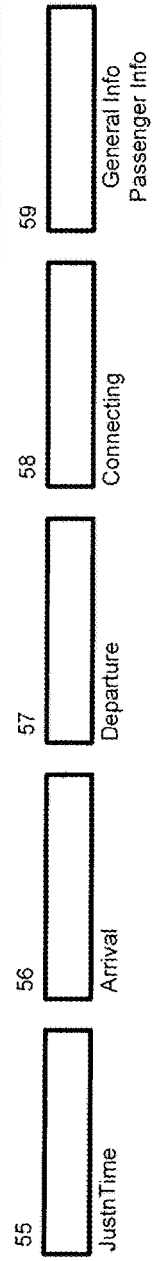
FIG. 6 shows a pull-down menu of the invention relative to selection of a particular airport.

The member can also select the pull-down menu 54 of FIG. 6, for obtaining specific information relative to a particular airport, and for answering certain questions as indicated, for permitting direct access to other pull-down menus to permit the member to pursue various options associated therewith. In the pull-down menu 54, an airport name has been inserted into "Getting To:", and the city associated with the airport, in this example, Atlanta, Ga. Any of the word icons, as shown can be addressed for providing or obtaining certain information, as indicated. For example, anyone of the word icons 55 through 59, can be individually addressed for obtaining the indicated function, or information. The member can also address the icon Quick Search 60, shown in the upper left in the pull-down menu 54. If the member does address Quick Search 60, the pull-down menu 54 will be modified as shown in FIG. 7, to present word icons for selection by the member via the "Quick Search 60" function.

With further reference to the modified pull-down menu 54 of FIG. 7, assume for example that the member selects the icon "Aircargo/Air Freight". If so, the pull-down menu 62 of FIG. 8 will be obtained. The member can then address any one of the icons indicated at the left, for obtaining detailed information associated therewith, such as "Warehousing."

Figure 9:
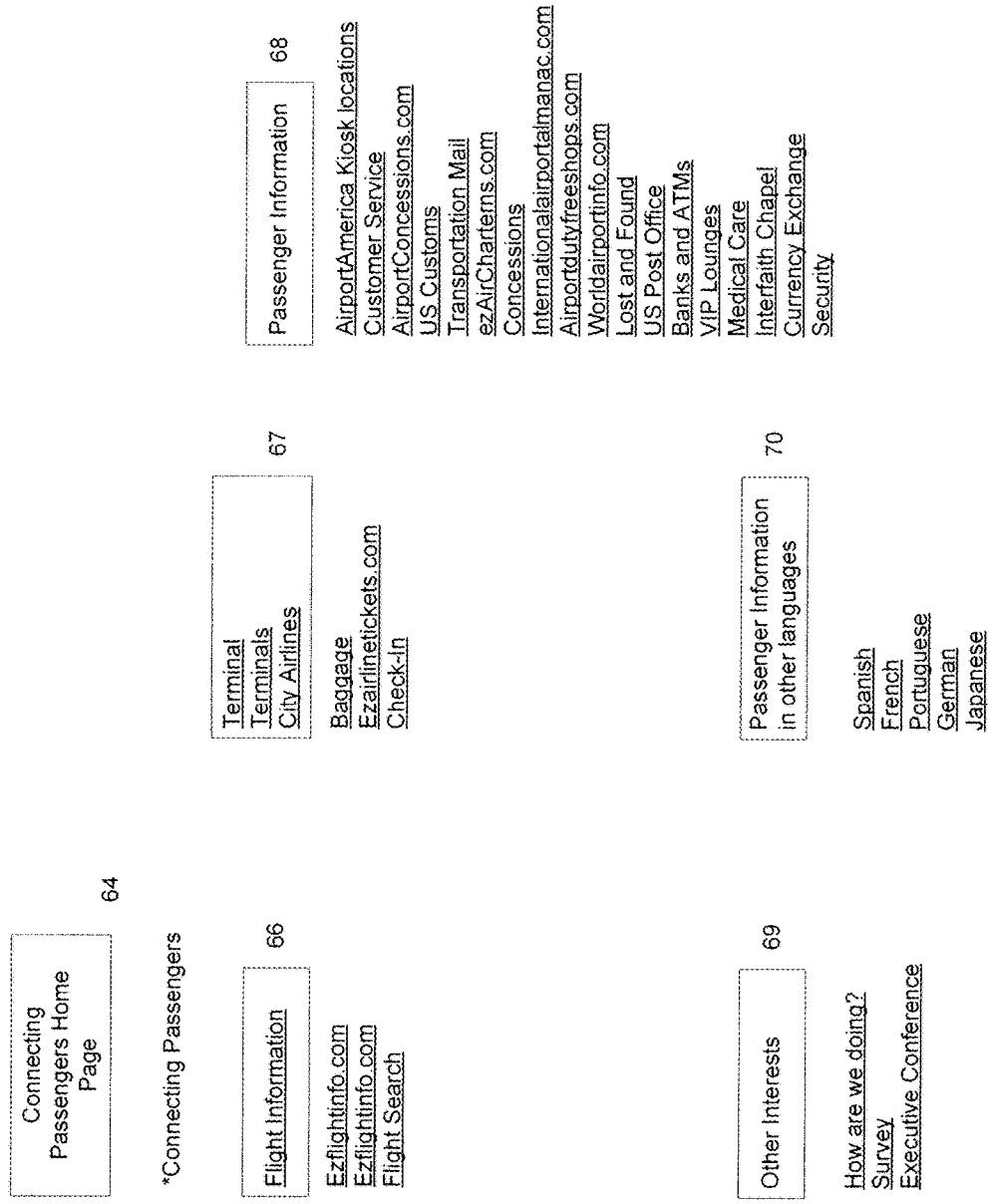
FIG. 9 shows a pull-down menu of the invention for obtaining connecting passenger information.

A member can also select the pull-down menu 64, as shown in FIG. 9, for obtaining information about "Connecting Passengers" by individually addressing any one of the icons under the headings Flight Information 66, Terminal Information 67, Passenger Information 68, or "Other interests" 69, the member can obtain indicated information relative to Connecting Passengers. Also, by selecting anyone of the icons under "passenger information in other languages," the member can select a desired language other than English 70.

The member can select the pull-down menu of 72 of FIG. 10, for obtaining information relative to "Departing Passengers." Note that for the particular airport, icons are provided for obtaining Parking Information 74, Flight Information 75, Terminal Information 76, and other detailed "parking" 77 information.

Figure 11:
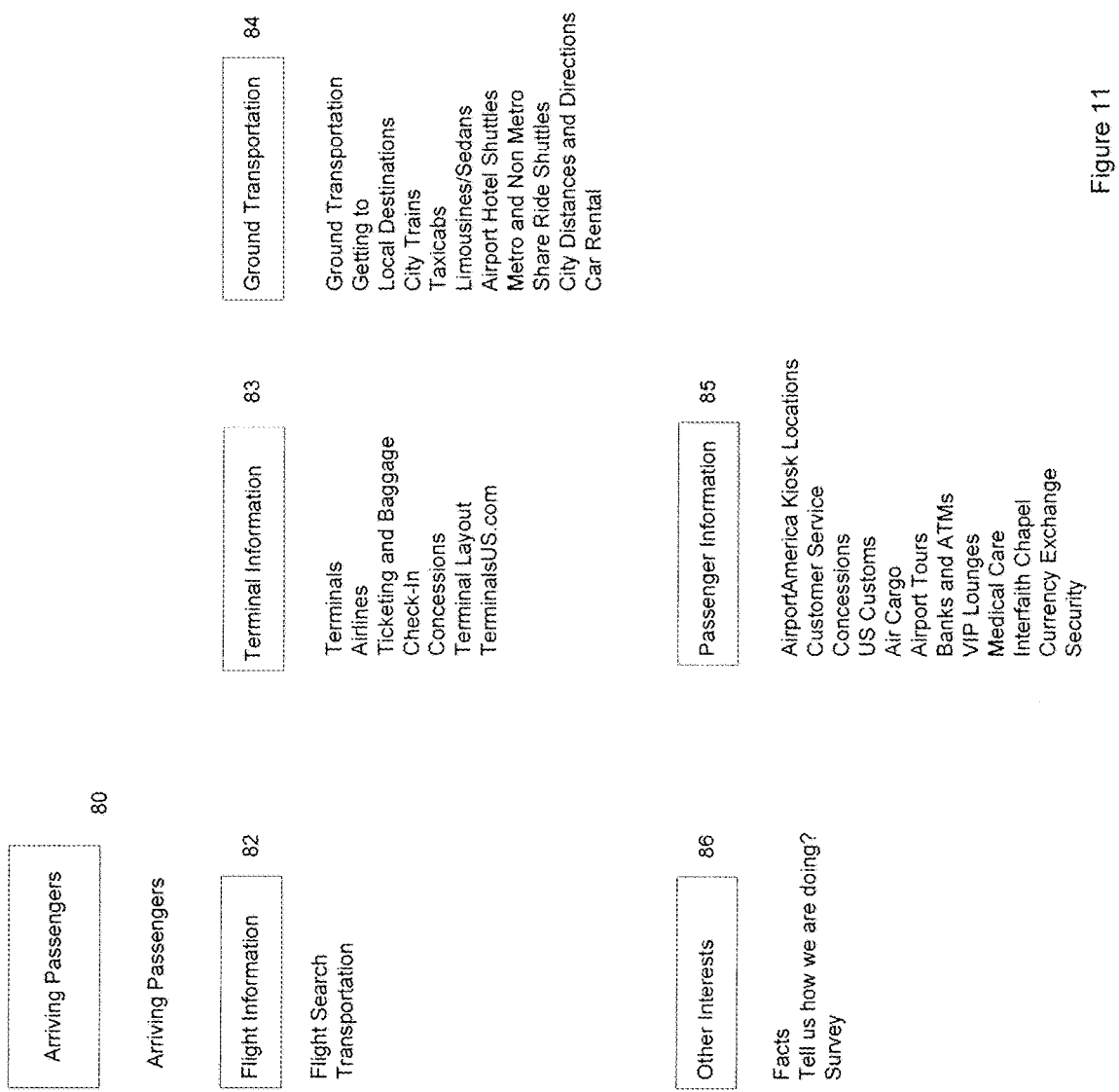
FIG. 11 shows a pull-down menu for obtaining arriving passengers information, for an embodiment of the invention.

The pull-down menu 80, for obtaining information relative to "Arriving Passengers", as shown in FIG. 11, can be selected. Various of the icons shown can be addressed for obtaining Flight Information 82, Terminal Information 83, Ground Transportation Information 84, and Passenger Information 85. Also, by addressing the icons under Other Interests 86, other facts can be obtained, and also the member is provided an opportunity for letting AirportAmerica know how they are doing in providing the related service.

The pull-down menu 90, shown in FIG. 12, can be obtained for gaining Passenger Information 92, Ground Transportation 93, and Other Interests 94, by addressing the respective icons associated therewith, as shown.

If in the pull-down menu 46 of FIG. 5, or the pull-down menu 54 of FIGS. 6 and 7, the member selected "Justntime ticketing 47" relative to flowchart 46, or the same function indicated as 55 in the flowchart 54 of FIGS. 6 and 7, the pull-down menu 100 of FIG. 13 will be obtained. As shown, a Quick Search 60 can be addressed, and the individual icons under "AirportAmerica discounts 102" can be addressed for obtaining associated information as indicated by each icon.

The pull-down menu 104, shown in FIG. 14, can be obtained for obtaining specific "passenger information" 106, as shown by the individual and selectable icons thereunder. Also, as shown under "Information in other languages" 108, a member can select other than English.

The pull-down menu 110 of FIG. 15 can be obtained for a specific airport, for obtaining information regarding a Concourse 112 of the airport, in a particular "Type" 114 concession associated therewith by inputting the appropriate information, and submitting it, the system will provide the location of the particular concession in that concourse. As shown, after inputting the information desired, the member must address the icon 115 for submitting the same.

Figure 16:
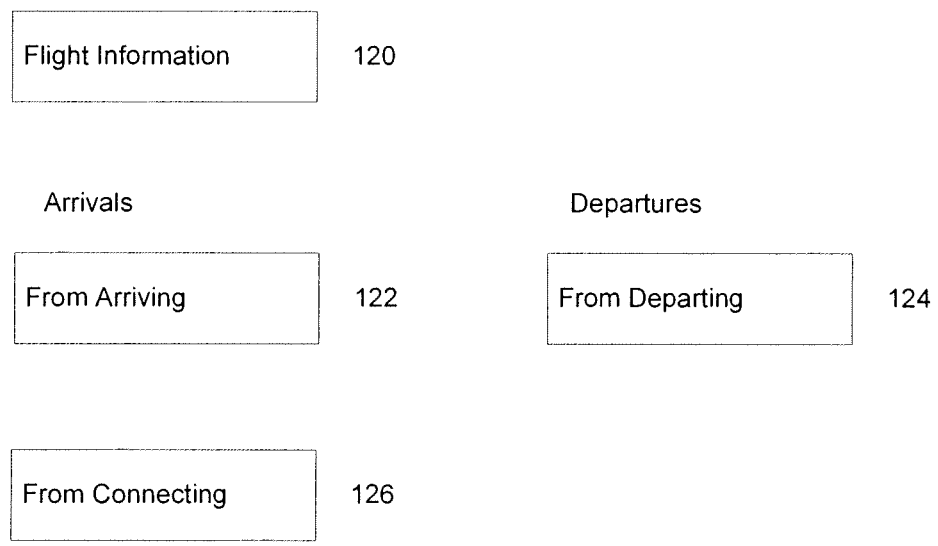
FIG. 16 shows a pull-down menu of the invention for obtaining arrival and departure flight information for a particular airport.
Figure 18:
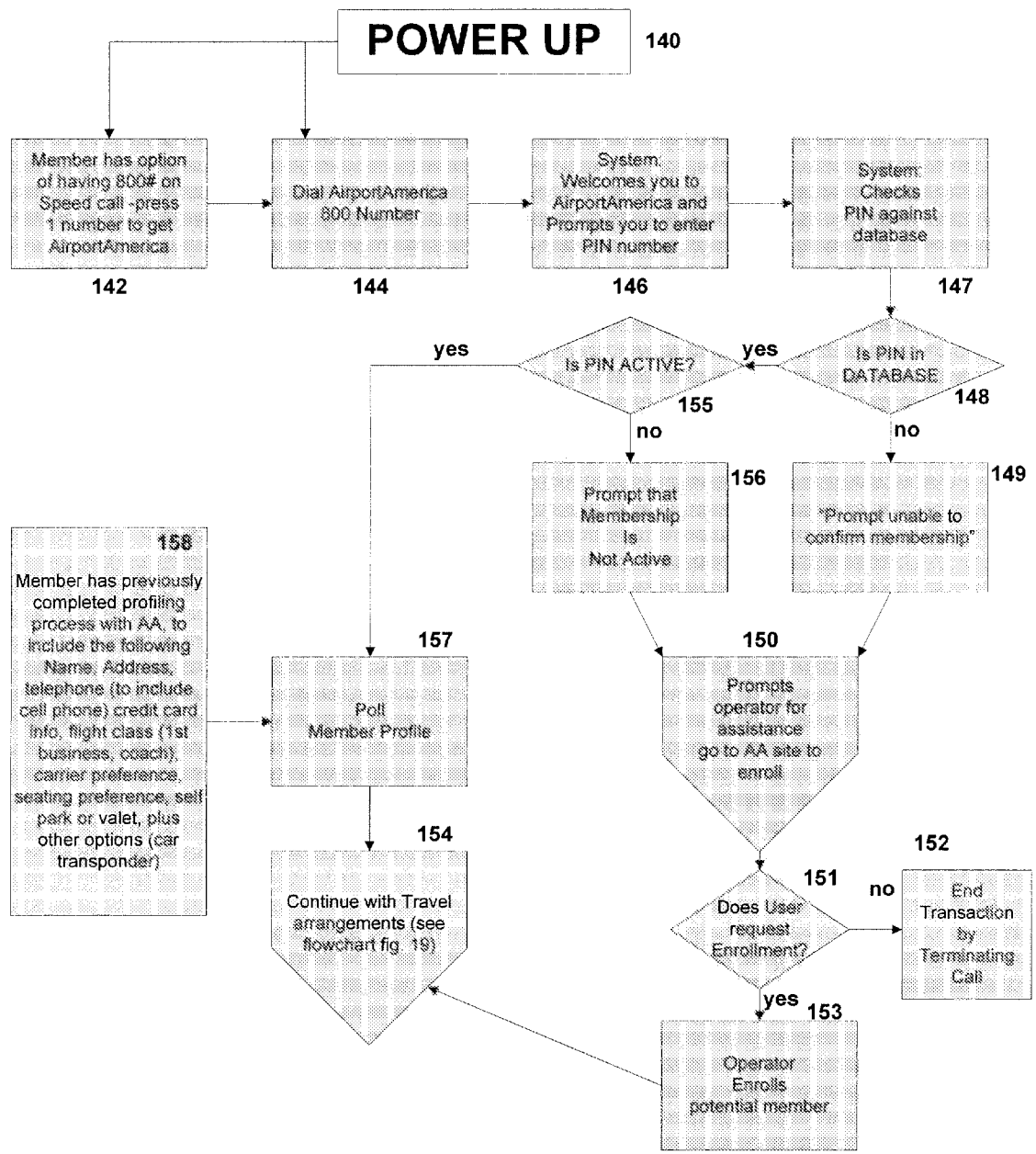
FIGS. 18 through 20 show flowcharts detailing the various steps for a method of the invention for permitting a member or user to make travel reservations and arrangements or plans.

The pull-down menu 120 for showing "Flight Information" can be obtained as shown in FIG. 16. The icons "From Arriving" 122, "From Departing" 124, or "From Connecting" 126 can be individually addressed for obtaining information associated with the indicated functions.

The pull-down menu 130, as shown in FIG. 17, can be selected for obtaining flight information associated with a particular time and date to be inputted into the flowchart 130 by the member. Once the time and date are provided, the member can then select individually the icons "From Arriving" 132, "From Departing" 134 and "From Connecting" 136.

An example of various steps involved in a member using the present system, and the steps required of the System, is illustrated in the flowcharts of FIGS. 18 through 21. With reference to the flowchart of FIG. 18, the first step 140 is for the member to turn on or "power-up" his/her device for entering the Internet 12 to obtain access to the system website 14. Next, the member either uses speed dialing via step 142, or direct dialing via step 144 for dialing up AirportAmerica's 800 number. In step 146, the system welcomes the member, and prompts the member to then enter the PIN number, biometric information, or other identifying data. Thereafter, steps 147 through 152 are performed, and the transaction is ended by terminating the call (step 152), if in the sequence of prior steps, a PIN number, or membership cannot be confirmed, as indicated. If in the sequence of steps 147 through 151, a user requests enrollment via step 153, enrollment is completed, and step 154 is processed for entering into the steps of the flowchart of FIG. 19. Alternatively, if in step 148 a valid membership is confirmed by the database, step 155 is entered for determining whether the membership is active. If the answer is no, step 156 is entered for prompting the user that their membership is not presently active, followed by steps 150, and 151 for determining whether the user requests enrollment, as previously indicated. As before, if enrollment is not requested, step 152 is entered for ending the transaction, or if enrollment is requested, steps 153 and 154 are pursued. Lastly, if in decision step 155, the membership is determined to be active, step 157 is entered for obtaining from memory 9 the information shown in block 158 for the identified member. Processing then proceeds to step 154 for transferring to the steps shown in the flowchart of FIG. 19.

Figure 19:
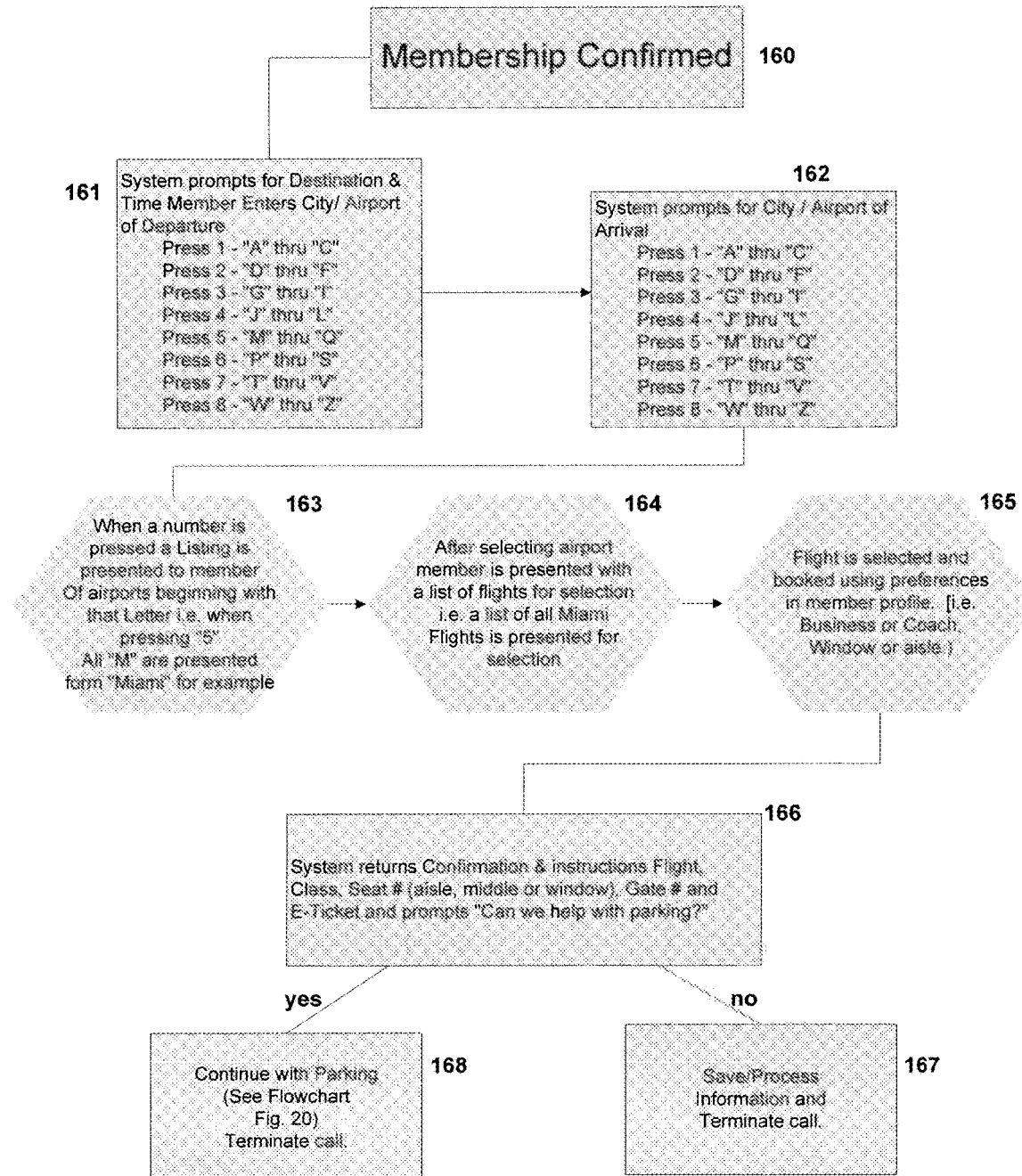

With further reference to the flowchart of FIG. 19, with membership confirmed via step 160 by transfer from step 154, steps 161 through 166 are carried out as indicated. As shown in step 166, if the member does not request help with parking, step 167 is entered for saving the processed information, and terminating the call. However, if the member does request help with parking, step 168 is entered for transferring to the steps of the flowchart of FIG. 20.

Figure 20:
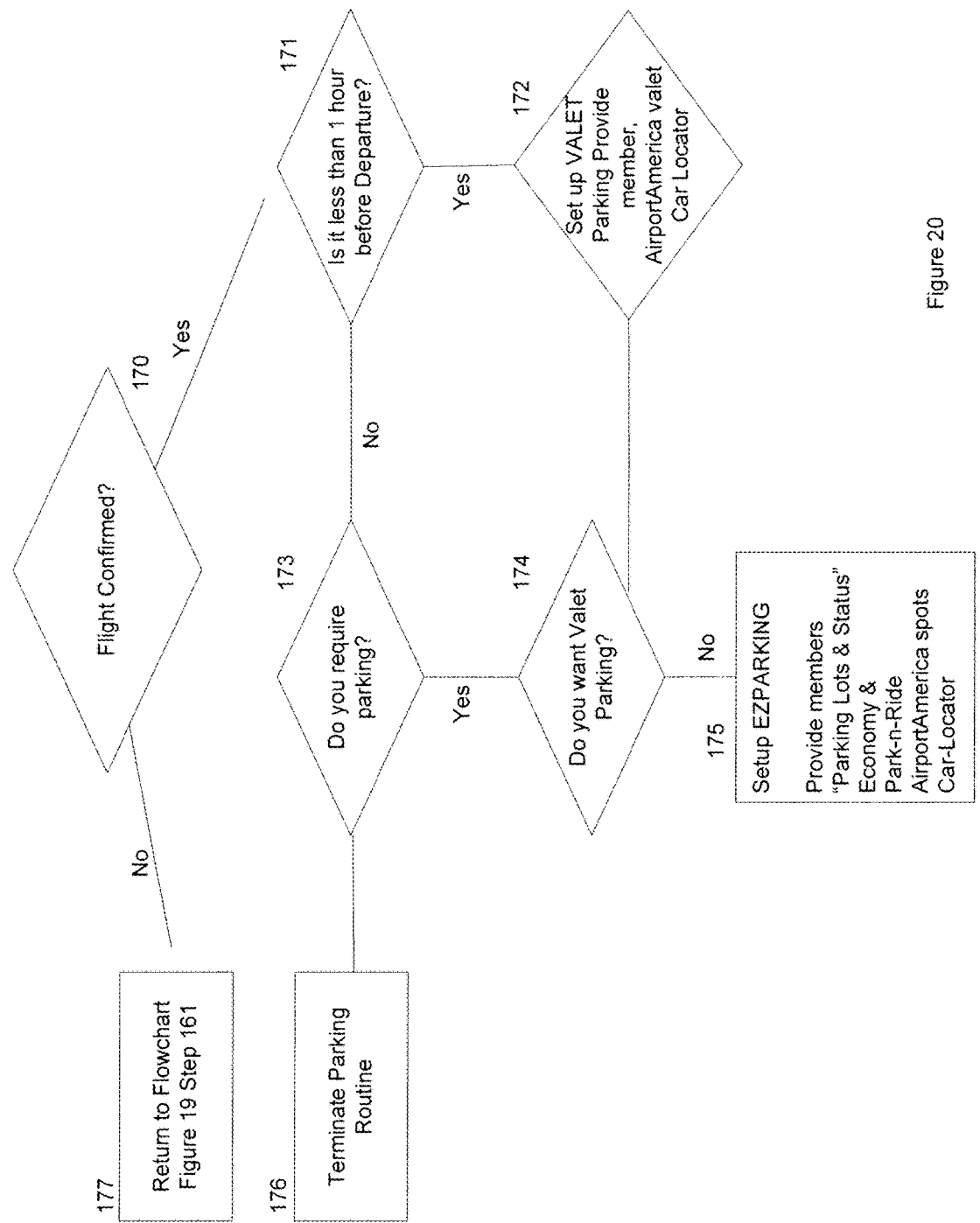

With further reference to the flowchart of FIG. 20, step 170 is entered for confirming the flight information. If the flight is confirmed, next in step 171 it is determined whether there is less than one hour before departure time. If the answer is yes, step 172 is entered for setting up valet parking. If there is more than one hour before the flight departure, step 173 is the next step after step 171, for prompting the member as to whether they require parking. If so, step 174 is entered to prompt the member for valet parking. If valet parking is selected, step 172 is next entered for taking the necessary steps to set up the valet parking, and notifying the member of the details. Alternatively, if the member chooses ezparking, step 175 is entered for setting up the reservation of a parking spot, and providing to the member the parking lot information. Note also in step 172, for setting up valet parking, after doing so, the member is provided with the location and directions for going to the valet parking area.

A member can plan to make all arrangements for their return flight in a similar manner. The member can do so at a later time, or at the time of first making the arrangements for the initial departing flight, by returning to the pull-down menu of FIG. 5, and addressing one of icons 47 through 51, or some combination thereof, for obtaining the appropriate reservations and required information. The system would establish the return flight using the steps of the flowcharts of FIGS. 19 and 20, as previously described.

Figure 21:
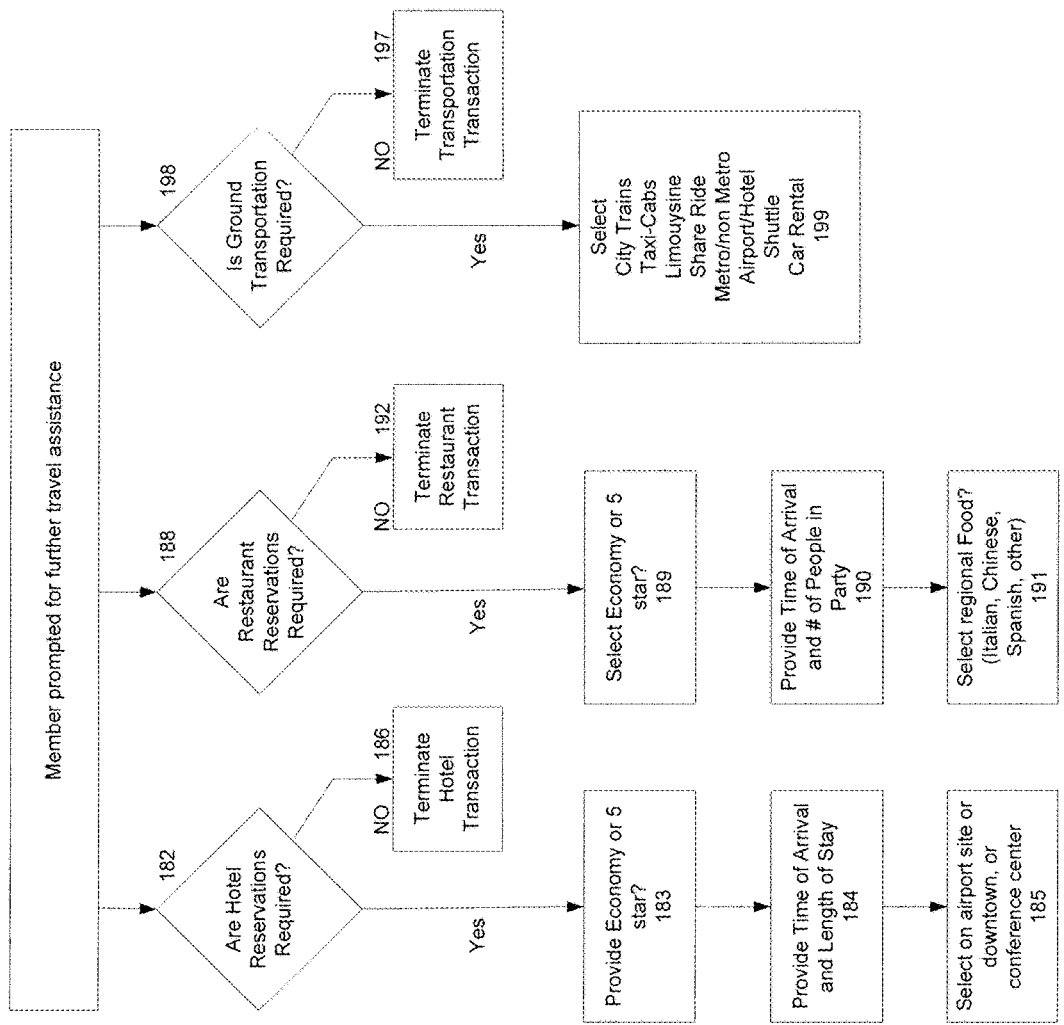
FIG. 21 shows a flowchart detailing the various steps for a method of the present invention for permitting a member or user to make arrangements for a hotel, restaurant reservations, and/or ground transportation.

After the member has completed their flight reservations, the system operates to prompt the member for further travel assistance as shown by step 180 in the flowchart of FIG. 21. A pull-down menu will be presented having icons asking the member whether they require car rental reservations, parking reservations, hotel reservations, restaurant reservations, ground transportation, and so forth. The system responds, as shown in the flowchart of FIG. 21, to the members selections. If in step 182 the member confirms that hotel reservations are required, the member is further prompted in step 183 to indicate whether economy, five star, or some other class of hotel or lodging is needed. Next in step 184, the member is prompted to provide their time of arrival, and length of stay. Next, in step 185, the member is prompted to select their desired hotel location, as indicated in the flowchart. If hotel reservations are not required, step 186 is entered for terminating the hotel transaction. Similarly, if restaurant reservations are required via prompting step 188, steps of 189 through 191 are carried out as prompting steps to permit the system to then automatically make the necessary restaurant reservations. If restaurant reservations are not required in step 188, the transaction is terminated in step 192. If ground transportation is required via step 198, prompt step 199 is entered for requesting the member to select one of the indicated modes of transportation. Once the member indicates their choice, the system responds by arranging the necessary transportation, and advising the member of the arrangements made. Note that the member is prompted in each of steps 182, 188, and 198 to advise whether or not hotel, restaurant, and/or ground transportation reservations are required to ensure the member does not in making hasty travel plans forget to pursue the same. Also, the system depending upon the mode of communication with the member, will either present a screen display of the reservations made, or provide a voice synthesized message of the same for the requested hotel, and/or restaurant, and/or ground transportation arrangements made.

Figure 4:
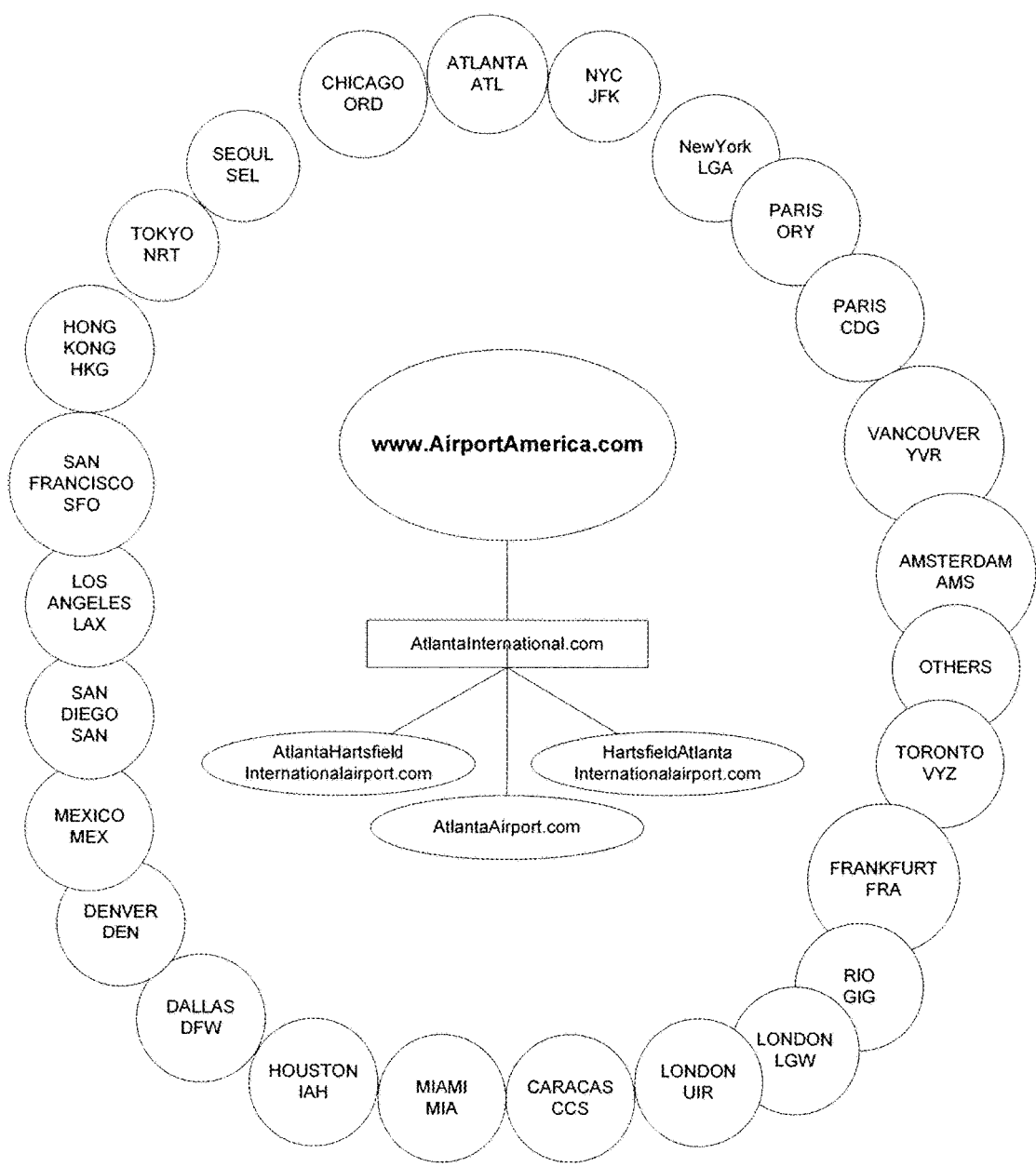
FIG. 4 shows a pictorial diagram of a pull-down menu of the invention obtainable from the pull-down menu of FIG. 3 for permitting rapid selection of a particular airport website from a plurality of addressable airport websites.

With further reference to FIG. 4, the present AA system utilizes the following airport and transportation related domain names owned by AirportAmerica.com:

| | |
|---|---|
| lclickbagchk.com | aaachicagoairport.com |
| lclicktx.com | aaachicagoairports.com |
| aaaairdiscounts.com | aaachinatrips.com |
| aaaairfare.com | aaacorpsuites.com |
| aaaairport.com | aaadiscounttix.com |
| aaaairport.net | aaafrankfurtairport.com |
| aaaairportal.com | aaahongkongairport.com |
| aaaairporthotel.com | aaaintlairports.com |
| aaaairporthotels.com | aaaairportpark.com |
| aaaairportinns.com | aaairportvalet.com |
| aaaairports.com | aaaairportvaletpark.com |
| aaaairports.net | aaaairportworld.com |
| aaaairportstay.com | aaairtx.com |
| aaaairtravel.com | aaasuites.com |
| aaaairtrips.com | aaaticketrez.com |
| aaaamsterdamairport.com | aaavalet.com |
| aaacheapairtix.com | aaaworldairports.com |
| aaacheaptix.com | aabeamtx.com |
| aairportvalet.com | aairportpark.com |
| aakiosk.com | airportsuites.com |
| aaticketrez.com | airportsus.com |
| aatx.com | airportsusatoday.com |
| aeropuertointernacionaljosemarti.com | airportsusatoday.net |
| aeropuertosdeestadosunidos.com | airportsworldb2b.com |
| aeropuertosdemiami.com | airportus.com |
| aeropuertosdemiami.net | airportvalet4u.com |
| aeropuertosus.com | airportvaletpark.com |
| aeropuertosusa.com | airportvillas.com |
| airlineterminals.com | airportwarehouse.net |
| airport2airport.com | airportworldalmanac.com |
| airportalmanac.com | alaskaairport.com |
| airportalmanac.net | alaskaairports.com |
| airportamerica.com | alaskaairports.net |
| airportamericabanc.com | alaskavacations.net |
| airportamericabank.com | allaboutairports.com |
| airportapartments.com | almacenaeropuerto.com |
| airportapartments.net | amsairport.com |
| airportapartmentsuites.com | amsterdamairportinfo.com |
| airportbanc.com | amsterdamairportschiphol.com |
| airportbancamerica.com | amsterdamairportschipol.com |
| airportbankamerica.com | amsterdamamsairport.com |
| airportco.com | amsterdamintairport.com |
| airportconcessions.com | amsterdamschiphol.com |
| airportdomain.com | ancairport.com |
| airportdutyfreeshops.com | anchorageintairport.com |
| airportfueling.com | apartamentosdelaeropuerto.com |

-continued airportfurnishedapartments.com
airporthotelsuites.com
airporthotelsuites.net
airportinc.com
airportindustrial.com
airportinformation.net
airportjetfuel.com
airportmotel.net
airportmotelsearch.com
airportoffices.net
airportofficesuite.com
airportrans.com
airportrentals.net
airportsamerica.net
airportsroundtheworld.com
airportsrus.com
airportsrus.net
atlantaairporttransportation.com
atlantaairportwarehouses.com
atlantahartsfieldinternationalairport.com
atlantahartsfieldinternationalairport.net
atlantainternationalairport.com
atlantainternationalairport.net
atlhartsfieldairport.com
atlhartsfieldintlairport.com
atlhartsfieldintlairport.com
atlintairport.com
atlinternationalairport.com
atlintlairport.com
ausairport.com
austinairport.net
austinausairport.com
b2bairport2airport.com
b2bairportcargo.com
b2bairportfreight.com
b2bus airports.com
b2bworldairports.com
bahamatrips.com
baltimorewashingtonintlbwiairport.com
bancamericaairports.com
bangkokairport.net
bankamericaairport.com
bankamericaportal.com
banknairports.com
beijingairport.net
beijingchinaairport.com
beijingpekairport.com
berlintxlairport.com
bid4pennies.com
bkkairport.com
bogotaairport.com
bogotaairport.net
bosairport.com
bostonairport.net
bostonloganintairport.com
brusselsbruairport.com
buenosairesairport.com
buenosairesairport.net
buenosairesezeizaintlairport.com
bushhoustonairport.com
bushhoustonintairport.com
bushhoustonintercontinentalairport.com
detroitairport.net
detroitwaynecntymetroairport.com
dfwintairport.com
dfwintlairport.com
dfwterminal.com
diaairport.com
discountfueling.com
disneyworldairport.com
dtwairport.com
dtwmetroairport.com
eairportcommerce.com
easyairlinetickets.com
easyairportvalet.com
esmaart.com
eurairport.com
eur-airport.com
europeairtrips.com
apartamentosdemiami.com
apartmentsus.net
apartmentsusa.net
asiaairtrips.com
atlantaairport.net
atlantaairportapartments.com
atlantaairportcarrentals.com
atlantaairportcorporatesuites.com
atlantaairporthotel.com
atlantaairporthotels.net
atlantaairportlodging.com
atlantaairportlodging.net
atlantaairportmotels.com
atlantaairportmotels.net
atlantaairportoffices.com
atlantaairportrentalcars.com
atlantaairports.com
atlantaairportsuites.com
bushintairport.com
bushintercontinentalairport.com
buyeasyairlinetickets.com
bwiintairport.com
caracasairport.com
caracasairport.net
caracasintlairport.com
caracasmaiquetiaintlairport.com
ccsairport.com
cghairport.com
charlotteairport.net
charlottecltairport.com
charlotteintlairport.com
cheapairportfuel.com
cheapairportoffice.com
cheapchinatrips.com
cheapezairlinetickets.com
cheaptx.com
chicagoairports.net
chicagoairtrips.com
chicagointernationalairport.com
chicagoohareairport.net
chicagoohareintairport.com
chicagoohareinternationalairport.com
chicagoohareinternationalairport.net
chicagoord.com
chicagoordairport.com
chicagotairrips.com
chinaairport.net
chinaairports.net
cincinnaticvgairport.com
cltairport.com
coloradospringsairport.net
cvgintairport.com
dallasairport.net
dallasairports.com
dallasftworthairport.com
dallasftworthairport.net
dcaairport.com
dcnationalairport.com
denairport.com
denintairport.com
denverairport.net
denverairports.com
departamentosmiami.com
fastezairports.com
fastezairports.net
fcoairport.com
fllairport.com
floridakeyshotelrooms.com
flyatlantaairport.com
flyaustraliaairports.com
flybeach.com
flybeaches.com
flybrasilia
flychicagoairport.com
flychinatrips.com
flydenverairport.com
flyeuropeairports.com
flymexicocity.com
flymountains.com -continued everyairport.com
ewrairport.com
experiencedsecretary.com
ezaircharters.com
ezairlinetickets.com
ezairportfuel.com
ezairportoffice.com
ezairportpark.com
ezairportparking.com
ezairportvalet.com
ezbaggage.com
ezcheapairportfuel.com
ezcheapfuel.com
ezcheckn.com
ezchinatrips.com
ezeintairport.com
ezeverest.com
ezfastairports.com
ezfastairports.net
ezflightinfo.com
ezflightinsurance.com
ezjetfuel.com
ezl-touch.com
ezltouch.com
ezone.com
eztixrez.com
eztxrez.com
ezworldairports.com
higheverest.com
highhimilaya.com
himalayatrips.com
hkgairport.com
hkinternationalairport.com
hndairport.com
hnlairport.com
hongkongairports.com
hongkongairtrips.com
hongkonginthkgairport.com
hongkongintrntnlairport.com
honoluluairport.net
honoluluintlairport.com
hoteldelaeropuerto.com
houstonairport.net
houstonbushintercontintalairport.com
houstongbushintercontinentalairport.com
houstoniahairport.com
houstonintercontinentalairport.com
iahhoustonairport.com
iahintercontinentalairport.com
informacionaeropuerto.com
internationalairportalmanac.com
internationalairportalmanac.net
internationalairportinfo.com
internationalairportsalmanac.com
internationalairportsalmanac.net
internationalairtrips.com
interrnationalairportalmanac.com
jacksonvilleflairport.com
jetplanesinc.com
justintimeairport.com
justintimeflight.com
justntimeairport.com
justntimeflight.com
justntimeticketing.com
justntimetickets.com
justntimetrips.com
kennedyairport.net
kennedyjfkairport.com
keylargolodge.com
1aairport.net
laairports.com
laguardialgaairport.com
lainternationalairport.com
miamiapartments.net
miamiintairport.com
miamiinternationalairport.net
miamiintlairport.com
milanintairport.com
milanmxpairport.com
flynassau.com
flyoverseasairports.com
flytheretoday.com
flyusairport.com
flyusairports.com
flyusatoday.net
flyustrips.com
fraairport.com
frankfurtairport.net
frankfurtfraairport.com
frankfurtintairport.com
freeairtx.com
freeportintlairport.com
ftlairport.com
ftlairport.net
ftlauderdaleintlairport.com
ftlauderdaleintlairport.net
ftlauderdalintl.com
gigairport.com
giveutix.com
giveutx.com
givutix.com
habanacubaaeropuerto.com
hartsfieldatlantainternationalairport.com
hartsfieldatlantainternationalairport.net
havanainternationalairport.com
havanajosemartiairport.com
helsinkihelairport.com
helsinkivantaaairport.com
lasairport.com
lasvegasairport.net
lasvegasmcarranintairport.com
lauderdaleairport.com
laxairport.com
laxtrips.com
lgwairport.com
lhrairport.com
limairport.com
limajorgechavezintlairport.com
limaperuairport.com
londonairportinfo.com
londongatwickairport.com
londongbairports.com
londonheathrow.net
londonheathrowlhrairport.com
londonlgwairport.com
londonlhrairport.com
madairport.com
madridairport.net
manchestermanairport.com
mcoairport.com
mdwairport.com
memairport.com
memphisairport.net
memphismemairport.com
mexairport.com
mexicocityairport.com
miaairport.com
miaairport.net
miaairportauthority.com
miaairportauthority.net
miaairporttrip.com
miaairporttrips.com
miainternationalairport.com
miainternationalairport.net
miamiairportapartments.com
miamiairportcorporatesuitrs.com
miamiairportcorpsuites.com
miamiairporthotel.com
miamiairportlodging.com
miamiairports.com
miamiairporttransportation.com
miamiairporttrips.com
miamiairprtcorpratesuites.com
pariscdgairport.com
parisoryairport.com
paristrips.com
pbiairport.com
pbiinternationalairport.com -continued

| | |
|---|---|
| minneapolisairport.net | philadelphiaphlairport.com |
| minneapolisstpaulinternationalairport.com | phlairport.com |
| minneapolisstpaulmspairport.com | phoenixairport.net |
| moscowintlairport.com | phxairport.com |
| mspairpor.com | pittsburgairport.com |
| mucairport.com | pittsburghpitairport.com |
| mundialaerolineas.com | pmiairport.com |
| mundialaeropuertos.com | rent4cents.com |
| mundialaviones.com | rentairportoffice.com |
| mundialterminal.com | rioairport.net |
| mundialterminales.com | riodejaneirointlairport.com |
| munichmucairport.com | rockymountainairtrips.com |
| mxpairport.com | rockymountaintrips.com |
| nassuaairport.com | romeairports.com |
| newarkewrairport.com | romefcoairport.com |
| neworleansairport.net | ronaldreagandcaairport.com |
| neworleansintairport.com | ronaldreaganwashingtonnationalairport.com |
| neworleansmsyairport.com | saltlakeairport.com |
| newyorkairport.net | saltlakeairport.net |
| newyorkairports.net | saltlakecityairport.net |
| nrtairport.com | saltlakecityslcairport.com |
| nyjfkairport.com | sanairport.com |
| nylgaairport.com | sanfransiscoairport.com |
| nylgwairport.com | sanintairport.com |
| oficinadelaeropuerto.com | sanjoseirport.com |
| oharechicagoairport.com | sanjoseirport.net |
| ohareord.com | sanjosesjcairport.com |
| ohareordintlairport.com | sanjosesjcintairport.com |
| ordairport.com | sanjosesjoairport.com |
| ordairport.net | sanjuanairport.com |
| orlandoairport.net | sanjuanairport.net |
| orlandointairport.com | santiagochileairport.com |
| orlandomcoairport.com | santiagointernationalairport.com |
| oryairport.com | saopaulocongonhasintlairport.com |
| osakaintairport.com | saopaulointlairport.com |
| osakakixairport.com | sclairport.com |
| palmademallorcaairport.com | seaairport.com |
| panamaairport.com | seattleairport.net |
| parisairport.net | seattleintairport.com |
| seattleseaairport.com | seattleinternationalairport.com |
| seattletacomaintairport.com | usairport.net |
| selairport.com | usairporthotels.net |
| seoulintairport.com | usairportinfo.com |
| seoulkoreaairport.com | usairportinfo.net |
| seoulkrairport.com | usairportinformation.com |
| seoulselairport.com | usairportlodging.com |
| sfointairport.com | usairportlodging.net |
| sfointlairport.com | usairportrentacar.com |
| shopezfly.com | usairportrentacar.net |
| shopnflyairports.com | usairports.net |
| sinairport.com | usairportspark.com |
| singaporeairport.net | usairportsparking.com |
| singaporechangiairport.com | usairporttransportation.com |
| sjcintairport.com | usairporttrips.com |
| stlouisairport.com | usairporttrips.net |
| stlouisairport.net | usairportwarehouse.com |
| stlouisstlairport.com | usairtrips.com |
| sydairport.com | ustrips.net |
| sydneysydairport.com | vegasairport.net |
| tampaairport.net | viajanis.com |
| tampaairportsuites.com | viajarusa.net |
| tampahotel.net | viajesbarato.com |
| tampaintairport.com | wapairportsamerica.com |
| tampaintlairport.com | wapairtix.com |
| tampatpaairport.com | wapairtx.com |
| tarmacfuel.com | wapflightsaroundtheworld.com |
| tarponflats.com | washingtonairport.net |
| telavivintairport.com | washingtonairportbiz.com |
| tokyoairport.net | washingtonairportoffice.com |
| tokyoairports.com | washingtondcairport.com |
| tokyohndairport.com | washingtondcairport.com |
| tokyointairport.com | washingtondcairport.net |
| tokyonrtairport.com | washingtondciadairport.com |
| tokyotrips.com | washingtondullesairport.com |
| torontoairport.net | washingtonnationalairport.com |
| torontoyyzairport.com | westerntravel.net |
| tpaairport.com | westerntrips.com |
| travelstopamerica.com | worldairportinfo.com |
| travelstopamerica.net | yvrairport.com |

-continued

| | |
|---|---|
| travelusatoday.com | yyzairport.com |
| travelusatoday.net | zapairtix.com |
| txntime.com | zaptrip.com |
| zrhairport.com | zaptrips.com |
| zurichintlairport.com | |

The system is further programmed to utilize these domains in responding to a member's selection of a particular airport for departure and/or return flights. Also, for providing various services the system is designed to provide additional sites related to travel and passenger conveniences including restaurants and currently utilizes the following Internet addresses:

| | |
|---|---|
| Airlineterminals.com | Easyairlinetickets.com |
| Airport Concessions.com | Ezairlinetickets.com |
| Airportdutyfreeshops.com | Ezairportparking.com |
| Airportindustrial.com | Ezaircharters.com |
| Airportoffices.net | Ezfastairports.com |
| Airportrentals.net | Ezflightinsurance.com |
| Airportsuites.com | Fastezairports.com |
| Airportvalet4u.com | Freeairtx.com |
| Airportvaletpark.com | Justintimeairport.com |
| Allaboutairports.com | Justintimeflight.com |
| Airportamericabanc.com | Justintimetrips.com |
| Airportamericabank.com | Justntimeticketing.com |
| Aiportbanc.com | Lotterygivutix.com |
| Airportbankamerica.com | Rent4cents.com |
| Buyeasyairlinetickets.com | Usairportspark.com |
| Cheapezairlinestickets.com | Shopezfly.com |
| Cheaptx.com | Shopnflyairports.com |

As previously indicated, AA membership is obtained by simply logging in the first time and following filling out of name, address, phone, fax, e-mail, cell phone number, the member' credit card is assigned a pin number. Members receive a free e-mail if they so desire. After enrollment the AA member simply logs-on with member password and then scans Flight information and orders tickets which are delivered online via ezflightinfo.com, eztxrez.com, or 1clicktx.com. All domain names (e.g. .coms) mentioned herein are owned by AA. If the member is cutting it close, or on the way to the airport, the member can go online or electronically communicate through a palmtop, laptop computer, cell phone, or WAP phone (WAPairtx.com, WAPairtix.com). Tickets can be printed out either at AirportAmerica Kiosks 11 (see FIG. 1) located strategically throughout the airport through a partnering with the local sponsor airport, or on a computer printer. The reservations are verified visually at the gate, or verified electronically at the gate (1clicktx, buyeasyairlinetickets, easyairlinetickets, ezairlinetickets).

If a member's plans unexpectedly change or if a flight is cancelled or delayed the member is instantly notified by an AA automatic alarm on a palm or computer, or via cellular phone on the go thru AA chip or Internet connect thru AA icon on a WAP phone. If really tight for time the member can elect to go to justntimetrips.com, justntimeairport.com, justntimeflight.com; airportvaletpark.com or airportvalet4u.com. Through justntime the member can arrange to drive to the terminal where the valet station closest to his concourse will take the member's car, check his bag, and point out the required concourse and gate. The member also can use an AA computer terminal to print out tickets and itineraries as the member rushes right to the gate. If the AA member needs a cart to expedite travel to the gate, it is there, he leaves it at the gate and it will be picked up later. All this is automatically billed to the AA member. A member can check AA for up to the minute weather en route via just 1 click to ezweatherck.com. If the flight is missed, the member can just click to ezaircharters. AA will arrange for charters from the departing airport that by agreement are on standby. The charter operators selected by AA for inclusion ensure that standby a and equipment are available based on pre-set agreements.

A member can change travel plans on the run thru use of a palm, an iCell phone 22, cell phone 17, laptop 20, or at an AA kiosk 11 and/or connectors provided at the airport (for example—ATL). The member can obtain a text confirmation at an AA kiosk 11 (computer printout) or at a gate airline link.

The member can have rent-a-car pickup and return at an AA affiliate valet stand. The valet will have a car ready at a destination airport valet stand when the AA member deplanes in a destination city. The valet gives the member an AA stub. At the end of the trip the AA member may opt to leave the rent a car at the valet stand airportvalet4u.com. All AA affiliated airport hotels and suites must provide pickup and return of AA member and luggage.

For reserved parking in the building, AA e-mails to the member the location of the reserved parking spot, for example, "North daily 3 level, any of spaces 45-56."

Through use of AA's Cartracker, a member can scroll thru a parking garage map displayed by AA on a monitor, permitting the member to, by palm, iCell phone 22 or cell phone 17, mark the location in the parking building. Upon return to a home city, and while going to the parking garage, a member can just scroll through maps of parking structures to locate a blinking light on iCell parking garage map indicating the location of car. In one embodiment, an infrared beam crosses reserved parking spaces. The beam is released by the member inserting their AA pin number in a key pad on adjacent stanchion, otherwise interruption of the beam sets off the alarm. Release of the beam is sent to an affiliate's computer in the garage, and sent on to AA local web parking page. When the member plugs in a pin number that disengages the beam, such action notifies the parking garage computer that the space reserved for the member is occupied by someone else. If a nonmember drives a car in the space the interrupted beam sets off an alarm.

An AA member is also eligible for lottery and AA points toward freeairtx.com, freetix.com, and giveutx.com and can collect visa miles for AA affiliate purchases in addition to the discounts.

A courier delivery service can be used by a member to retrieve needed merchandise from local stores for delivery to a hotel or airport (subcontractors/affiliate).

A member can order a personal valet to directly pick up baggage, and drive the member to an airport from a hotel, and assist with check in.

As previously indicated, a member can connect to AA semi-official websites of the world's major airports (which are AA owned and controlled domains). AA owns at least one and usually several of the most common domain names of the fifty or more busiest airports in the world, each of which is cross-linked so that reference to any portion of an airport name by an AA member will lead to the web site and to an AA portal through metatags. AirportAmerica is the portal to domestic and overseas AA owned websites.

Members are provided discounts via AA bids to affiliates who provide rent-a-car, hotels, apartments, temporary office suites, restaurants, travel packages thru AA owned websites such as rent4cents.com, ezairportoffice.com and cheapairportoffice.com.

AA provides Airport Facilities Information to members via pull-down menus or choice communication for the following (this list may be expanded):

A. Airline lounges
B. Conference Center
C. Financial Services—AA sponsored ATM, cash advances on credit cards, travelers checks, money orders, foreign currency exchanges, ATM
D. Locker Rental
E. Lost and Found
F. Parking
G. Post Office
H. Visitor Info
I. Information translated into passenger's choice of 7 languages A unique function provided by the AA system is STANDARDIZATION—a complete range of services available in each member airport set out in the AA web site credited to that airport, are linked like spokes of a wagon wheel to the AA hub/portal. The AA portal is the brains, the operations center (OP. Center) and the clearing house. The OP center continuously updates all information, individual of member airport websites, and maintains and continuously improves the website for the benefit of the airport. When a member logs on to the site the airport gets primary billing at a fraction of the cost of attempting to maintain such a site itself. All services listed are available at all AA airports.

Queries are instantly transmitted to the AA OP Center via interactive computer-Kiosks 11 at the intersections of concourses, and gates and other strategic high traffic areas of the terminal. For example, assume a 1-800-400-1024 connection to AA for cell phone users for Ft Lauderdale (FLT), weather, and other information providing reservation and, ticketing information. Any other areas can be simultaneously connected. Thru affiliate relationships with companies in the cutting edge of WAP technology, iCell and cell phone access will become the Internet access for mobile links to AA, and all information a member requires while on the run. AA stores the information accessed thru pin numbers or cookies.

Figure 22:
FIG. 22 shows a diagram of a boarding pass for an AA member.

Printouts of justntimeticketing.com can be obtained by downloading to the 3"×3" wireless printer which can be clipped to the waist or printed while in briefcase, at AA interactive remote-Kiosks 11 located at the intersection of each concourse and terminal and/or out in concourse or local airport information center. An example of an AA e-ticket 202 is shown in FIG. 22. Note that the coded marks 204 to the right of the "Flight:" number provide a security clearance means for a member to obtain fast security screening or checkout.

AA Pre-Clearance—this is an important part of the AA seamless airport and air travel concept. Seamless connotes without bottlenecks. One of the major annoyances of the airport experience is the holdup at security when going from the central terminal to board the flight, so eliminating this delay helps to promote the AA seamless argument. Pre clearance involves AA as an agent for the FAA. AA conducts a sufficient inquiry of those members who elect this aspect of membership to enable AA to provide adequate information to the FAA to conduct a thorough security check, in order to obtain an expeditious security clearances to bypass or breeze through security.

As indicated, AA expedited pre-clearance is the key to a member obtaining expedited Access through security to the gate. This is accomplished by an FAA approved pre-clearance security check of an AA member who volunteers for the Fast Security Check Program as a result of the AA member filling out an AA Electronic Personal Security Questionnaire [ESPQ] which is then submitted to the FAA. Upon approval by the FAA of the member following computer investigation, the AA member will be eligible for preflight implementation of preflight security clearance through a security checkpoint to the gate which is evidenced by an encrypted code 204 or security stamp on e-ticket 202 (see FIG. 22).

The questionnaire requires:
Member name,
Address,
Phone numbers,
Social security number,
photo, and
electronic finger and face print for identification.

This ESPQ form provides fast encrypted security verification for each trip based on computer update of ESPQ. This usually results in pre-clearance, and the AA member just walks through the unmanned automated security gate. As the bar code 208 on the AA member's e-ticket makes contact with the infra-red beam at this unmanned station, the automated gate opens. The AA member goes through the security station en route to gate.

In the alternative, the AA member presents the e-ticket with encrypted security code or stamp to an attendant, who verifies through a computer check by passing a wand over the e-ticket bar code 208. If the AA member passes this five to fifteen second process, the AA member is waived through a manually operated Green Lane, thus bypassing any queue or hold up at the security checkpoint. Approval gives clearance and the levels of access through Green Lane.

Note that AA provides the system with domains associated with pre-clearance. For example, Preclearsecurity.com, and Fastsecuritychek.com are provided.

Figure 23:
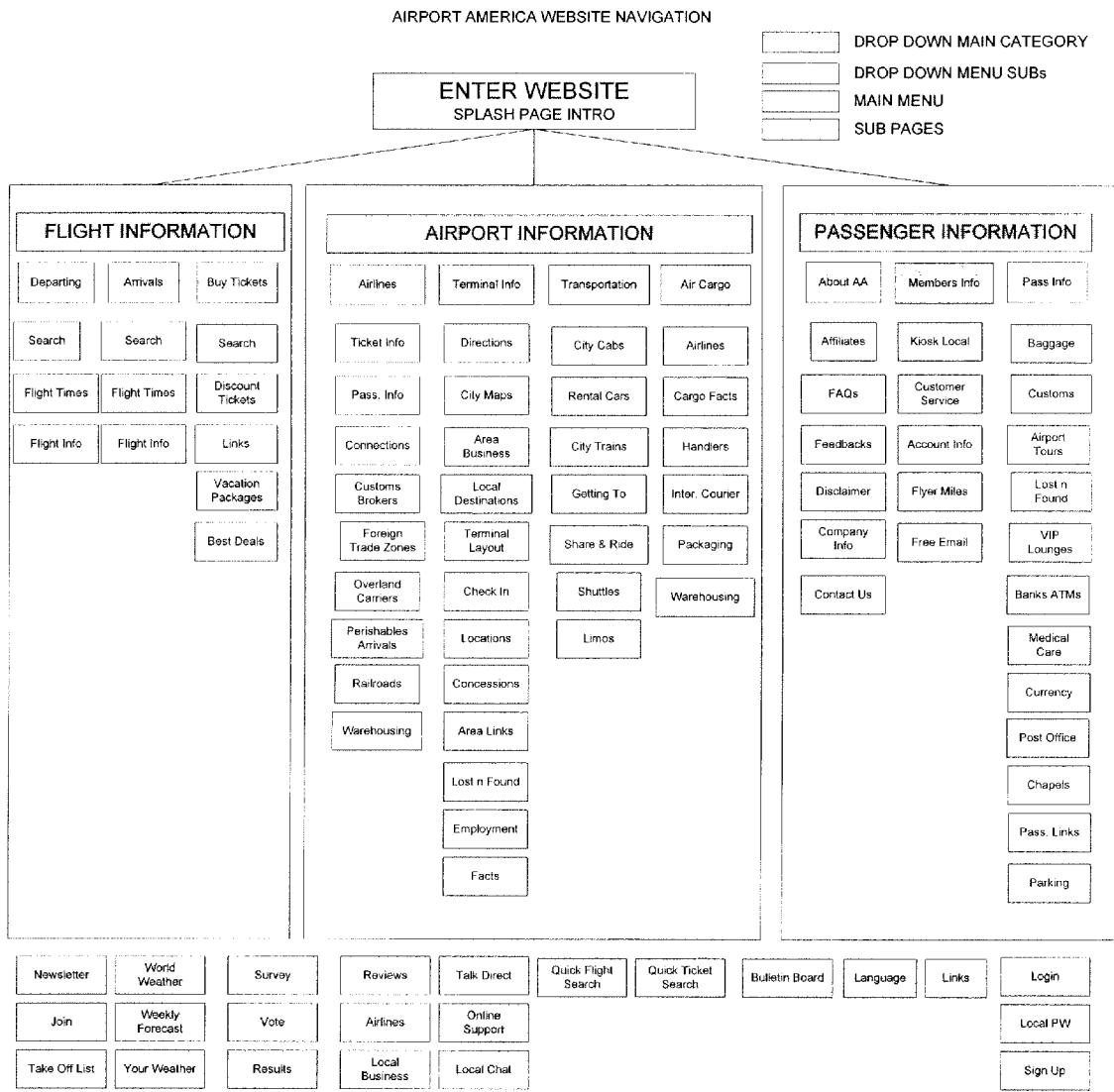
FIG. 23 shows a flowchart detailing a method for inputting and obtaining information from the system.
Figure 24:
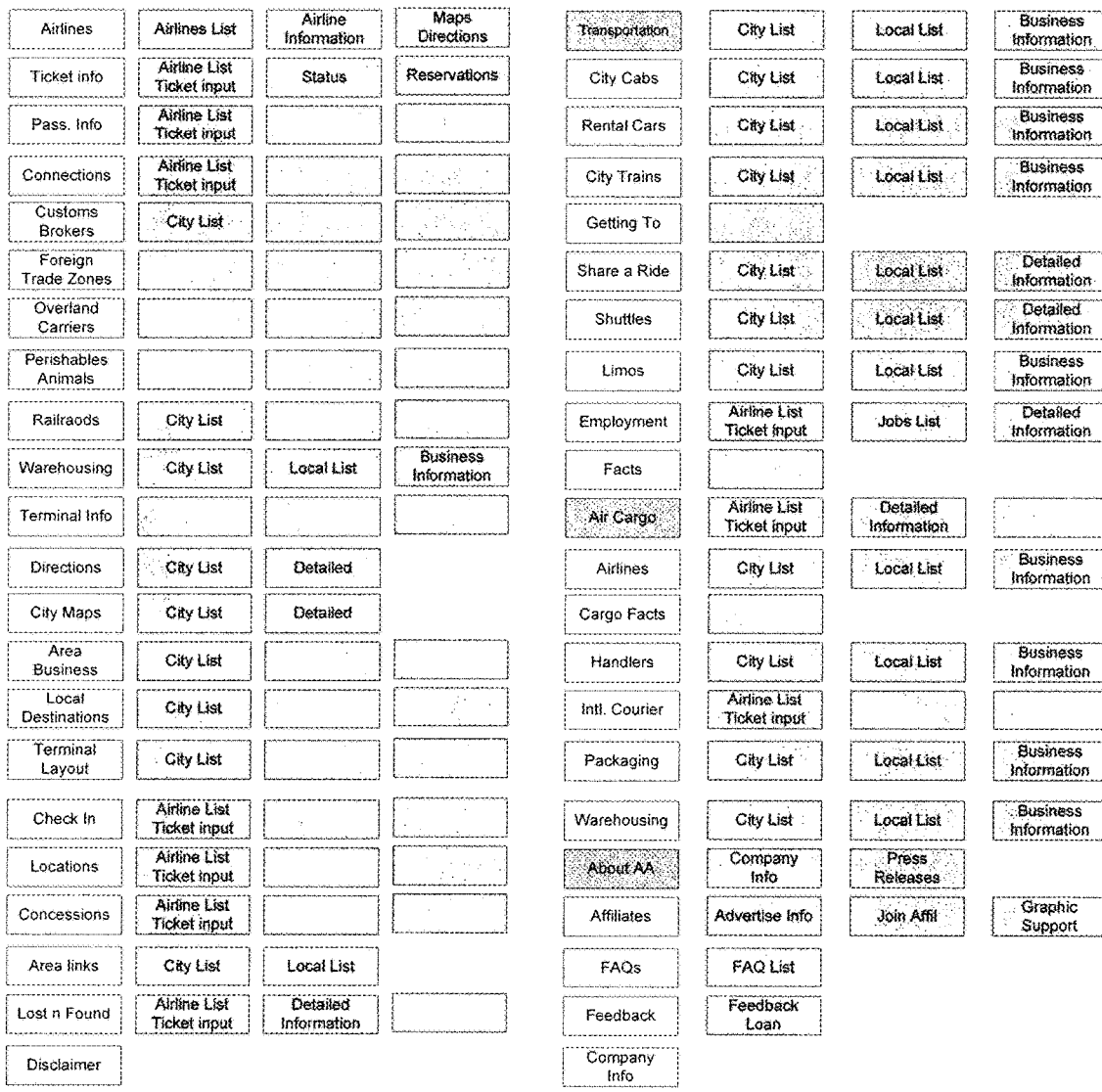
FIG. 24 shows a site map detailing a method for inputting and obtaining information from the system.

FIGS. 3 through 17 show examples of pull-down menus available to a member for obtaining desired travel information and making reservations. Other pull-down menus can be configured for expanding the usefulness of the system. FIGS. 23 and 24 show additional views of the sort of information that may be provided as part of the standard web site.

An example of an AirportAmerica (AA) member utilizing the present system to make his/her airport, flight and travel experience easier, faster, cheaper and friendlier, will now be given. It is the inventor's understanding that the following combination of unique and non-obvious features provide what no other airport site is currently offering. AA owns at least one .com domain name of every major (top 50) airport in the world and of the largest five or ten AA owns several. For example, Atlanta: Atlantahartsfield.com, atlantainternationalairport.com, atlintlairport.com, Hartsfieldatlantainternationalairport.com, atlhartsfieldairport.com, atlinternationalairport.com, atlhartsfieldintlairport.com and atlintairport.com are all separate AA owned domain names. They will be separate-linked web sites, all linked, and all leading to the AA portal. The links are the spokes to the hub: AA is the hub. Each Atl web site or any combination of words for that airport through meta-tags, etc., will lead to the standardized Atl website, and then to the AA portal. For example, say an AA member, Bond is his name, is in the company office in Cincinnati, who at 4:00 pm notices that a conference for the Americas is starting today in Miami and a member of the Chilean delegation is speaking tomorrow a.m. is the business contact he has been trying to reach in Chile. He normally could never make a flight to attend.

Bond can attend through use of this AA membership. He clicks to AA, goes to "C" for Cincinnati in the "Departing Airport", and "M" for Miami for "Arrival Airport" and obtains all of the flights for today. In luck, there is one last flight leaving in just over one hour. Bond runs down to the parking garage, jumps in his car and takes out his iCell phone, and using voice recognition says "Internet", then "AirportAmerica Depart CIN after 4:00 pm today Arrive MIA today." AA responds "you are booked business class, aisle 24b, as is your preference Mr. Bond (from profile on file) you may proceed to concourse "A, gate 4" to pick up your ticket (with AA the maximum discount is automatically credited), and board or get a printout at any AA kiosk 11, one is located at the information booth or in the terminal at the intersection of concourse A. Do you wish to go ezairportparking.com or aaavalet.com? If you select ezairportparking.com north daily is open, but we notice it is less than one hour until your departure, we recommend aaavalet.com" Bond clicks ezparking and requests expedited as an option in justintimeairport.com. He then clicks on up to the minute traffic map to the airport and sees a bottleneck flash on the interstate, exits around the fender bender, pulls up to valet fifteen minutes later and leaves the car. He is pre-cleared through security by hand wand by security personnel at valet who have been notified that he has elected expedite. The security person accompanies him through the security bypass and around those long lines, and he then places his briefcase and hand luggage in a waiting AA cart and proceeds to board just in time. He then settles in the seat, but before turning off his electronic equipment, he orders the I-phone or WAP phone to have a club limousine waiting at MIA, and to make reservations at the closest airport suites hotel, and bids $75 for one bedroom with a computer port. In a few seconds a confirmation number appears with the AA discount built in. He then commands Miami downtown restaurants. In a flash a list of preferred restaurants and a rating for price and quality appear. He picks the Biltmore in the expensive category because the conference is there and he can have a drink. He makes rez.com for 8:30 P.M. Bond arrives in Miami, flicks on the iCell, reviews the e-mail and finds the Black Lincoln town car club limo is waiting upstairs concourse B at the AA valet stand. He stops at the AA kiosk 11 near his gate, selects general information from the home page, and then clicks terminal layout. He locates the AA valet at Concourse B. Bond then puts in his AA trip PIN number and in a few seconds receives page one of hard copy of a reservation at Airport Villas with a map and a note that an AA travel pac (drop kit) is in his room. Page 2 of the printout confirms the Biltmore. Page three confirms the Ralph Lauren blue dress shirt, underwear and socks he ordered from AA "airportvalet4u.com" will be delivered to his hotel by "airportvalet4u.com" courier by 7:00. p.m. If he has any questions the driver's cell number and store location and telephone number are included.

The AirportAmerica system establishes a set of standardized, user-friendly airport information templates and websites. Uniformity creates familiarity that makes for easier, faster member and public use of the aa-airport websites, (every airport that is a member of AA is provided an AA website that is for the most part identical to all other member airport websites and still incorporating unique features and services, etc. of that airport. AA encourages conformance with AA template). This can be seen in FIGS. 23 and 24.

As previously indicated, AA membership is obtained by simply logging in the first time and following filling out of name, address, phone, fax, e-mail, cell phone number, the member's credit card and/or debit card is assigned a pin number. Members receive a free e-mail if they so desire. After enrollment the AA member simply logs-on with member password and then scans Flight information, orders tickets which are delivered online via ezflightinfo.com, eztxrez.com, 1clicktx.com. All .coms mentioned herein are owned by AA. If the member is cutting it close, or on the way to the airport, the member can go online or electronically communicate through a palmtop, laptop computer, cell phone, WAP phone (WAPairtx.com, WAPairtix.com) or iCell/smart card. Tickets can be printed out either at AirportAmerica Kiosks 11 (see FIG. 1) located strategically throughout the airport through a partnering with the local sponsor airport, or on a computer printer. The reservations are verified visually at the gate, or verified electronically at the gate (1clicktx, buyeasyairlinetickets, easyairlinetickets, ezairlinetickets).

If a member's plans unexpectedly change or if a flight is cancelled or delayed the member is instantly notified by an AA automatic alarm on a palm or computer, or via cellular phone on the go thru AA chip or Internet connect thru AA icon on phone device. If really tight for time the member can elect to go to justntimetrips.com, justntimeairport.com, justntimeflight.com; airportvaletpark.com or airportvalet4u.com. Through justntime the member can arrange to drive to the terminal where the valet station closest to his concourse will take the member's car, check his bag, and point out the required concourse and gate. The member also can use an AA computer terminal to printout tickets and itineraries as the member rushes right to the gate. If the AA member needs a cart to expedite travel to the gate, it is there, he leaves it at the gate and it will be picked up later. All this is automatically billed to the AA member. A member can check AA for up to the minute weather en route via just 1 click to ezweatherchk. If the flight is missed, the member can just click to ezaircharters. AA will arrange for charters from the departing airport that by agreement are on standby. The airport displays charter information on the flight schedule monitors.

For the convenience of AA members, AA maintains one or more lounges in each airport with an AA liaison who operates as a local liaison with the airport and as a personal concierge to AA members.

A member can change travel plans on the run thru use of a palm, an iCell 22, cell phone 17, laptop 20, or at an AA kiosk 11 and/or connectors provided at the airport (for example—ATL). The member can obtain a text confirmation at an AA kiosk 11 (computer printout) or at a gate airline link.

Information Management

In order for a user to have access to the present system, the user must first enroll on the system. As described in greater detail below, the user has the prerogative to provide varying levels of detail as part of both the enrollment and subsequent modification processes. Any information not initially provided by the member can later be added to the profile. Information may be deleted as well. In doing so, the user must provide some identification information for the profile, at least to the level of the minimum-mandatory information in order for the member to be classified as an AA certified traveler. The minimum-mandatory information is the minimum level that can qualify an AA member to be certified. The amount of information that constitutes minimum can be adjusted over time by the administrators of the AA central server. Beyond the minimum standard, the member may elect to submit to additional security scrutiny and testing in order to obtain a higher gradation level resulting in a more seamless travel experience. Enrollment also includes providing the system with personal data used to facilitate travel management.

The profile includes such information as name, address, telephone number, email, credit card and/or debit card information, desired class of air travel (e.g., coach, business, first class), airline carrier preference, seating preferences, travel time preferences, meal preferences, self park or valet parking, hotel preferences, rental car preferences, hologram animation of the applicant's face, full face profile, five second 360° facial video which over time may be extended to show prominent distinguishable features, retinal scan, fingerprints, facial scan, distinguishing marks, DNA, and so forth, all of which will be encrypted. A record of the user's profile is stored in a central memory of the system as discussed below. The user receives a PIN number for access to the system.

The system manages personal information for multiple purposes to expedite and facilitate the travel experience. For example, personal information such as travel preferences and credit card and/or debit card account information is stored to facilitate expedited reservation services that would otherwise require the member to provide large amounts of data for each transaction. Other personal information is stored and usable by security personnel to expedite security clearances. Some of the personal data that can be stored on the central AirportAmerica systems are:

Name, addresses, phone numbers and emails
Travel preferences
   Class of service preference
   Desired class of air travel (e.g., coach, business, first class)
   Desired fare information (lowest fare with restrictions, least restrictive fares)
   Typical departure airport preference
   Travel criteria information (scheduled airline preference, nonstop only, equipment type, airport gradation/level, etc.)
   Priorities for travel recommendations and automatic booking
   Gradation/level of participating travel companies
   Method of travel (air, sea, car, bus, etc.)
   Number of stops
   Company preferences (American Airlines, Amtrak, etc.)
Travel time preferences
Meal preferences
Car preferences
Hotel preferences
Frequent flyer data organized by Airline
Frequent traveler data for other travel providers (car, hotel, etc.)
Frequency of travel (also beneficial for sharing with airport parking facilities)
Preferred method of travel to or from the airport (self drive via private car or travel via bus, train, taxi; this information is useful to help forecast needs for auxiliary services such as parking facilities.)
Self park or valet parking
Rental car preferences
Other means of travel, i.e. train, short hop via car, limo, etc.
Special Needs and Emergency Needs
   Emergency Contact Information (e.g. Doctor, Lawyer, Wife, Husband, Father)
   Special needs such as wheelchair, seasickness, underwater pressure, diet, etc. The system will capture any ADA supported needs honored by the airlines.
Updateable Contact Information
   Contact information that may vary based on traveler's current travels. For example, the name and phone and email of the person who the traveler is meeting can be input and updated as needed.
   The updateable contact information plays a key role in ensuring that the appropriate people impacted by modifications to the traveler's travel plans can be notified via the reliable messaging process that is provided by the AA system.
Biometric information
   Hologram animation of face
   Retinal scan
   Fingerprints
   Facial scan
   Distinguishing marks
   DNA The data that a member provides to AA is private and cannot be shared in its pure state with anyone without express permission by the user. There is an aggregation/demographic layer which rolls up the information provided for the purposes of gathering overall statistics of the utilization of the system. So, a member's passport number is not shared but the fact that this member is a U.S. male citizen between the ages of 40 and 50 may be useful to gain a better idea of the behavior patterns of the membership and also to provide a means for future targeted promotions of potential members. The travel preferences may also be beneficial in terms of gathering an understanding of areas that could be of greater value to the AA member. This provides the basis of the data that may be required in support of a "light" Customer Relationship Management. This system allows AA to preserve a respect for privacy while enabling information gathering for statistical purposes Each member's identification and authentication information is stored on the OneTouch issued to the member, as discussed below, and at the central memory or database in order to provide for a three-way security match and to insure against tampering with the OneTouch device. The central computer or server provides access to the web pages and other data stored in the memory of the system. Secure information is protected for the privacy of the members. Such information is available only by way of reference to matching data but not to directly access the secured information itself. To verify the identity of a member, the AA system may be accessed to confirm that the presented information matches the identification information in the central database and that the member remains in good standing. The central server, however, does not release identification information during this process. The physical identification exercise at the gate makes the minimum three-way match. If the security worker is not at the gate, a security worker may view the process remotely through multiple cameras mounted on the cart as the passenger goes through the security check at the gate and as the carry-on is scanned. This security check is fast because the AA member has trip pin information, radio transmitted information, and bar code and ticket number.

The additional identification information makes the matching of a member bag to the member an easier, faster process. This feature contributes to the faster boarding process for the member, requiring less lead-time at the airport. The match is quickly made between the member, the seat on the aircraft and the bag in the hold.

For added security, all of the communication between the system central server, kiosks, smart cards, and the web-site is always encrypted such as by means of a two-way SSL (Secured Socket Layer). Using two-way SSL allows the central server and the various clients to authenticate each other to make sure the clients are in fact communicating with the authentic system central server and the central server is in fact communicating with the specified client. In addition, all data sent back and forth between client and server is encrypted so that devices not meant to view the data cannot understand or alter the data. Furthermore, the system stores member passwords only in an encrypted form. The system can check a password for a match by encrypting the password with the same key that encrypted the stored password. The system then compares the two encrypted passwords for a match.

Gradation

The system is of a flexible design that permits operation at a number of levels of personal information. These levels apply both to individual members and to travel facilities that integrate with AA. Examples of such travel facilities include airports, airlines, ports, terminals, security agencies, hotels, car rental agencies, charter companies, railroads, stations, taxi services, limousine services, bus lines, depots, ferries, and other travel provider facilities. The flexible levels of compliance for using personal information in the system are referred to as Gradation. Members may provide more or less information and in turn will meet the requirements of higher or lower compliance levels. FIG. 25 shows the various gradation levels with 1 representing the minimum amount of mandatory information and 6 representing the highest level. The actual set of gradations may vary and is system configurable. As discussed in further detail below, the member's OneTouch is able to display the gradation or security level that the member has obtained. The members receive benefits based on their level of compliance. Gradation levels for facilities are based upon how well the facility integrates with the AA system; a facility achieves a higher gradation level by having in place policies, procedures and technologies that will properly use and safeguard the information of each compliance level of the system to enhance the individuals travel experience.

This travel management system provides gradation levels to each individual member and to each participating facility or service provider. The gradation levels are also assigned to travel facility employees and other workers on the travel facility such a vendor's and vendor's employees. As seen in FIG. 25, the set of gradation levels also varies for the participating facilities or service providers. A level of ranking for airports and passenger is similar to distinctions used today for hotels (a five star hotel versus a three star hotel), and airline classes of service (first class, business class, economy). The concept of gradation introduces a new AirportAmerica ranking—the more sophisticated the airport in terms of integration with the AA system, adaptation of the technology, and the streamlining of the processes, the higher the ranking that airport achieves. The same gradation applies to passengers-those who have passed the criteria on a greater set of criteria will have higher rankings than those who simply complete the minimum mandatory requirements of information. For example, a passenger may be willing to provide some but not all requested membership information. The more information that is voluntarily provided by a passenger, the faster the processing time is likely to be, but nonetheless the level of information provided is a personal preference of the individual member. In applying compliance levels to facilities such as airports, it is likely that some airports may be more nimble and able to adapt the technology infrastructure than others. It is likely that not all participating airports will be able to take advantage of all the technological advances facilitated by AirportAmerica at once. The use of Gradation introduces a spectrum of the amount of information and capacity to utilize the data. Individual members attain a higher level of certification based upon degree of individual disclosure and submission to governmental scrutiny beyond the minimum mandatory level of scrutiny. Airports and other travel ports can attain different levels of AirportAmerica certification. These levels of certification, referred to as gradation, are based upon the airport or travel port's equipment, data utilization, and so forth.

The various grades that are available will be both color coded (gradients of green where light green is associated with least amount of data or Level 1 and dark green is associated with the maximum level of data or Level 2) as well as identifiable by a numeric value associated with the level of certification. Gradation and Level of Certification are synonymous as used in this document. The level of gradation will be indicated on the member's OneTouch as a color and/or number.

From a travel provider or facility perspective, the certification process will be a source of pride for the facility. The certification level provided to a facility (i.e. airport, port, etc.) is another parameter upon which a traveler may base his or her decision to travel. A traveler may select an airport that carries a darker shade of green or greater level certification than one that is not certified at all or one that has a lighter shade of green or lower level of certification. This gradation information allows travelers to base their flight plans around which airports will make their travel easier by making the most use of their AirportAmerica membership. The certification-level data will be shared with a number of the Global Distribution System providers (such as Sabre, Worldspan, Amadeus, Galileo) as well as the variety of Internet based booking engines (such as Travelocity, Expedia, Orbitz and others of similar function). Thus, flights can be prioritized based on criteria such as "1—Non Stops First, 2—Highest Level of Certification Airport" (applies particularly to multiple airport cities such as the choice among LGA, JFK, EWR in metropolitan New York City). Knowing the certification levels or gradation levels of travel facilities and providers (such as airports or charter operators) enables the traveler to include this criteria in determining what is important to him/her in his/her travel. Different travelers may order the priority of these factors differently: to one person, gradation level of airport may be extremely critical, placing that factor as the top priority, while the second priority of may be direct (as opposed to connecting) flights.

Data is stored at the AirportAmerica central servers, available as an interfaced data record to other systems, and on a device such as a OneTouch that individual members possess. The OneTouch of the present invention will be discussed in further detail below. The following table shows examples of gradation levels. Level 0 is considered no integration with the AirportAmerica system.

TABLE 1

Example Components of Airport gradation levels

| Level | Associated Color Gradient | Description |
|---|---|---|
| Level 1 | Lightest shade of green | Kiosks are available in the airport which automatically logs OneTouch holders in<br>Ticketing and gate agents verify identity by looking at the OneTouch instead of for example a driver's license |
| Level 2 | Kelly Green | Curbside check-in, ticketing agents and gate agents can verify traveler and get traveler's information by swiping OneTouch<br>OneTouch can be used in place of a passport (passport information is located within the OneTouch) |
| Level 3 | Darker Green | Security clearances make use of facial scans and security scores |
| Level 4 | Darkest Green-approaching charcoal | Security clearances make use of fingerprints and retinal scans |
| Level 5, 6 | | Additional levels for additional system configurations |

TABLE 2

Example Requirements for Individual Traveler Members Gradation Levels

| Level 1 | Signed up with a simple name-based membership having taken a hologram picture for the OneTouch |
|---|---|
| Level 2 | Passport information is stored with AirportAmerica |
| Level 3 | Facial scans are stored with AirportAmerica<br>Criminal and credit history is accessible by AirportAmerica |
| Level 4 | Fingerprints and retinal scans are stored with AirportAmerica |
| Levels 5, 6 | Additional accessibility of information. |

The data to be collected about each member can be controlled on a member-owned basis. The member application requests many data elements. The data elements are either mandatory or optional. To attain a certain level of certification or gradation, each member is encouraged to complete as much information as possible. Mandatory elements will be stored in a secured, encrypted manner on the AirportAmerica Central Server. In addition to storing data that is also stored on the central server, the AirportAmerica member has an opportunity to store locally accessible data under "My Data Chip" that is available exclusively within his OneTouch discussed below or other devices with which the member may use to interface with the AA system. This unique concept can guarantee additional privacy of certain data elements of a person on a per-person basis. The "My Data Chip," as discussed below, stores data locally, (i.e. in the physical possession of the member) and not on the central server. The data stored in the "My Data Chip" is not included as part of the security level earned by the member. The data stored under "My Data Chip" is designed for personal, supplementary information, such as emergency phone numbers, pin numbers to certain favorite Web sites, passwords to particular financial entities, but not dynamically changing information such as passport or visa. The Gradation Level provides which level the member voluntarily selects to be included in. The higher the gradation level, the higher the level of expected benefits and level of expedited processing that member can anticipate. An example of an individual's member data profile is shown in Table 3.

TABLE 3

Representative Individual Member Data Profile

| Reference Number | Data Element | Example Value | Maybe Stored in central AA server? | Gradation Level |
|---|---|---|---|---|
| | | Level 1 Gradation | | |
| 11 | LastName | Bond | Yes | 1 |
| 12 | FirstName | Sharyn | Yes | 1 |
| 13 | aaPassword | &&**$^{AA}$%%$$ | Yes | 1 |
| 14 | aaPasswordHint-What is the Name of your pet? | Bikky | Yes | NA |
| 15 | PassportNumber | 1234589999 | Yes | 1 |
| 16 | Nationality | USA | Yes | 1 |
| ... | | | | |
| | | Level 2 Gradation | | |
| 20 | HologramHologram Picture | Image . . . © | Yes | 2 |
| | | Level 3 Gradation | | |
| 31 | Criminal Background: USA | No Record | Yes | 3 |
| 32 | Criminal Background-Interpol | No Record | Yes | 3 |

TABLE 3-continued

Representative Individual Member Data Profile

| Reference Number | Data Element | Example Value | Maybe Stored in central AA server? | Gradation Level |
|---|---|---|---|---|
| 33 | IrisScan | Iris Scan data | Yes | 3 |
| ... | | | | |
| | | Supplementary Data | | |
| 41 | PersonalCreditCard1Main- | MC--5555444466667777 | Yes | 2 |
| 42 | PersonalCreditCard2- | VI4444555566667777 | No | NA |
| 43 | My IDs and Passwords | Place to store required IDs and passwords for systems not fully integrated with AA | No | No |
| ... | | | | |

Table 3 shows data elements and example values for representative data that is provided to the system by an individual member. For each data element the gradation level and whether the individual member has provided permission for the data to be stored in the AA central server is indicated. For example, at data reference number 13 shows that the member has opted to enable the central server to keep a copy of her password. As a result, if she loses her password, it can be re-supplied to her. The password hint at reference number 14 would not be requested had the member chosen to permit the system server to store the password. Data may be stored that is not required to achieve a gradation level from the system. For example, at data element 41 this individual member has opted to store her main credit card and/or debit card information to facilitate purchases. She has also opted to store another credit card and/or debit card information on her personal OneTouch but not to share it with the central server. This choice does not impact her gradation level.

The gradation level of an individual member and of the facilities and service providers he potentially may use is an extra component for scheduling travel arrangements. The AirportAmerica system will choose routes which are the most affordable, fastest and most convenient according to the member's preferences, located in the member's profile. If a traveler and an airport have a high gradation level then that traveler would be considered a lower security risk and that airport would be labeled by AA as a higher level. In all likelihood, a higher gradation level member will seek the higher gradation airport as his preference for travel. The priorities of these components to scheduling will be determined by the member.

The AA service performs detailed verification in signing up and certifying smart card holders. Accordingly, authorities such as governmental, quasi-governmental or other security organization in transportation facilities are able to identify properly verified OneTouch holders as minimal risk. The risk of a AA member who has reached the highest gradation level, in particular, presents the most minimum of the risks. It is anticipated that the service will conduct background checks, secure information, and verify identity using procedures that permit the service to be certified, licensed or otherwise recognized by security organizations as providing reliable information. The system pre-clears its members and verifies their security profiles, identification information, and ticketing information to a degree higher than airport standards. Therefore, airports can give preferential security treatment to the AA i-card or certified OneTouch holders. This special treatment may include providing special lines for security checks on OneTouch holders. These lines are much quicker because the security check needs only require a retinal or fingerprint scan. In addition, the system immediately identifies fraudulent use of a card. If the identity of the card holder does not match the information stored in the system, the system immediately notifies authorities at the location of the fraudulent use of the card so that the fraudulent card holder may be detained.

OneTouch

A member can interact with the system by using any compatible portable access device. In this preferred embodiment an electronic wireless smart card 210 as shown in FIG. 26 is used. A preferred embodiment of this access device is referred to herein as the OneTouch. The OneTouch is provided by the service to member. The OneTouch is also provided to those workers who have access to secure areas of a travel facility. The OneTouch shows that the cardholder is a member and a safe and capable traveler with varying degrees of certification/gradation. The OneTouch is a flexible laminate, with a thumb recessed area on the back of the card that enables a non-OneTouch ATM card or credit card to be removed from the OneTouch case for use by older devices that cannot work with the more advanced OneTouch.

On the back of the card is located a programmable magnetic strip 229, a fingerprint image 224, power cells 226 and 227, a speaker and microphone 234, a solar cell 220, an "on" sensor 221 (aka "on" button), mydata chip 222, AirportAmerica smart chip 223, a bar code 228, a ringer and beeper 230 a cell phone connection 231, a data port such as a USB port 232, and a light 235.

The front of the card includes a camera 237 and a display screen that is incorporated into the full face of the card 236. The top edge of the card contains a projection device that can display a virtual keyboard on any flat surface. The card has a flexible, embedded polymer composite, ultra thin film transistor screen display, polymer silicon back-pane, and flexible circuits. A low temperature, organic, light emitting diode provides the technology platform with low profile miniaturized transistor stacks. The hardware can be flexed without damage; thus, the AA-member can put the card in his wallet without fear of crushing or otherwise damaging it.

The card may be structured like a sandwich. The top layer of the flexible sandwich contains the screen and the bottom layers the power source including the batteries. The optimum dimension of the sandwich is just slightly larger than a standard credit card and about six times as thick. The flexible sandwich may thus be seen as being made up of six layers each similar in size to a credit card. As shown in FIG. 28, a layer of the card may slip out of the sandwich that is the size of a credit card. The layer may be used in a credit card or ATM machine. Other layers may also be removable. For example, the OneTouch may include a removable layer that includes an identification transponder. Such a transponder could be left in the members car in a parking lot and then used to locate the car upon return of the member through communication with remaining layers of the OneTouch which the member carries. There are several ways to enable the release of one of the cards within the encased OneTouch. When the card is released, it can come out for use by older systems that cannot accept the size or technology of the OneTouch card.

Power Cells.

The power cells 226 and 227 are rechargeable lithium ion batteries or similar sized batteries of other materials that clip or are embedded into or onto the back of the card. Because of the very low power requirements of the OneTouch due to its size, the batteries are very thin. In another embodiment, the batteries can be recharged in three or more ways. First, a solar cell 220, located on the back of the OneTouch, supplies power and recharges the battery. Second, the RB (ringer/beeper device 230 and 233), explained in more detail below, can clip onto the OneTouch and provide power to it when the ringing device is plugged into a power outlet with an adaptor cable. Third, the ringing device has an additional built-in battery.

Display Screen.

Figure 27:
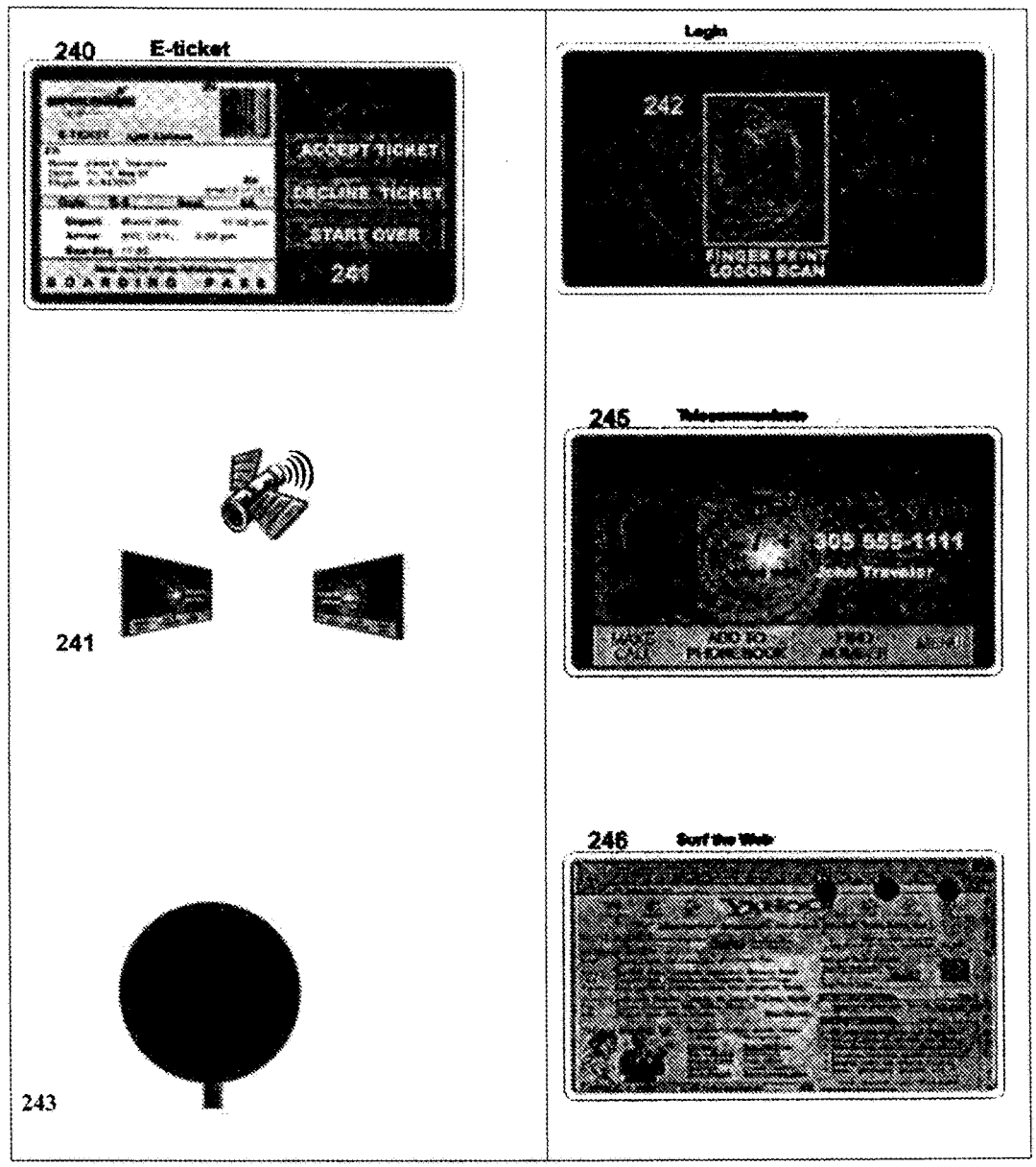
FIG. 27 shows additional screens of the OneTouch as well as how the OneTouch can morph into multiple views.

The display screen is flexible, durable, thin and requires very little power. Electronic ink technology can be used in place of a traditional LCD screen. This technology allows flexible screens taking up only half the thickness of the OneTouch. The screen allows the OneTouch to change the appearance of the card, as shown in FIG. 27. For example, the screen may display ticket information 240, login commands 242, stored information such a phone records 245, and web-pages 246 including those provided by AA. The screen allows the OneTouch to provide the information regarding the traveler and the traveler's plans at the time that it is required. For example, access to information on the OneTouch is secured as discussed below, accordingly OneTouch may function as a passport or other identification card by using the screen to display secured passport data stored in the OneTouch chip as described below.

Power consumption is reduced considerably when compared to a traditional LCD screen. An LCD screen requires a lamp to provide light from behind the screen, typically known as a backlight. Electronic ink doesn't require a backlight. Additionally, once a pixel is charged it no longer needs power. So if the display needs to display a specific image, like the front of a credit card, for an extended period of time, very little power will be drawn.

Keyboard.

In one embodiment, the OneTouch uses a roll-up keyboard, such as the keyboard available from Think Outside, Inc., 5790 Fleet Street, Suite 130, Carlsbad, Calif. 92008. Alternatively, the OneTouch uses Cirque's GlideTouch Micro Keyboard with the PCB (printed circuit board) in the OneTouch to allow for the GlidePoint surface to roll up, available from Cirque Corp., 2463 South 3850 West, Suite A, Salt Lake City, Utah 84120.

The OneTouch may have an overlay virtual keypad that appears on the screen with the standard numerical keyboard, alphabetical keyboard, or other functions and command buttons, all of which are hidden until called up by the AA member. The screen may be utilized for Internet viewing, as seen in FIG. 27, 245, identifying data, viewing photos, and so forth.

In yet another embodiment, a red laser diode and detector is situated beneath the lens of the projection device to provide a miniature built in optical mouse for scrolling up, down, right, and left, and for clicking functions.

Solar Panel.

The solar panel is located on the back side of the OneTouch (FIG. 27, 220), requires a voltage regulator to regulate the amount of solar power distributed to the system. This will be a miniaturized version of typical solar panel voltage regulators, such as those available from High Sierra Electronics, 13355 Grass Valley Ave. C&D, Grass Valley, Calif. 95945.

Programmable Magnetic Strip.

The programmable magnetic strip on the back of the card is located 3/16" from the top of the card, exactly like standard credit cards as can be seen in FIG. 27, 229. The magnetic strip provides the back up system for electronic transfer The OneTouch is compatible with existing, standard credit card and/or debit card machines.

Waterproofing.

In one embodiment, the OneTouch is protected from water damage with a waterproof laminate. Only two copper contacts for each of the three ports, which provide access to a speaker, a camera, and an infrared device, will protrude out of the laminate to be able to recharge the battery. When the device is not on or detects a short circuit between the two contacts, it will open the circuit. The contacts are typically in the "open" position, preventing arcing in a moist or wet environment. The depressing of the "on" sensor 221 closes the circuit, rendering them operational.

In another embodiment, the OneTouch is non-waterproof, thus allowing for upgrading the SmartChip to models of the chip with enhanced features and capabilities. The SmartChip is the CPU and memory (random access and non-volatile) of the OneTouch. This OneTouch can also be made waterproof by enclosing it in a removable waterproof encasing like the many available for Palm devices, such as the products available form Man & Machine, Inc. 3706 West Street, Landover, Md. 20785.

Biometric Devices.

The biometric devices on the card allow a card owner to prevent access to the card by anybody except himself. The biometric information can be downloaded from the AirportAmerica central server where it was entered at least once when the member signed up for the card and service.

A camera 237 on the top edge of the card is used for retinal or facial scans. The camera has sufficient resolution to clearly distinguish the 40 distinguishing facial spots. The 40 different regions of the face are compared to the highly detailed facial scans on file inside the device. The camera is used for gaining access to the card itself. A score is computed based on how closely the facial scans represent those on file. The owner of the card can set the score threshold that allows access.

A fingerprint scanner 242 is used to make sure the fingerprint is the owner of the device's fingerprint 224. Like the camera 237, the fingerprint scanner 242 is used to gain access to the card. The logon to the system can be done by simply touching the OneTouch, Any finger can be used, making it more difficult for unauthorized people to gain access.

A key point in recognizing the unique characteristic of the AirportAmerica approach to the security options is that there are multiple approaches that together can be utilized to provide multiple backup. Thus, the system is more reliable than if it relied upon a single technology. For example, if face recognition is found to be less desirable or less reliable than another supported method then the overall objective of improving the traveler experience and providing security is not compromised. In addition, AA continuously monitors improving software, new technologies, and countermeasures. As these technologies become sufficiently proven, as judged by AA, they are shipped as new chips to AA members holding non-water proof cards and in due course new cards sent to those holding waterproof cards.

Video Conferencing.

The one touch contains audio/visual capabilities to communicate with other OneTouch holders and other devices communicating with compatible protocols via audio and video. As can be seen in FIG. 27, 241, it is possible to have two AA members communicate with one another via their OneTouch's. In FIG. 27, 245, you can see the image of a person to whom another member may be communicating. In another embodiment, an add-on device will be available to connect to the OneTouch (via the data port, 232) to a TV. This will allow OneTouch owners to display their screen on a bigger device like a monitor, TV or even projection TV. This will also facilitate video conferencing. By receiving a video feed over the wireless internet connection, a OneTouch can use its internal video camera to communicate with others by audio and video.

In one embodiment, the ITU H.323 standard for audio and video conferencing will be used for handshaking, call control protocols, sequencing and compression. The audio portion of the H.323 protocol and aa's video conferencing system can be turned off to maximize video bandwidth. Conference members can then communicate by voice through the OneTouch's cell phone.

Voice Recognition.

The OneTouch uses standard voice recognition software; thus, voice commands are translated to text and entered as if the user had typed the text in. A member may say, "phone," and the OneTouch will load up the phone application because that is what happens when "phone" is typed while the user is not inside any specific application. The OneTouch voice recognition is based on technology where speech can be translated to text. However, the card recognizes the speech patterns, style, and voice of the user. The user simply selects simple voice commands from among a pre-programmed vocabulary and the computer interactively responds with the voice that the user selected from a set of voice styles. A wide variety of styles are available through the Valet4u feature described below. In addition to text or voice, a set of "short cuts" or commands will enable direct access to frequently accessed places. For example, a user will be able to not only say "Phone", but will be able to combine that with "Phone Dave". A large vocabulary of short-cuts will be provided based on frequently requested transactions of a traveler.

If the presenter is attempting to access the information and services stored on or via the OneTouch and there is a match, then the presenter proceeds to the next protocol, if there is a match, the protocol "AA—Voiceprint-IDU" opens with prompt "VoiceIDU" and the member responds with his audio code name, and if there is a 3 way match the screen opens to the various categories and the member retrieves the necessary information from the screen.

Phone Functionality.

The OneTouch may function as a phone, similar to existing cell phone/personal digital assistant (PDA) combination devices and uses existing software for this function. When calling AA using the OneTouch for making reservations or other reasons, AA assumes the cardholder's profile based on the caller id information indicating the cardholder's OneTouch number. The OneTouch includes a transceiver such as an integrated phone for communicating with the central server through a wireless communications network, such as a cell phone network. The card also provides Internet access similar to existing PDA devices. The cardholder has the option to access the system web-sites by using the card's built-in Internet browser. When the cardholder uses the card to access the Internet, the card automatically logs the cardholder into the system using the member's identification and password, and cross checks that information with the member's pin number, which are stored in the card. This can be seen in FIG. 27, 246. When the cardholder uses the card to make travel reservations, the process is expedited because the cardholder's preferences and payment settings are already stored and ready for use.

Data Transfer.

In another embodiment, AirportAmerica OneTouches can communicate and transfer data to other AirportAmerica OneTouches via infrared. This function is similar to the technology used in PDAs, using the similar software.

The OneTouch may be placed in a cradle which connects to a computer with a USB port. This type of cradle is similar to the type that PDAs use to share and transfer data. The chosen handheld operating system and the OneTouch are mutually compatible.

The OneTouch may communicate with the Global Positioning System (GPS). The inclusion of a GPS receiver permits the OneTouch to function as a GPS device. The GPS system tells the OneTouch where the OneTouch is located. The OneTouch continually polls the AirportAmerica central server for email and to inform the server of its coordinates. The central server can then send it appropriate travel notifications, by email, instant message, beeper, phone or other similar methods based on its location. An extension of the OneTouch GPS positioning is the enabling of pinpointing exact locations of a targeted person or place about which the traveler needs to know.

Ringer/Beeper Device.

With the card, a separate device 247 is provided that clips to the cardholder's clothing and notifies the cardholder of a call, voicemail, message, or email as shown in FIG. 28. This ringer/beeper device uses a standard lithium photo battery and communicates with the smart card via a specific radio frequency. Thus, this ringer/beeper device allows the cardholder to receive notifications even when storing the card in a purse or wallet. This can be seen on FIG. 26, 233, and FIG. 27, 243.

In one embodiment of the invention, the ringer/beeper device is a clip-on device that attaches to a watch or an article of clothing. In another embodiment, the ringer/vibrator is also used as a wired interface 233 with other systems as shown in FIG. 26. This feature is possible since the ringing device communicates with the OneTouch wirelessly and can take on different shapes. In yet another embodiment, the ringer/vibrator device will have a built in USB port and power connector. The power connector allows the ringing device to recharge itself and recharge the OneTouch by clipping on to the OneTouch while plugged in.

The ringing device can also function as a speaker and microphone to make phone calls while the OneTouch is inside a wallet. For secure access to the telephony features of the ringing device, a fingerprint mechanism is present as on the OneTouch. The telephony features of the ringing device are used through voice information and voice commands that are communicated with the OneTouch wirelessly.

Figure 35:
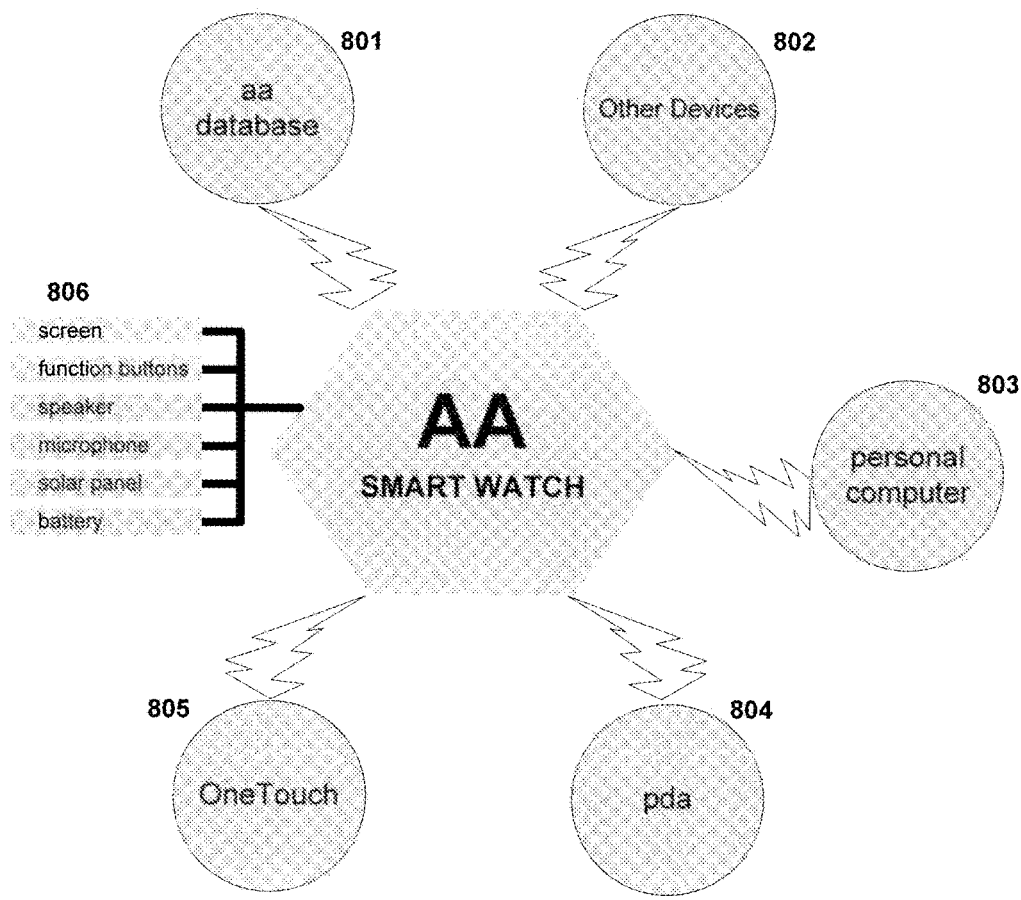
FIG. 35 shows a variation on the OneTouch represented as a smart watch.

To hide the appearance of the ringer/vibrator device and to make it more appealing to wear, the device will also be available in the form of jewelry such as an earring. A watch can be used for the ringer/beeper device as well. Because the watch can be directly viewed by the wearer, video conferencing can be relayed from the OneTouch to the watch along with the other information being communicated between the two devices. See FIG. 35.

In another embodiment, the piece of jewelry is simulated by the ringer/beeper device. The device is a pin, and the face of the Smart pin has a display feature that is adaptable, changed or altered such that various displays can be transferred from the Internet or from the OneTouch or from other devices to suit the member's preferences. The pin becomes decorative and can simulate jewelry or other devices.

To help prevent the loss of the ringer/vibrator device or the OneTouch, both devices will ring when they are separated beyond the distance through which they can communicate. One embodiment of this feature includes either radar or ultrasonic sensors and a digital readout indicating departure distance. The sensors activate an alarm, such as by ringing the ringers on the OneTouch and on the ringer device, when they are separated by more than a preset distance. Both the ringing device and the OneTouch continuously poll each other to obtain their status. In another embodiment, if the other device does not respond, the polling device rings a specific tone. The OneTouch can be set to not ring in situations when ringing device is not used. Each device may be calibrated to ring when the devices are in excess of the calibrated distance (FIG. 28). For example, the calibrated arc may be set at 125 feet, so that when the card and ringer device are 125 feet apart, the ringer device rings in short bursts, a reminder to turn back and retrieve the card.

Compatibility with Other Devices.

The OneTouch can interact with other mobile devices in an intuitive way. It can team up with the cell phone by simply dropping it in a slot behind the battery of a cell phone which has been retro-fitted with a snap-on-cradle that snaps over the cell phone and flexes back into place, firmly grasping the phone in a bear hug. The OneTouch is compatible with leading OneTouch scanner software systems, codes and most other data transfer devices. It can be connected to the AA-member's PC with a cable via OneTouch adapter which crimps down via an alligator clamp connection over the fitting on the side of the OneTouch. The OneTouch is a USB plug and play device and recognizes other plug and play devices.

Wireless Transactions.

The OneTouch has the capability of making payments over the internet when connected to a computer and of wirelessly transmitting data when presented to the point of sale terminal.

SmartChips.

The OneTouch may accept two specialized chips. These chips segregate, store, and process data managed by the OneTouch. The chips enable the OneTouch to be easily upgraded and replaced by providing chips that implement improved procedures, protocols, and technologies and respond to changing conditions. The OneTouch is thus fully adaptable to emerging technologies and changing environments by replacing these removable chips.

These chips can be removed from the OneTouch card and used in converters that attach to other devices such as cell phones, iCell and other wireless integrated interactive internet devices. In this way, a popular cell phone can be used as a partial OneTouch.

The SmartChip is the CPU and memory (random-access and non-volatile) of the OneTouch. The memory included is sufficient for the operation of the functions of the OneTouch. For example, additional memory may be required to support the valet4u option described below. The SmartChip controls all the functions of the OneTouch including encryption. Both the SmartChip and the second MyData chip can control the OneTouch. To solve conflicts between the two chips, a switch is on the OneTouch to switch between them.

The technology in this area is dynamic and the OneTouch, like AA itself, is dynamic, flexible so as to take advantage of improvements in technology and other changing conditions. For this reason, the OneTouch is modular and AA, ever vigilant, replaces modules, except in the case of the sealed waterproof card, in which event the whole card is replaced. The replacements modules contain the latest upgraded chips or other components as appropriate. As the leading edge of technology reveals new opportunities to advance the cause of seamless air travel and seamless living, AA sends replacement chips to the AA—member who removes the outmoded chip by sliding it out of the slot and sliding the new chip into the now empty slot. The hallmark of AA is adaptation as needed to advance the cause of making the travel, airport and life experience for the AA member, aa-Airport member and the general public ever more seamless.

There is a great variety of information that may be stored as part of the member's supplementary data that could be referred to as "My IDs/Password Bank". Providing an area to store supplementary data that may be of great benefit to the busy AA member is that the system will store a set of user ids and passwords for systems that are not fully integrated with the AA system. We refer to this under Table 3 in the area described as My ID/Password Bank. This handy feature helps the members who are anticipated to need information regarding a growing number of systems with which they interact (bank PIN numbers, Internet membership site ids, etc.). Now all the member needs to do is to go to My ID/Password Bank for a view of what has been provided to other systems. The information of My ID/Password Bank is stored under My Data Chip.

In an additional embodiment the OneTouch may include another CPU/memory/storage referred to as the MyData chip 222. A switch on the OneTouch is pressed to switch between the SmartChip and the MyData chip. For example, the MyData Chip may be locked and accessed by the member using a separate finger for fingerprint authentication, and in addition may either make a voice command using the voice password, and/or use a written code that the member has pre-selected and programmed. For maximum privacy and security protection the MyData chip is not internet ready and is not connectable to the internet or networked with the other chips on the card, but is connected directly to the screen through its own open connectors. An appropriate fingerprint on the MyData Chip closes the connection and opens the screen.

The MyData chip will itself authenticate the user as the cardholder to allow access to the MyData chip. The biometric template is stored on the member's MyData chip and the AA member places his finger over the embedded fingerprint on the aa-MyData chip for a match. A separate digit is used for authentication and identification at points of secure access. The member presents the appropriate digit at the access control checkpoint. A three way comparison is made to determine a match; the embedded fingerprint within the card, the corresponding digit of the presenter and the member profile on record at the AA-portal. A fourth match may be local access control, which may be used for peak security, variation, etc.

In this embodiment, the OneTouch is delivered with the MyData chip embedded in it. It contains a template with pre-defined categories, where personal information may be stored in formatted categories. AA has initially identified 13 categories (identified in Table 4 below). As the need arises, AA adjusts the number of categories accordingly. When the member receives the one touch, the member fills in personal account numbers, balances and other confidential bank account data into this category via screen input or telephony. The categories in MyData Chip are listed in table 4. The data that is stored under MyData chip that are not on the central server are not included as part of the security gradation levels for the AA member. The member can feel confident that certain personal information is exclusively available to him and not stored on the central server.

TABLE 4

Representative Portable Data Chip Data Slots

| Slot No. | Information type |
| --- | --- |
| 1 | Emergency Information |
| 2 | Driver's License data |
| 3 | Password storage or hint to recall password |
| 4 | Bank accounts data. |
| 5 | Critical medication information |
| 6 | Blood type |
| 7 | Voters registration information |
| 8 | Cash card information |
| 9 | Credit card and/or debit card information |
| 10 | Insurance information |
| 11 | Social security number |
| 12 | Codes for car keys, office keys, other important keys. |
| 13 | Miscellaneous |

When the cash card information of slot 8 as shown in Table 4 is stored the AA member can use the OneTouch as a cash card via links with world ATM providers such as PLUS, INTERLINK, CIRRUS, STAR, PRESTO, HONORS, etc. By inserting his card into an ATM he can access funds from his account from any banking institution or ATM in the world. Members may also elect to add a predetermined amount of money onto his card for use in his/her travel (ie, before going on trip member elects to transfer $1,500 from his personal acct onto his OneTouch and as he uses the card during his travel, expenses are automatically deducted from the $1,500 placed on the card before departure).

The AA member may elect to put credit card and/or debit card information in slot 9 of his MyData Chip, the chip is not connected to a modem and the information stored thereon can only be accessed by the AA card member. The member may bring up the stored data by first accessing the OneTouch and displaying the credit card and/or debit card information on the smart card. Information that may be displayed includes the card issuer, account number, credit limit, amount outstanding, and other account information.

The AA member may elect to put insurance information in slot 10. Such information may relate to insurance policies such as life, health, auto, homeowners, commercial, etc. The stored data may include insurance policy identification, coverage, renewal and other information as well agent or other contact information.

Slot 13 is user definable to allow the AA member to store other data on the secure MyData chip. Slot 13 may store data from whatever source the member may elect.

Point of Sale (POS) Transactions.

Purchases may be made by the AA member by powering up the OneTouch through voice commands, calling up the credit card and/or debit card of choice, approaching the POS terminal and pointing the OneTouch from a distance within six inches of the POS terminal port. The OneTouch includes a transponder for interacting with the terminal and may initiate transactions with the terminal. The data required to complete the transaction is wirelessly beamed to the POS register when so presented to the POS terminal and the member may ask for a paper copy or have the receipt for the purchase beamed to the receipts section of the AA Chip or have it scanned into the MyData chip.

The card communicates wirelessly and through direct contact. It makes contact through the card's conductive micro module on the card surface with contact points through which data may be transmitted, commands may be issued, and card status and other information may be updated. As a contactless device, the card has an internal antennae for communication with the reader. This internal antennae provides a power source from electromagnetic pulses it receives. The card requires close proximity (to within 6 inches) of the reading device to exchange data and record transactions.

In addition to providing members with smart cards, the service maintains an airport employee OneTouch or i-Card system. The employee OneTouch system is virtually the same as the system for system members, and the service requires that all employee OneTouch holders comply with the same uniform security standards.

Security

Access to the OneTouch is granted after a series of verification procedures are performed to insure that person trying to access data is indeed the authorized user. Step one is the placement of a pre-selected finger on the fingerprint chip for verification and authentication. Once the identification has been verified OneTouch unlocks and grants access to system features.

The security features include embedded sensing services and biometrics, including, fingerprint detection devices, voice recognition system, and/or encrypted space that can only be accessed through positive fingerprint match.

The one touch can be fitted in a slot on the adapter provided by AA on the side or back of cell phones or other wireless internet device providing a connection from the OneTouch to cell phone or other device or attached via cable to the PC and information can be downloaded from the user's internet or PC. The software automatically encrypts and decrypts files stored on this space and a pin number which may be deactivated for the AA-Chip with the features listed below Access to the OneTouch.

The owner of the card can restrict access to the card's information in several ways. First, the user may require that the fingerprint scanner obtain a fingerprint matching the owner's fingerprint before the card is activated. Second, the camera on the top edge of the card is used for facial or retinal scans. The camera has enough resolution to clearly distinguish the forty distinguishing facial spots. Finally, one can download from the central server a member's biometric information.

System Integrity.

To maintain the integrity of the system, the AA system will reject membership applications from identified high security risk individuals. The system pre-screens with CAPS using a secret and secured encrypted algorithm. The system compares the presented documentation of potential members (finger scan, etc.) with a database of known terrorists and suspected terrorists, which may be obtained from the FBI and other governments agencies. The CAPS system selects those who will be diverted for a more comprehensive security check. The membership screening pre-clears AA-members who may then be expedited through the security checks such as at airports.

AA Application Process.

The method and process of application to membership in AirportAmerica involves submission of minimum mandatory documentation for use in verifying the identity of the applicant and that the applicant's record is clean and there are no other conditions adverse to the standards of AA. The various identification processes include without limitation various biometric scans, such as fingerprinting and other tests and scans. The applicant's identification process is used to research law enforcement and other database for independent verification that the applicant has no criminal background or other conditions adverse to the minimum mandatory standards, thus creating a comfort level amongst other members, passengers, security personnel, etc. This certification by AA enhances the seamless travel experience. The AirportAmerica membership applicant fills out a membership application which includes the prospective member's agreement to submit to an FBI and or other governmental background check and governmental security clearance approval prior to the AA applicant's acceptance as member. This includes continuous submissions as necessary in order to maintain the clearance necessary for the privileges associated with the member's selected level of gradation. At the highest security clearance these privileges include expedited security clearance through airport security by using electronic scanning and other imbedded features of the one touch. The one touch operates varies AA functions including the security related functions. Expiration of the one touch is two year unless lost, stolen or upon notification by AA of earlier expiration.

The process is also used to certify employees at the travel facility. Vendors and vendor's employees may also become AA certified. In the highest security facilities no access to secure areas is provide with a OneTouch or similar card verifying AA certification. Accordingly, AA may obtain information and maintain a profile on each travel facility worker similar to records and profiles regarding traveling members. These worker are issued OneTouch or similar card for identification at the travel facility.

Access Key.

The smart card also functions as an access key to a kiosk. The kiosk is an enclosed desktop computer with a web browser, which points to the system homepage. By swiping or sliding the card in the scanner at the kiosk, the member has the option to log in to the system. The web browser points to AirportAmerica's homepage. Travelers can slide their OneTouch in the kiosk to enter the traveler's login information to the website. From a kiosk, a traveler can do anything they normally do on the AirportAmerica website.

Security Card.

Furthermore, the OneTouch may function as a security card. The service only issues a OneTouch card to a member after performing an extensive security and background check of the applicant. Each OneTouch is associated with a single individual on whom the system maintains information. The individual's identification information is stored in the memory of the OneTouch. The OneTouch includes a security screen as shown in FIG. 29. This screen includes a hologram of the member 247, a fingerprint of the member 248, indication of the gradation level of the member 249, and textual identification information on the member 250 such as the members name and address. Therefore, if security personnel can verify that a OneTouch cardholder is in fact the owner of the card, then the security personnel will have confidence that the cardholder is a safe and capable traveler in accordance with levels of gradation 249 as described earlier. In this manner, the OneTouch can also be used to verify base identification data such as passport or driver's license information and other documentation data such as ticket information. This information may be displayed on the screen of the OneTouch after being verified by the AA system.

In an example of the OneTouch used a security card, security personnel at a security checkpoint in a travel facility such as an airport checking a traveler with the highest level of gradation would follow the following procedure. The verification of the identity of the cardholder involves a three-step process. First, a the third-party security employee checks the hologram animation 247 on the back of the card to verify that the individual looks like the certified cardholder. The hologram 247 is a five to ten second, or other duration, three-dimensional video animation of the traveler looking forward, profile, then turning completely around and smiling. The third party security personnel can then ask the traveler to make the same motions. Second, the security employee places the card in a system certified terminal or card reader, similar to existing card readers. The card reader connects to a system certified third party computer, executes scans of fingerprint and/or voiceprint, depending on the protocol in place at that AA airport at that time. The third party computer connects to the AA system central server using a two-way SSL connection for both connections. The OneTouch sends the encrypted id and password to the third party computer, which then verifies that the OneTouch is in fact a genuine OneTouch issued by the service. As the third step, the terminal includes a biometric scanner or reader and the third party computer submits biometric information obtained from the traveler, using system certified biometric and other identifying, verifying and authenticating information gathering devices, to the system central server as a web CGI query to verify the authenticity of the traveler. The system compares the submitted biometric information with the certified member's biometric information stored in the system. The biometric information that may be used to identify an AA traveler may include without limitation, the following embodiments: fingerprints, facial scans, iris scans, and DNA information.

The system comparison may use three-way matching. For example, when proceeding through a security checkpoint the presenter places the OneTouch on a scanning device and the presenter's fingerprint, iris scan, facial scan, or other identification data is obtained. The system compares this data obtained from the presenter with the information stored on the OneTouch, and the member's identifying information on file with AA at the AA portal. The card can take on a different host as the card or chips are placed in other wireless devices (cell phone, PDA, etc.) so long as the minimum three-way match protocol is preserved. The determination of which mix of security checks shall be conducted is configurable to preserve the integrity, reliability and member value of the AirportAmerica system.

The three way positive security protocol of the present invention requires a match of personal identification and authentication information of the OneTouch user-presenter, AA hub, and the OneTouch. If there is a failed match of any part of any of the three match-ups, the match fails, access is denied and the card flashes code red.

Presenter—Fingerprints, voiceprints, facial scan other scans, digital and biometric matches to enhance authentication of the card presenter as the AA member tests AA Profile at AA Portal;

Smart Card—Fingerprints embedded as biometric template, digitized voiceprints, digitized facial scan and other digitized and biometric templates imbedded in the OneTouch and AA Profile—Fingerprints embedded as biometric template, digitized voiceprints, digitized facial scan and other digitized and biometric templates in the member profile on file with AA at the AA Portal 1 OneTouch.

From finger-scan chip on OneTouch or AA SmartChip to AA Portal and following receipt of this information there is a three way match of:

Presenter—Personal positive identification, authentication (voiceprint, fingerscan, etc.) of Presenter of OneTouch, and OneTouch—OneTouch information on OneTouch of presentor, AA Profile on file at AA Portal—Information in Profile file of member matching the card being presented at access point and the information received electronically from the card presenter for authentication of the card through from information transmitted via scanner and other devices through the internet and other means to file the AA member profile on file at AA hub.

At the point of entry the OneTouch can identify the one in possession of the card as the rightful owner by making a match between presenter (by use of biometrics digitized scanners and other situational downloaded data), scans, pin numbers, trip pin and other authentication information. The system thus identifies the AA member with accuracy, while detaining the AA member no more than a few seconds. The process of positive identification of a presenter of a OneTouch as a certified AA member is completed with speed and accuracy. The presenter as a member of AA in good standing is quickly cleared to proceed through the security checkpoint.

Local authority match—A local authority match may be added in addition to the above three-way match. This protocol involves the same procedures as the three-way match described in the preceding paragraph with the additional participation of the local security attendant and or automated computer system. The security personnel have local scanners, fingerprint devices and proceeds makes a physical comparison between the holographic image on the card presented and the facial and other features of the presenter.

Hand Scan.

The OneTouch provides additional security features while traveling. The iris scan, retinal scan, photo scan and profile details revealed by the bar code are on record at the AA headquarters with the central server. When a passenger in possession of a OneTouch goes through airport security the OneTouch is placed on the scanning device by the member at the valet or the ticket counter, again at the entry point to concourse, and again at the gate. This presentation is accomplished by placing the card on the glass of a mechanical device that resembles and is operated like a credit card and/or debit card device. As the member places the card on the glass face down, the passenger places an index finger on the glass of a fingerprint analysis scan device and submits to a 2-6 second photo/video scan. The handprint and photo are digitally compared to the photo and fingerprint on the card. The card scan is intended to check identification of the user against the information on file in the AA central database and the information stored in the OneTouch. Of all three matched are made then the card activates the opening of a double-door entry gate. If any of the card identification features differ from each other or the information on file in the AA database, the computer automatically rejects the card and the entry gate to concourse of gate does not open. For example, upon successful matching of card identification with information on file in the AA database by security systems, if the photo is altered on the card, when the card is placed on the identification scanning device it scans the photo and produces a digitized facial contour scan of the user. The resultant scan is compared to facial contour of user and uploaded to the AA central server and compared with photo information on file. If any of the three matches fail, the AA central server transmits a no match signal to the security station and a code red flashes on screen of the security checkpoint and an alarm is activated. The double gates remain closed. Self contained embedded fingerprint verification module in the OneTouch is compared with the user's finger scan which is simultaneously electronically submitted to the FBI or other appropriate federal agency. The facial recognition and retina-iris scans use a video camera to identify the card user, who is asked to face the camera. There must be a match of all three systems. The user scans must match prints and profiles stored on the OneTouch, the profile on file in the AA central database and simultaneously the information maintained with the FBI or other governmental agency.

Use of Deactivated Card.

The OneTouch also contains a built in chip that can deactivate the card or transmit message via automatic e-mail when swiped through the card swipe device. The swipe of the invalid card automatically transmits a signal to the AA central server, triggering a code red. Upon this trigger an AA agent notifies security agent at the facility where the card was swiped (such as at an airport concourse security checkpoint) and authorities the detention of the holder of the OneTouch. The notification, for example, includes a message alarm informing the security agent "hold for interrogation and call this number." The proper law enforcement offices such as the Federal Marshall or Office of Homeland Security may also be notified. The AA system also causes the upper left hand corner of the card to flashes red. This can be seen on FIG. 26, 235.

If the card is rejected for non-payment of AA fees or other non-code rejection criteria, then "technical difficulties" or "member card is temporarily invalid, please manual check" message is flashed across screen, with no code red and card fails to open gate.

Tracing.

The OneTouch has two independent imbedded customer identification numbers from independent locations unconnected with each other with firewalls that prevent tracing. Each pin # is matched by scanner with the pin # on file at these separate locations. If one location is compromised, the other location still must be located and compromised for a fraud or forgery to occur. The prospective member is run through FBI and Interpol and local police checks for all locations the user has lived for last 5 years prior to filing of the application.

Perimeter Security.

Figure 36:
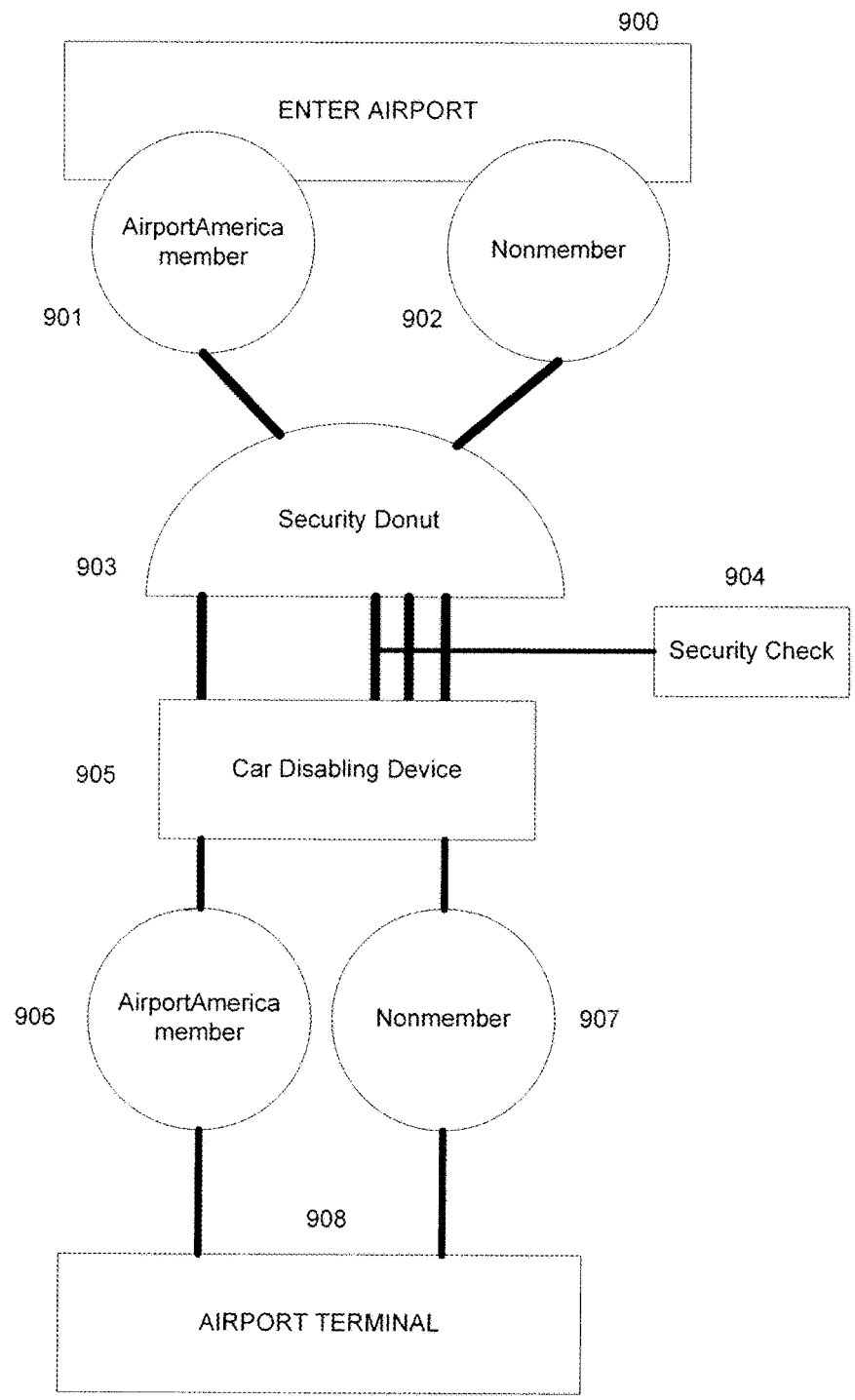
FIG. 36 shows a representation of the perimeter security system including a donut of security where all vehicles must pass to gain access to the airport.

The AA system may also be used to provide perimeter security at travel facilities such as airports. The system sets up remote monitoring for designated airport and governmental personnel of all check points, all secure entry points, and the tarmac area. The AA system may monitor all those who have business at the airport, by monitoring perimeter control points through which all those entering the airport must pass. An exemplary perimeter control point is shown in FIG. 36. All those who drive through an airport entrance 900 are routed to an auto-scan donut 903. Different paths may be provided based on preliminary security sorting. For example, a route 901 is provided for AA members and route 902 is provided for non-members. The auto-scan donut 903 is a donut shaped scan ring equipped with sensors such as circular shaped radar and explosive detection scanners. The auto-scan donut checks for explosives and weapons including nuclear, chemical, biological weapons. All vehicles proceeding through to terminal area must pass through the auto-scan donut 903. The auto-scan donut 903 analyzes cross-section images and comparing their CT properties with known explosives, weapons, weapon profiles, bomb components and other objects rejected by the automatic inspections algorithms. The remote attendant in security station 904 activates and deactivates gate and security operated tire poppers 905 as necessary. Those passing through auto-scan donut 903 may be routed based on AA criteria. For example, different routes 906 and 907 may be provided to the airport terminal 908 based on directions given at auto-scan donut 903. Security is provided in concentric rings, each successive ring providing tighter security. The highest security protocols are present at the gate and, in the case of employees and vendors, at the ramp and tarmac/runway areas.

Blue Light Emergency Wireless Phones are in blue boxes and illuminated by a blue light on top of the box are used along the perimeter of AA secured facilities. They are located every 750 feet along the perimeter of the airport and other strategic airport locations. To operate, the call box door is opened and the receiver is simply picked up, it automatically and immediately connects to security through a main control room dispatcher who is required to pick up a loudly ringing phone before the end of the first series of loud rapid rings. The call is monitored by other appropriate law enforcement agencies. The blue light phone notifies the AA hub. If not picked up locally at a predetermined number of rings, the phone switches to audio-visual through a webcam. AA then activates phone alert systems that notify local authorities, including the airport security and police departments.

Security and police Cruisers and other airport personnel in the sector of blue phone call are automatically notified by alarm signals in their phone emitted from the blue phone. Personnel arriving at the scene of blue phone alarm deactivate alarm by flipping the hidden alarm switch.

An AA-Pulsed infrared Perimeter intruder detection System is integrated into the communications and airport intranet. The AA-Pulse Infra-Red Perimeter System using infrared beams with range of approximately 1000 to 1500 feet with a self diagnostic system, for parts malfunction, to distinguish difference between animals and birds and other environmental risks and other false alarms from intruders. Cast aluminum detection boxes and fence assemblies include sensor equipment and may be easily mounted on existing poles or new poles in the fenced or unfenced perimeter. Sensor systems are monitored from the control room and system information is displayed on a graphic map. Transmission is from the pole mounted wireless transceiver to the control room. Transmission may also be to mobile tracking maps in palms, cell phones and other hand held wireless devices. The control room enunciator panel or monitor and mobile security personnel respond when a green light at a specific station on the display graphic map is replaced by a red flashing light indicating that some non-environmental intrusion has breached the perimeter at that point. At point of intrusion tungsten or sodium vapor lights go on and adjacent red flashing bubble lamp begins to rotate. In the control room an alarm goes off. Includes tamper proof and battery pack back up. The alarm is interfaced with sector patrol unit wireless communication devices to electronically notify those personnel in the sector of the breach.

A non-lethal Electrified Perimeter System, comprising a single strand or more are interwoven in the existing fence, is also present at the perimeter. The electrical current is turned off but is self-activating. The electrified system, detects, deters, defends and denies access.

XML Interfacing.

The central server uses a secure XML browser interface as well as other mechanisms to provide interfacing to disparate systems. The Central Server of AirportAmerica can interface with any system that provides an XML interface by utilizing one of several XML-translate products (such as those provided by Reference Pass Consulting or Hubx). These products enable any system to interface with any other system based on a common set of functions specifically geared for the travel industry and based on the Open Travel Alliance where possible. These interface products enable the AA system to interface to airline, GDS, and other travel provider systems if their systems provide a structured XML set of transactions, EDIFACT messages or even non-structured host based systems where screen-scraping is the only option.

Trip PIN.

Each reservation has a unique AA Trip PIN # which codifies reservation, identification, etc. Each trip is provided a "trip pin number" which is an encoded e-ticket stored within the OneTouch as an encrypted hologram and as a temporary icon on the face of the OneTouch as identification. The trip pin number is only valid for the trip to the destination. The return trip requires a new trip pin number.

Data about Passenger Travel Habits

A byproduct of the AA system will be the collection of data related to passenger travel habits. This data can be useful to the member airports and airlines as well as other travel providers for planning purposes or to the airlines, travel providers and travel agencies to gain greater understanding of ways to improve the passenger experience. The data will be available in an XML type interface record to enable transferring and merging to existing Customer Relationship Management (CRM) or data warehouse applications. Each data element that can be collected will be scrutinized in terms of privacy so that there is assurance that data clearly considered personal will not be directly available for use but can indirectly be used. For example, the interface record could be defined to not transfer passport number data but could transfer age data to provide demographic information. Additional details of this are presented under Table 3, above.

Travel Information

In order to provide system members with the most current travel information, the system has an intranet component. Airport employees or employees of other approved travel facilities (such as ports) use the Intranet to inform the system about situations that affect travelers. A system member Intranet user who has received security access to the Intranet can record information about any situation that would change or alter a traveler's plans. When an airport employee records such information, the system notifies the traveler of the relevant information. In addition, based on the set of stored contacts within the traveler's individual smart card OneTouch, the others to be notified will be notified with reliable messaging, The Intranet is accessible to those with security clearance via the system website or a system smart card.

Furthermore, the Intranet provides airport employees, security personnel and other authorized users explanations of the rights and privileges of system members and security standards for dealing with system members. Because the system also administers the airport employee smart card system, airport personnel are comfortable dealing with the procedures of the system. These procedures may also be standardized at airports that integrate the system into their security practices. Accordingly, the member thus may experience a user-friendlier environment through multiple facilities.

The following list provides a set of some of the intranet links that will be available within the Intranet to support Back of House/Airport Infrastructure processes:
 Control Room (Communication, Surveillance, Security)
 Communication and Technology
 Security
 Administration
 Multi Modal Link/Coordination Infrastructure Communication (E-mail, Voice, Web Page, Wireless Links, Closed Circuit, T.V., Video Conferencine)

Planning
 Development
 Construction
 Concession Management
 Risk Management
 Air Traffic Management [Air, Ground, Concourse, Gates]
 Air Traffic Control and Air Traffic Services
 Passenger Facilities
 Passenger Relations Management [Information, Director's Office]

Control Transport
 Maintenance/Waste Management
 Environmental Resource Management, Noise Control
 Aircraft and Cargo Handling
 Ground Facilities
 Gate Control
 Tower
 Charter and Fuel, Out Parcel Control, Real Estate
 Parking
 Human Resources
 Legal
 Community Relations
 Stakeholders
 Ombudsman When the member makes last minute travel plans, the member has the option of printing out an e-ticket at a system kiosk, which are located throughout the airport.

Baggage Checking and Tracking

Figure 30:
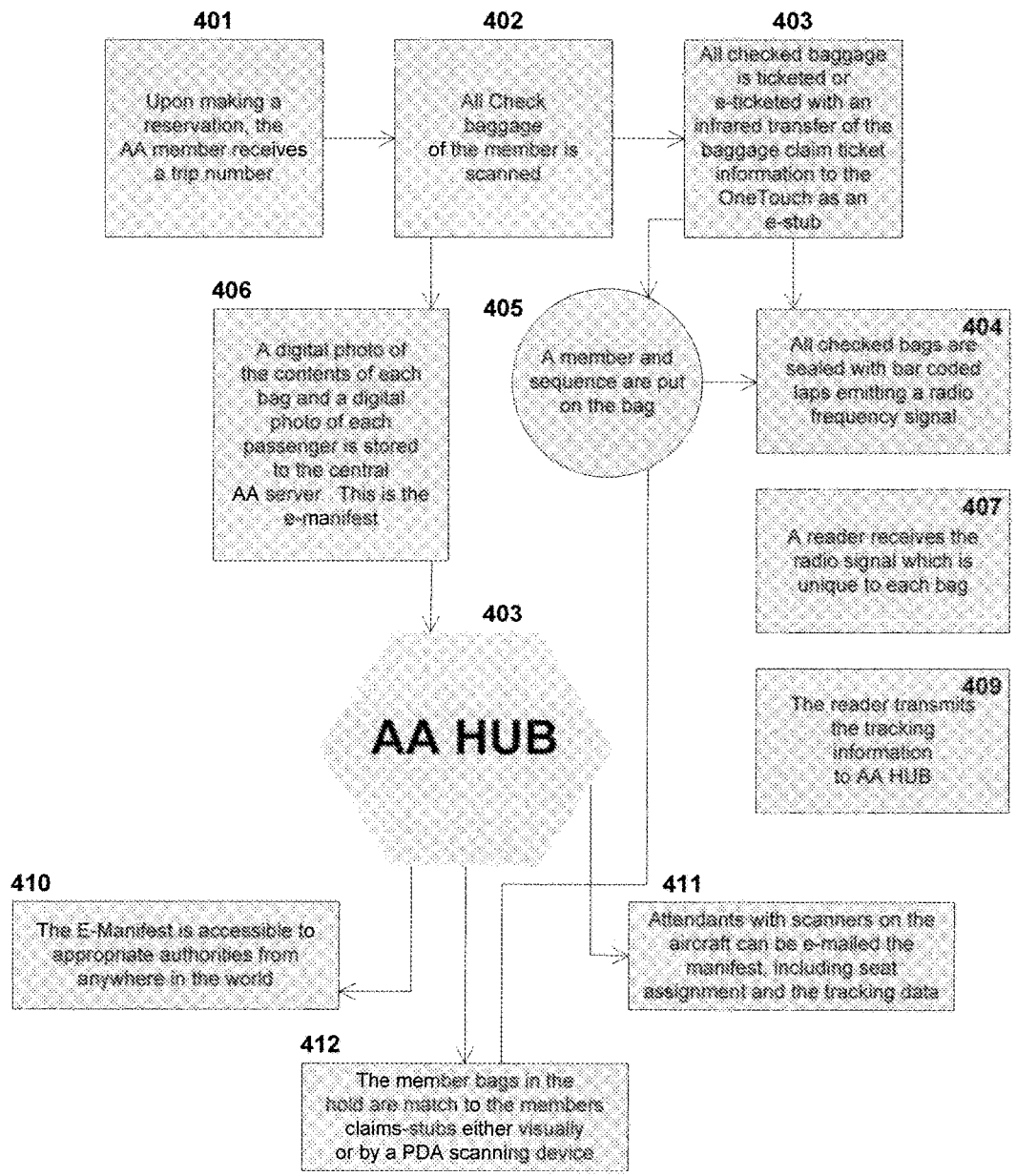
FIG. 30 shows a flowchart detailing a method for checking and tracking baggage.

The OneTouch identifies a passenger as a safe and capable traveler. Beyond that, there is a more in-depth process focused on the baggage system at the airport facility. Referring to FIG. 30, at the point of id of the member, all checked baggage of member is scanned (step 402) and ticketed or e-ticketed with an infra-red transfer of baggage claim ticket information to the OneTouch as e-stubs (step 403). A number and sequence are put on the bag (step 405). The system provides a positive id of member bags in the hold by number and sequence; this record is confirmed by a positive id of member claim stubs of passengers seated in the aircraft. This confirmation may be obtained visually or by a PDA scanning device (step 412).

The e-manifest is a quick and easy way for obtaining a complete record of passengers and passenger documents at check in. These records include digital photos of the visual contents of each bag and digital photo of passengers. Officials can access this information from web-browsers anywhere in the world (step 410). Bags are sealed with bar coded tape and tagged with a tag emitting a Radio Frequency (RF) signal that tracks the bag (step 404). The RF frequency is broadcast over a certain adjustable distance. The tag transmits a small part of this energy back to antennae. The radio wave is unique to that baggage tag and is its unique id code. The reader also transmits to the hub (step 409). Attendants with scanners on the aircraft can be e-mailed or transmitted this info, including the seat assignment of a bag owner, if a problem arises or if a misplaced bag is reported (step 411). Thus, the attendants may make a positive id of seat and match the photo of the person from e-manifest with the bag taken at baggage check.

AA member bags are marked with member bar code and member trip pin, good only for the duration of the trip from home port to destination or the pre-determined programmed life span of that encrypted trip pin(number), whichever is earlier. This trip pin number is the member's confirmation number.

AAcart.

To expedite the security clearance of the member at the airport, the system uses a portable AAcart that is equipped with a system smart card reader and with devices for scanning baggage. The AAcart bottom, where carry-on baggage is placed, may be adjustable for shifts in maximum sized carry-on baggage. Baggage is placed in the cart; if the bag does not fit in the adjustable bottom, then the bag is too large to qualify as carry-on. The carryon items are sized within the bottom of the AAcart to check for conformance with carry-on maximum regulations and standards. Carry on is then scanned with x-ray, explosive, chemical, chemical, biological scanning devices attached to the AAcart. An airport employee or designated security personnel use the portable AAcart at the gate for the final, expedited processing of AA Certified members just prior to boarding. The AAcart contains portable digital scanning devices for biometric, digital, iris, retina, voice and other identification and authorization information embedded within the OneTouch and are wired and wirelessly connected to the AA central server for a four-way match between the visual, of the presenter, embedded within the card of the presenter, the local information and the central server. The AAcart is portable and is typically used at the gate as the last security checkpoint just prior to boarding. The airport has the option of using the system portable AAcart to assist in expediting checking non-member travelers during high-traffic times.

Another component of the AAcart reads and authenticates a travel or ID document in seconds. It analyzes the document using various kinds of light, verifying identification watermarks and logos, inks, examines laminates for signs of tampering, compares photos on card with photos on various law enforcement and other watch lists. The AAcart devices read bar codes, magstripes, fingerprints, signatures, etc. The AAcart is periodically updated by governmental or other investigative audit of AA procedures and AA Certified traveler membership list. Consequently the member security check at the gate is fast and the member line moves fast. The AAcart may be integrated into existing security devices and systems at the airport or other facility and is modular for ease of maintenance and for ease of adding new and easily remove obsolete authentication, identification and authorization devices.

Passenger Ticketing and Processing

AA Certified traveler members of a certain level or gradation are pre-cleared and thus experience an accelerated and less intrusive processing. The AA certified members can pass through a Priority Lane, as they are pre-cleared through security by virtue of AA profile. The higher the gradation level, the more accelerated will be the passenger's processing. Let's provide an example of an AA member being driven to the airport. The AA member's experience begins with an expedited movement through the Perimeter Security System (FIG. 36, 901). With the higher gradation level, the AA member passes a positive (bio-metric) identification and carry-on bag check and therefore can pass through the, "Green Lane"/AKA "Priority Lane". The AA member will find expedited processing starting with the airport inbound road, curbside, terminal, concourse to gate and through to the boarding process.

Expedited Processing.

If a member is in a hurry, the member can elect Expedite-expedited processing through security and ticketing. This process, called "Expedite," requires a qualified airport employee to meet the member at a point on the airport perimeter, such as at a valet. The employee performs the necessary security searches, such as scanning the member with a hand wand, and then checks the member's identity such as by taking an iris profile with a scanner built into the hand wand. The employee then electronically transmits the information obtained by the scan to the security systems at the airport and to the system. The employee then escorts the member around the lines in the airport and through a security bypass. Next, the employee places the member's baggage in a waiting system portable cart (as described above). The cart scans the baggage and the member is ready to board. Once the member passenger and his luggage are cleared at the gate, the passenger is not permitted to leave the secured gate until boarding; otherwise, the passenger must go through the normal, non-expedited security check.

Members have standard system clearance. To elect the Expedite option, members may be required to comply with standard 6, dark green, of the gradation levels, or possibly submit additional identification information, such as a DNA sample, and to pay additional fees, which reflect the additional cost to the government, the airport, and the service of providing expedited processing.

Parking

For reserved parking in the building, AA e-mails to the member the location of the reserved parking spot, for example, "North daily $3^{rd}$ level, any of spaces 45-56."

Through use of AA's Cartracker, a member can scroll thru a parking garage map displayed by AA on a monitor, permitting the member to palm, iCell 22 or cell phone 17 mark the location in the parking building. Upon return to a home city, and while going to the parking garage, a member can just scroll through maps of parking structures to locate a blinking light on iCell parking garage map indicating the location of car. In one embodiment, an infrared beam crosses reserved parking spaces. The beam is released by the member inserting their AA pin number in a key pad on adjacent stanchion, otherwise interruption of the beam sets off the alarm. Release of the beam is sent to an affiliate's computer in the garage, and sent on to AA local web parking page. When the member slides the member's I-card/OneTouch in the pad which transmits his trip number and Certified AA member number the beam becomes disengaged and such action notifies the parking garage computer that the space reserved for the member is occupied by someone else. If a nonmember drives a car in the space the interrupted beam sets off an alarm.

Trip Planner

Figure 31:
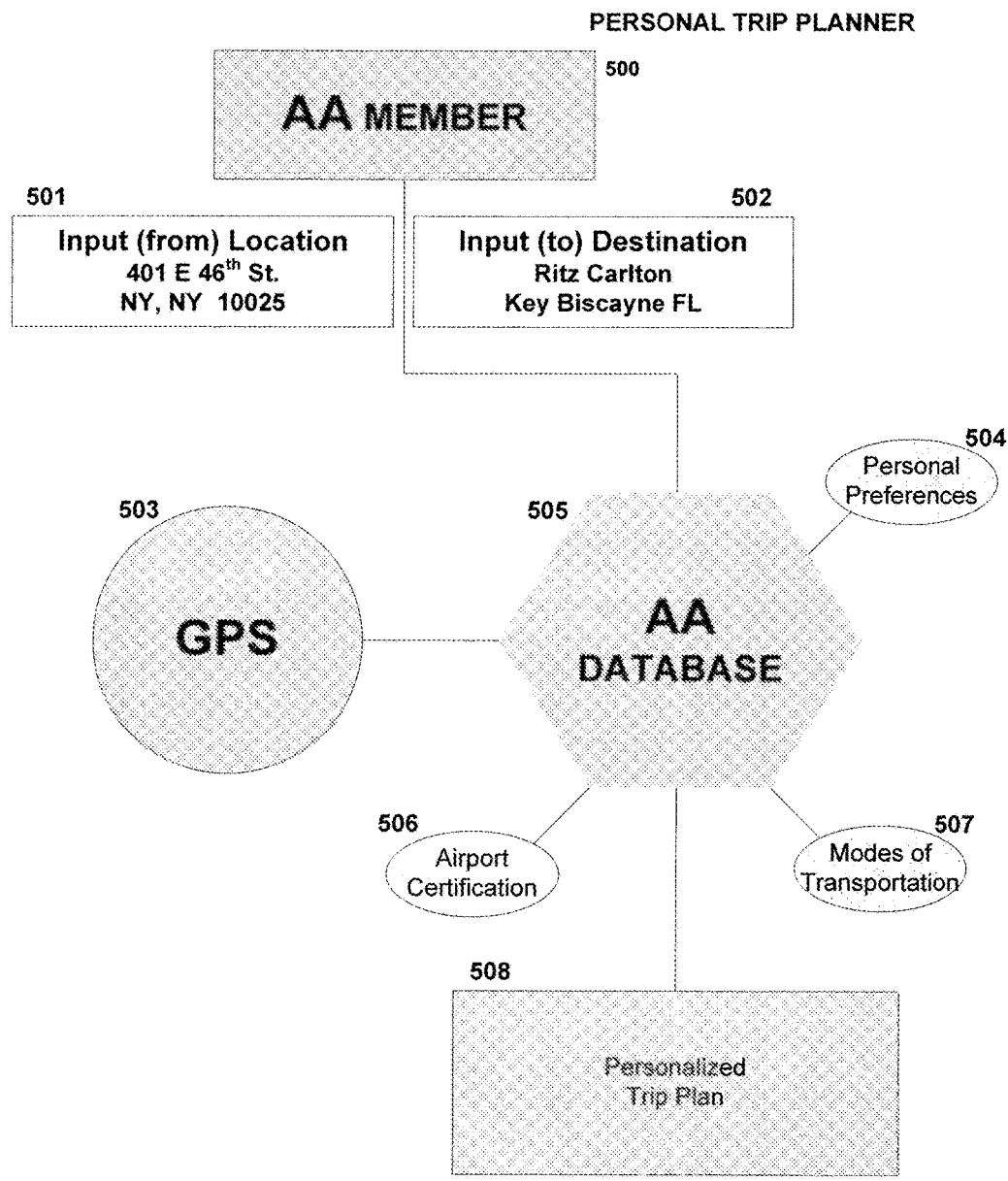
FIG. 31 shows a flow chart of a method to plan a trip for an AA member based on combining information of a geographical positioning system as well as personal preferences and other criteria.

The member may know the exact airport that he wants to go but may also just supply the address of the ultimate destination where he wants to go and the origin point. The system provides an additional logistical-planning capability similar but more comprehensive than the sort of functionality provided by a system such as mapquest in that the system considers the best way to navigate the member to the desired destination. The Personal Trip Planner is referenced in FIG. 31. By knowing that the member wants to get to a specific hotel in Key Biscayne, Fla., 502, from an address in mid-town Manhattan, N.Y., 501, and that the member does not generally drive and park at the airport (based on preferences stored in the profile, 504,), the system will utilize the GPS navigation, 503, as well as its understanding of the various modes of transportation in the AA Central Database, 505, to interpret the need and convert that to a suggested trip plan. "From the shortest route perspective (other perspectives may be added later such as inclusion of the member's priority for a higher gradation level airport), suggest LaGuardia Airport in New York (LGA) and fly to Miami (MIA) which is the closest airport to Key Biscayne. A taxi will be waiting for you. Expect to pay $25 which is the standard airport fare from Miami Airport to Key Biscayne", as shown in 508 of FIG. 31. This recommendation is available in text as well as by voice by audio/visual interaction.

Airportvalet4u.com

Figure 32:
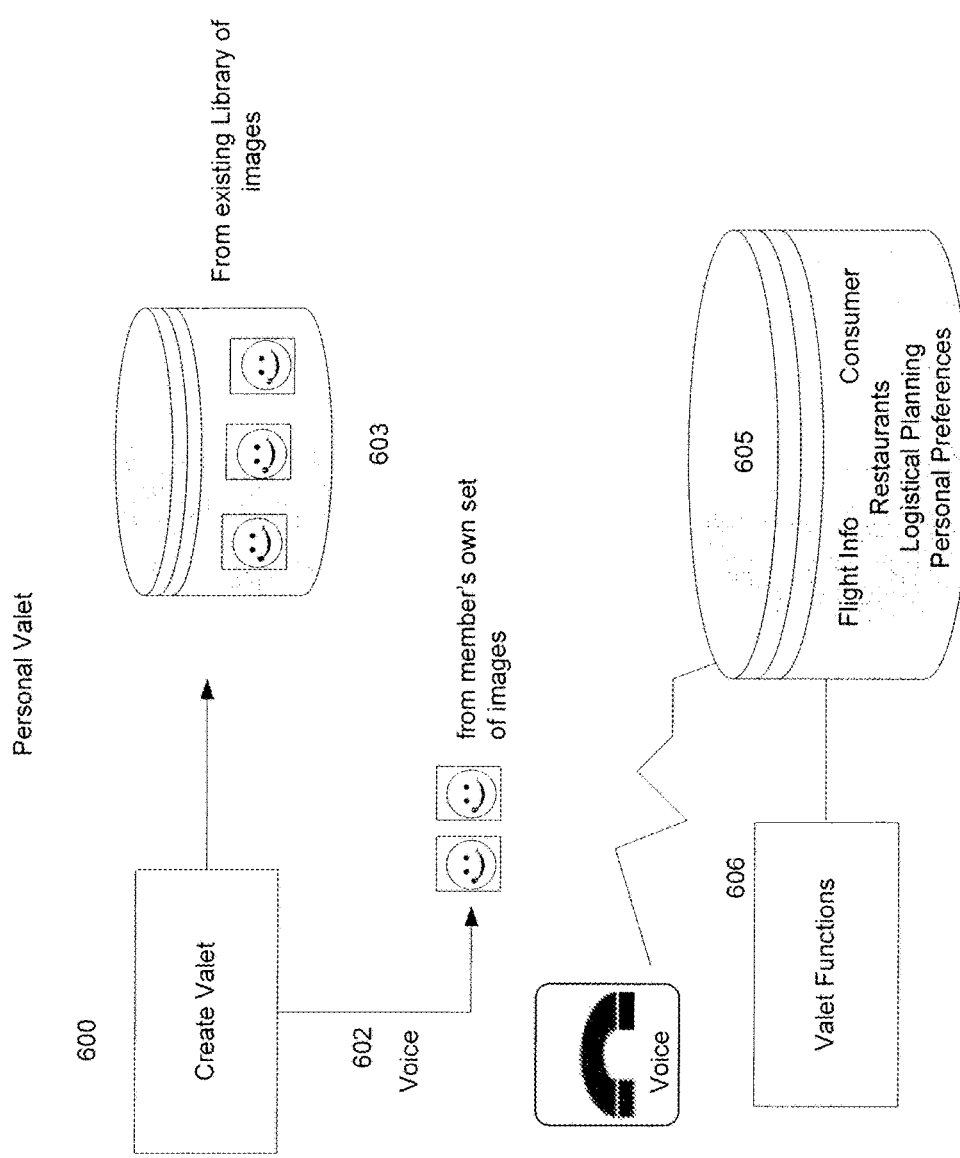
FIG. 32 shows a flow chart of the creation and utilization of a personal valet, an audio/visual assistant to the member that can assist with travel and entertainment suggestions.

In addition to the capability for a member to interact with the OneTouch and all the access points to the AirportAmerica central server, the member may opt to utilize his Airportvalet4u.com (aka valet4u). The Valet4u is a computer generated intelligent interactive personal digital assistant, as shown in FIG. 32.

The member may elect to not have a valet4u, or may elect to have an audio-only valet4u or may elect a complete computer animated digital artificially intelligent valet4u. The AA member begins by creating a personal valet, 600 of FIG. 32.

Prior to construction, the member may give facial and body preferences or select from a library of images in the AA central database, 601, or provide a set of images of a familiar person whose image the member wishes to use as his or her personal valet, 603. Then construction begins of the artificially intelligent valet4u with natural language interactive voice feature and creation of a visual digital image, 600. The digital image involves selecting a valet4u from the many animated characters presented or assembling from various computer generated components including selections of eyes, mouth, chin, forehead, cheeks, bust, torso, arms, legs, etc. and form the digital person with unique features, with assembly as directed by the member. Audio visual sync between the computer animated head selected, face selected, mouth selected and voice selection is achieved through a custom program that synchronizes visual and voice. The construction of the computer animated valet4u is by the member with the aid and assistance of an AA employee. The valet can also be a realistic re-creation of someone selected either living or dead by sending to AA three photographs, front view and both profiles as shown in 603.

The valet4u understands thousands of commands that valet4u has learned from amongst thousands of vocabulary words and phrases assembled corresponding to the various anticipated travel related and conversational commands and the user or member may elect to create an additional database inputting prompts that personalize the valet4u. The database of personal valet information as well as the voice commands that are available for use are stored in the AA central database, as reflected in 605 of FIG. 32.

The present invention is described herein mainly in association with air travel, including preflight and post flight travel airline travel. However, the invention is not meant to be so limited, and is equally applicable in association with other forms of transportation incorporating the full range of travel options, including multiple other forms of transportation including without limitation, rail travel, ship travel, limousine travel, bus travel. With a database of the member's preferences, places that he wishes to travel, distance and time considerations, origination point and modes of transportation that are available, when prompted, the valet4u suggests alternatives to the traveler from the database built from standard templates provided by AA, the database of preferences and travel patterns downloaded from member user profile and data input from the member user. Suppose, for example, that the traveler's flight from New York to Washington, D.C. was cancelled. In addition to considering other flights, if the traveler has sufficient time, trains or shuttle services may also be offered as options for consideration.

Charter Reservation System

Figure 33:
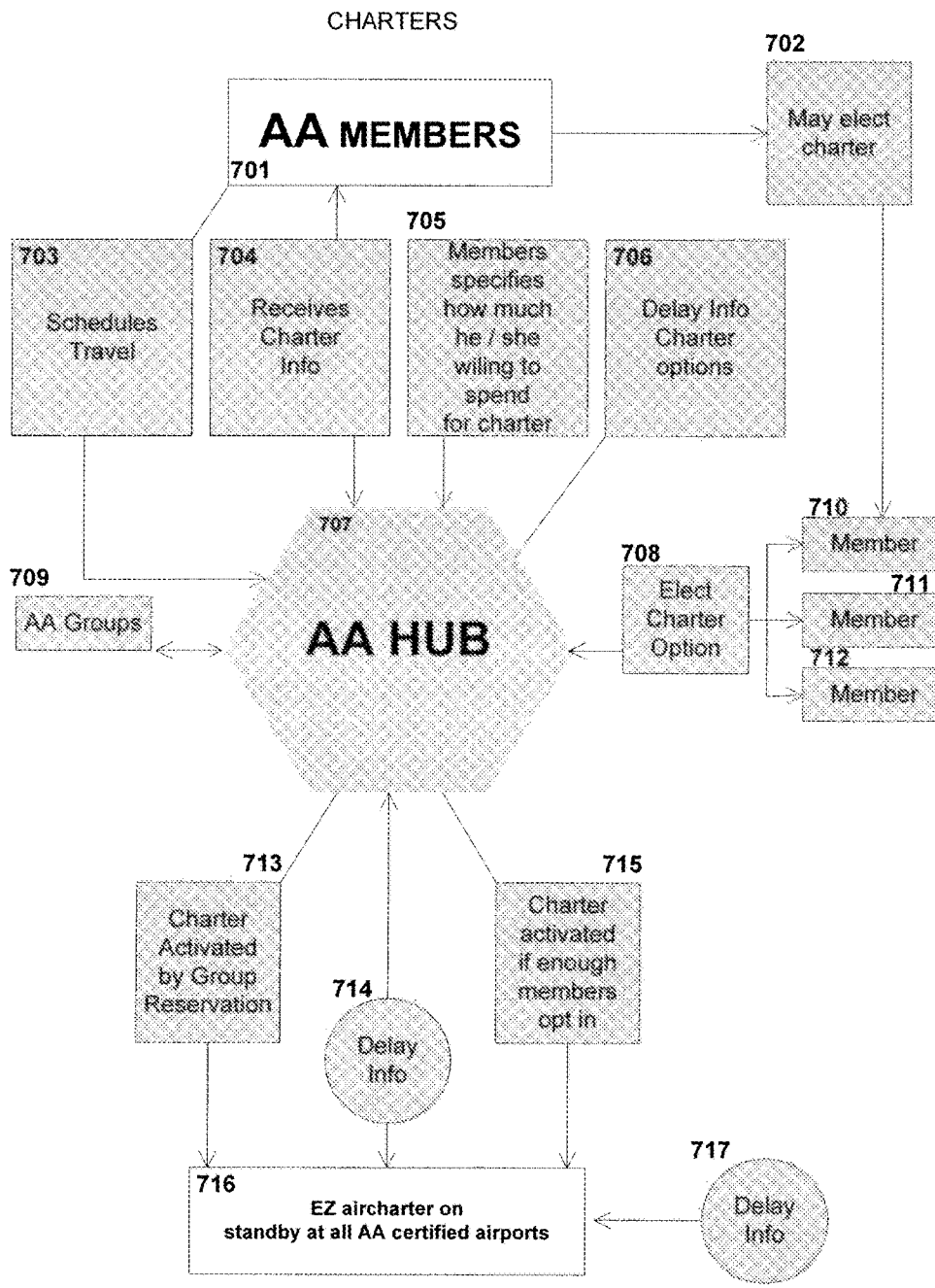
FIGS. 33 and 34 show logical schematics detailing a method for managing charter flight reservations.

Referring to FIG. 33, at step 701, members will be given charter information along with their flight information when scheduling travel. Member users electing the charter option notify AA through the plurality of devices referenced herein. Upon notification, the trip pin of the passenger is reassigned to the charter operator. When member users choose to travel along the same route at or about the same time, 702, the invention sorts and matches the subset of those travelers who are both members and traveling the same route and electronically notifies that subset (706), of the charter availability, rate, charter websites for information, location of the charter facilities and van pick up location to ferry passengers to charter fixed base operation or terminal, if not at the gate of the AA terminal, departure information (step 713 and 715) provided the charter minimum threshold is met, and real time schedule of rates as the number of charter passengers varies. The foregoing and other charter information including without limitation, weather en route and at the flight destination are posted on the charter box on the AA website and in a more limited format on airport terminal monitors. Members may elect to post an amount representing a ceiling that that member user is willing to pay for the leg of the member's travel itinerary through the use of the trip pin, affording anonymity to the member user, 705. The Charter operator may then elect to fly the passengers at a reduced rate if the ceiling of the totality of the subset electing fractional charter rate of potential passengers is less than the AA charter operator's published charter rate (step 715). In either situation, the member is required to agree to pay for the amount in full if a chartered jet is made available at the particular price point.

AA will have Ezaircharter who are AA certified air charter providers on standby at all AA-certified airports. AA will have advanced, real-time knowledge of the commercial inbound aircraft delay through its airport intranet and through that via computer notification of the delay at the airport of origination of the flight (steps 714 and 716). This information once confirmed is transmitted through to AA member OneTouch via beeper activation of blinking red light on iCell/OneTouch (FIG. 27, 243, and FIG. 28, 247) and activation of the ringer on the ringer-beeper pin, PDA, Cell phone, etc., and at the charter office and via AA vendor iCell or OneTouch (FIG. 27, 243) If sufficient numbers respond to make charter from the AA certified charter service within the range of first class ticket or member specified and charter published price, the charter is activated for immediate departure (step 515).

Groups can charter a jet from an AA certified charter service through AA's reservation system (steps 701 and 709 of FIG. 33). Chartering a plane is similar to booking a commercial flight reservation. Instead of pricing being based on the number of travelers and the class of travel, pricing is based on origin and destination according to the AA certified charter company.

Figure 34:
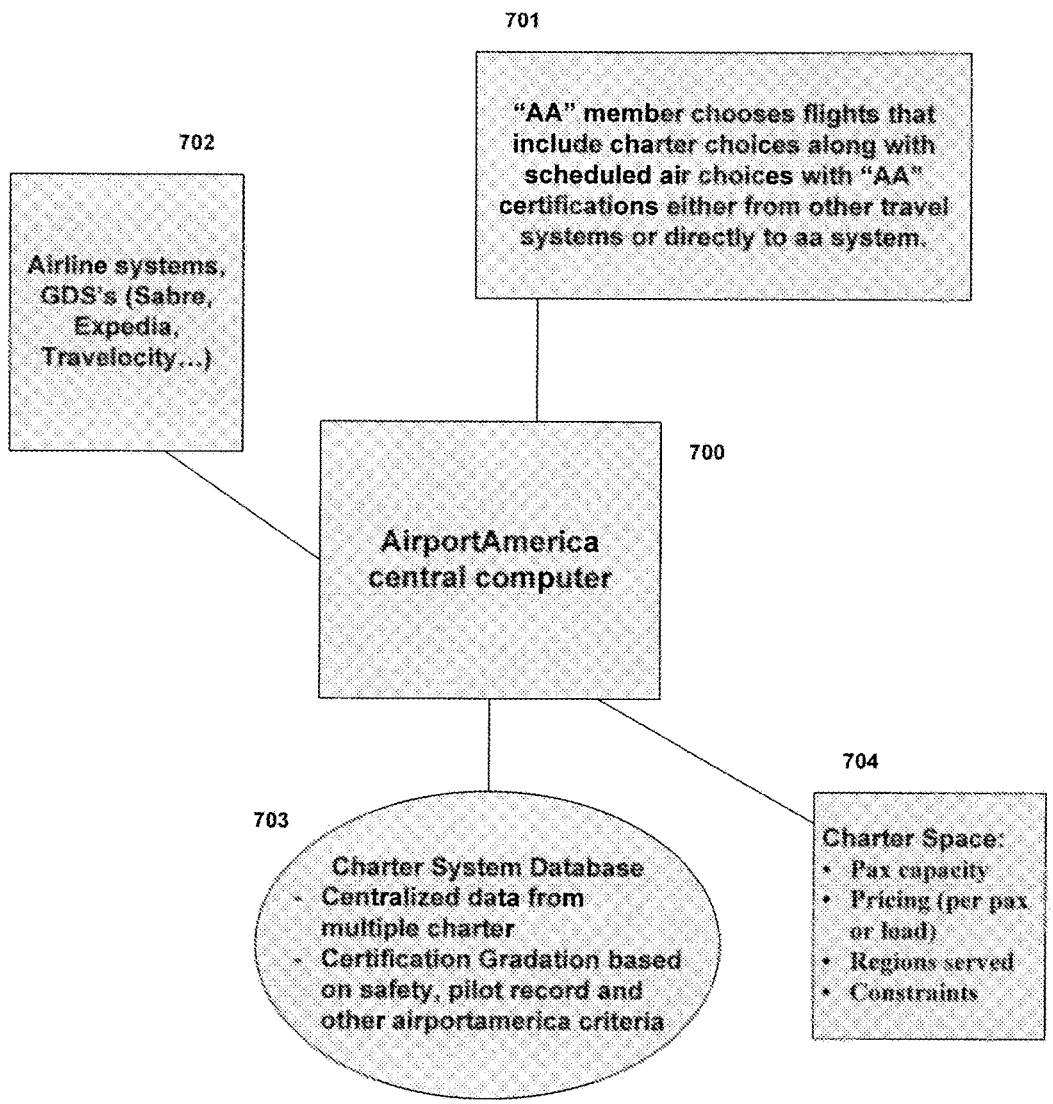

Providing group space (FIG. 33, 709) is another dimension of the AA membership concept. The group space view considers members as a party of multiple individuals. When a party wants to travel, they will be gain access to the AA EZ air charter web site of potential charter seats available, aircraft, etc. or could be made available for the specific date range that the party wishes to travel (FIG. 33 as well as FIG. 34). The main differences between the AA view of potential charter carriers and other charter space options are as follows:

- The AA membership ensures a greater sense of evaluation by utilizing the gradation concept described elsewhere. The grades/levels that are assigned to the charter operators are based on more rigorous criteria and provide a level of comfort to the groups that these charter operators are safe, reliable, and have a reputation worthy of AA accreditation.
- The AA membership ensures a greater access to the charter operators by greatly promoting the service.
- The AA membership can now be extended to traditional consolidators and companies who need blocks of space for certain destinations and dates. Cruise lines and major tour operators can become AA affiliates to gain additional access to air space for their passengers/guests.

Valet and Other Services

The member can have rent-a-car pickup and return at an AA affiliate valet stand. The valet will have a car ready at a destination airport valet stand when the AA member deplanes in a destination city. The valet gives the member an AA stub. At the end of the trip the AA member may opt to leave the rent a car at the valet stand airportvalet4u.com. All AA affiliated Airport hotels and suites must provide pickup and return of AA member and luggage.

AirportAmerica will maintain a database of its membership and will share data in a manner that does not compromise privacy related to increased or decreased membership with the appropriate airport parking facilities. The data that will be sent will be in terms of numbers of passengers who are possibly going to need parking so that assistance is provided to forecast number of spaces to reserve.

An AA member is also eligible for lottery and AA points toward "freeairtx.com" and "giveutx.com", and can collect visa miles for AA affiliate purchases in addition to the discounts.

A courier delivery service can be used by a member to retrieve needed merchandise from local stores for delivery to a hotel or airport (subcontractors/affiliate)

A member can order a personal valet to directly pick up baggage, and drive the member to an airport from a car rental, cruise, hotel, and assist with check in. Valet service is also available to a member for courier delivery if desired.

As previously indicated, a member can connect to AA semi-official websites of the world's major airports (which are AA owned and controlled domains). AA owns at least one and usually several of the most common domain names of the fifty or more busiest airports in the world, each of which is cross-linked so that reference to any portion of an airport name by an AA member will lead to the web site and to an AA portal through metatags. AirportAmerica is the portal to domestic and overseas AA owned websites Members are provided discounts via AA bids to affiliates who provide rent-a-car, hotels, apartments, temporary office suites, restaurants, travel packages thru AA owned websites such as rent4cents.com, ezairportoffice.com, cheapairportoffice.com AA provides Airport Facilities and Operations Information to members via pull-down menus or choice communication for the following (this list may be expanded for airports and additional travel provider facilities such as cruise terminals/ports):

A. Flights
B. Parking
C. Airport Schedules and Guides
D. Travel Planner
Pull ↓ Down
Flight Schedules
Maps
Visitors Guides
E. Airport Guides
Airline Guide
Terminal Guide
Parking Guide
Transportation Guide
F. Air-Charter Services
G. Security
H. Lost and Found
I. Cargo
J. Capital Development
K. Businesses and Business Opportunities
L. Ground Transportation
M. Lodging
N. Airline lounges
O. Conference Center
P. Financial Services—AA sponsored ATM, cash advances on credit cards, travelers checks, money orders, foreign currency exchanges, ATM
Q. Locker Rental
R. Parking
S. Post Office
T. Visitor Info
U. Information translated into passenger's choice of 7 languages
V. Bank
W. Mall Standardization A unique function provided by the AA system is STANDARDIZATION—a complete range of services available in each member airport set out in the AA web site credited to that airport, are linked like spokes of a wagon wheel to the AA hub/portal. The AA portal is the brains. The operations center (OP. Center) is the clearinghouse. The AA OP center continuously updates all information of member airport websites, and maintains and continuously improves the website for the benefit of the airport. When a member logs on to the site the airport gets primary billing at a fraction of the cost of attempting to maintain such a site itself. All services listed are available at all AA airports. The services are accessed in an easy, familiar and consistent manner for each member airport through its AA website. The AA traveling member may thus seamlessly retrieve all the information he needs through standardized websites. This model is followed for other types of travel facilities as well. For example, all car rental agency web sites are standardized for ease of use, familiarity and consistency.

Queries are instantly transmitted to the AA OP Center via interactive computer-Kiosks 11 at the intersections of concourses, and gates and other strategic high traffic areas of the terminal. For example, assume a 1-800-400-1024 connection to AA for cell phone users for Ft Lauderdale (FLT), weather, and other information, reservation, ticketing. Any other areas can be simultaneously connected. Thru affiliate relationships with companies in the cutting edge of wireless technology, I iCell and cell phone access will become the Internet access for mobile links to aa, and all information a member requires while on the run. AA stores the information accessed thru pin numbers or cookies. Printouts of justnti-meticketing.com can be obtained by downloading to the 3"×3" wireless printer which can be clipped to the waist or printed while in briefcase, at AA interactive remote-Kiosks 11 located at the intersection of each concourse and terminal and/or out in concourse or local airport information center.

FIGS. 3 through 17 show examples of pull-down menus available to a member for obtaining desired travel information, and making reservations. Other pull-down menus can be configured for expanding the usefulness of the system.

Illustration

An example of an AirportAmerica (aa) member utilizing the present system to make his/her airport, flight and travel experience easier, faster, cheaper and friendlier, will now be given. It is the inventor's understanding that the following combination of unique and non-obvious features provide what no other airport site is currently offering. AA owns at least one .com domain name of every major (top 50) airport in the world and of the largest five or ten AA owns several. For example, Atlanta: Atlantahartsfield.com, atlantainternationalairport.com, atlintlairport.com, Hartsfieldatlantainternationalairport.com, atlhartsfieldairport.com, atlinternationalairport.com, atlhartsfieldintlairport.com, atlintairport.com are all separate AA owned domain names. They will be separate—web sites, all linked, and all leading to the AA portal. The links are the spokes to the hub, AA is the hub. Each Atl web site or any combination of words for that airport through meta-tags, etc. will lead to the standardized Atl website, and then to the AA portal.

Although various embodiments of the invention have been described above, they are not meant to be limiting. For example, those of skill in the art may recognize certain modifications to these embodiments, which modifications are meant to be covered by the spirit, and scope of the appended claims. Such a modification, for example, may be to expand the present method and system, or convert it, to include railroad scheduling, bus scheduling, ship scheduling, and so forth.

MyData Secure Mobile Device

The following describes an embodiment comprising aspects of the OneTouch, the Secure MyData Chip, and other features disclosed above in a communication device that allows access to secure data stored on a platform isolated from network connections. In an embodiment, the device is a smartphone. The device may be powered by one or more batteries.

Exemplary embodiments are directed to a secure mobile device. In particular, embodiments are a device with an encrypted chip (for example, SMD, MD, etc.) and associated processor with no network connectivity. Authorized users may toggle between normal network platform functionality and the secure platform. User interfaces can be operated by the network platform or the secure platform with control determined by various security measure, for example, one or more fingerprint sensors operating a switch control. The device may also have a physical security switch that prevents unauthorized removal of a secure memory storage device, which can only be accesses digitally by the secure platform.

Figure 37:
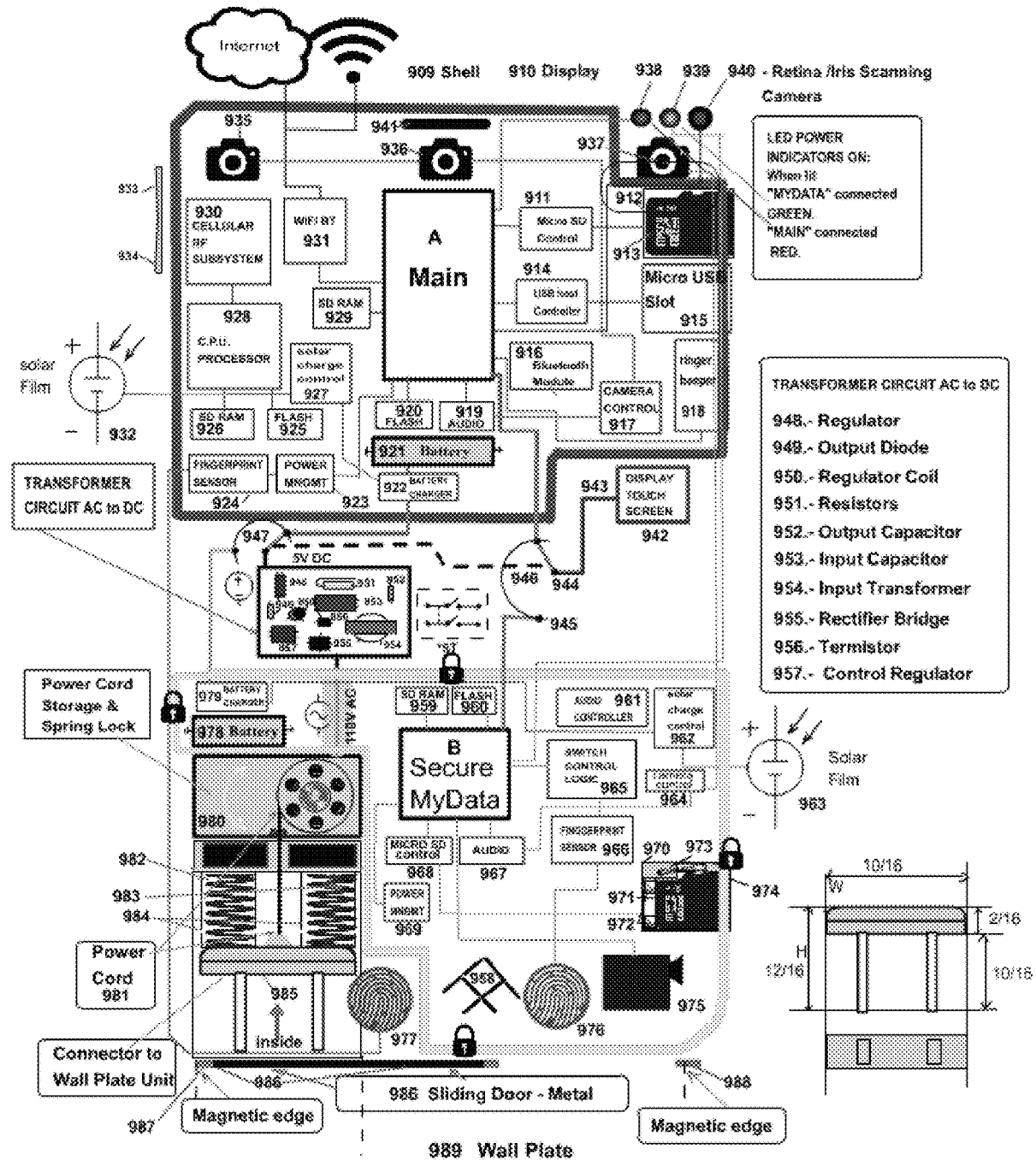
FIG. 37 is a schematic illustrating the components of a device with a main platform and a secure platform in accordance with an embodiment of the invention with an inboard power cord.
Figure 38:
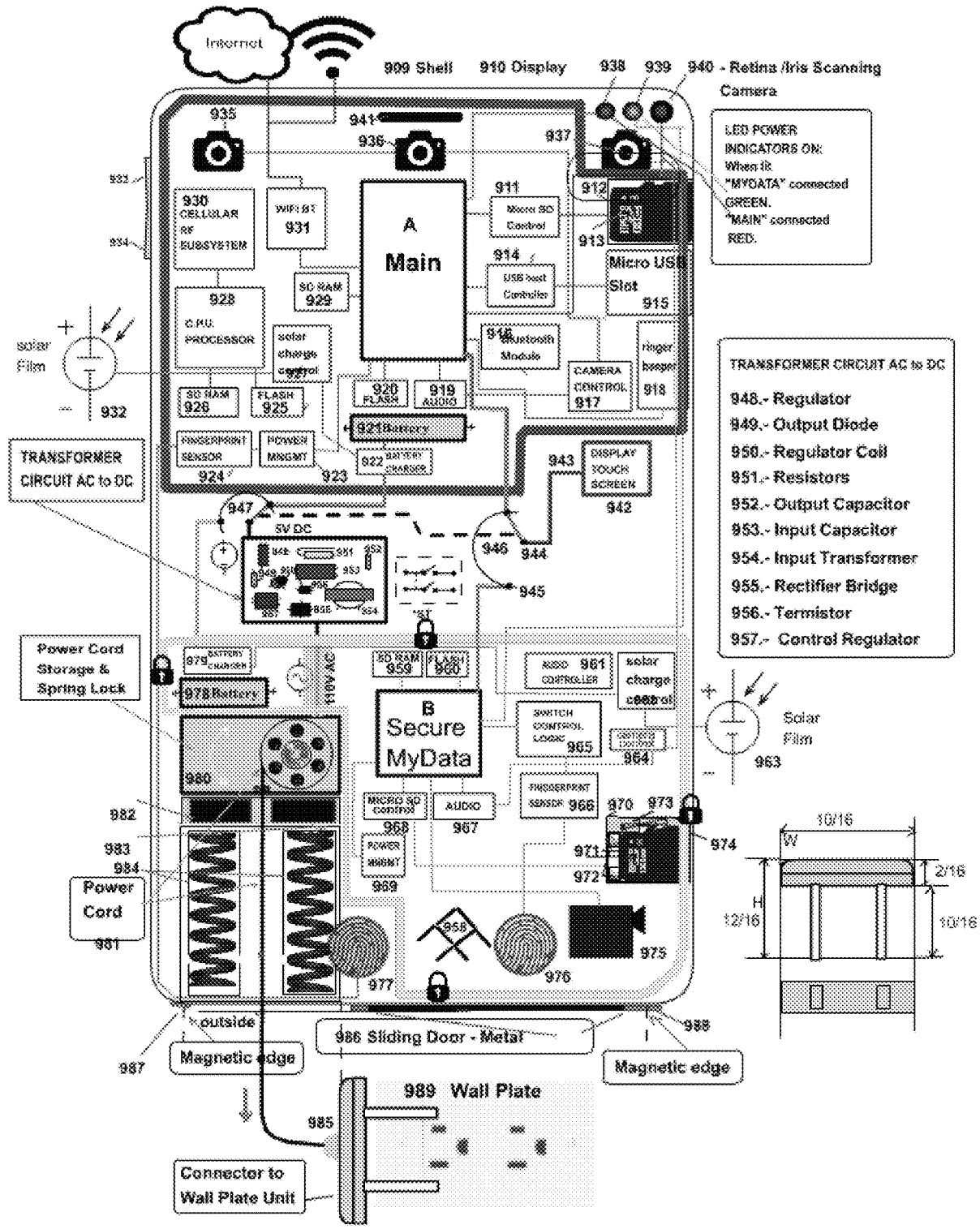
FIG. 38 a schematic illustrating the components of a device with a main platform and a secure platform in accordance with an embodiment of the invention with an inboard power cord that is extended outside of the device's housing.
Figure 39:
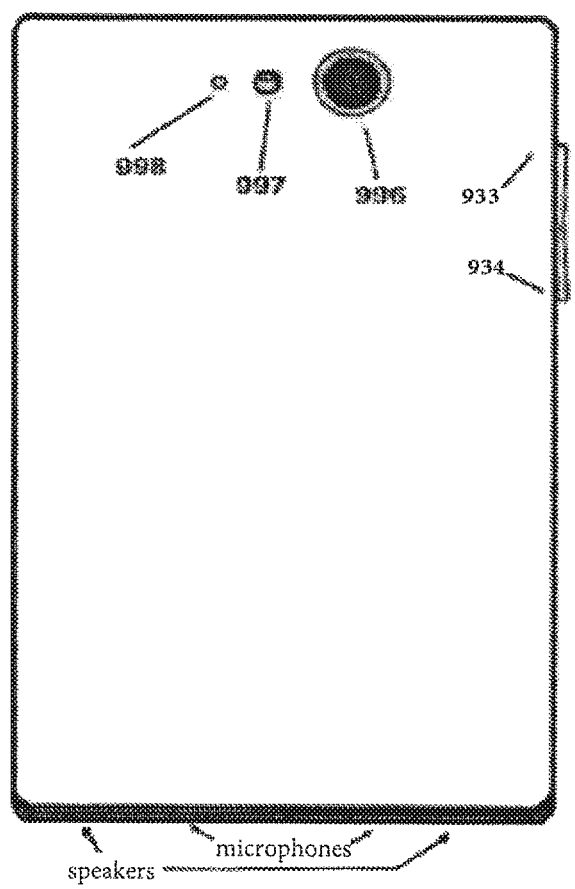
FIG. 39 is a rear-view schematic illustrating the device and external components in accordance with an embodiment of the invention.

In an embodiment, the device may have a Main Platform, which includes an application processor and optionally includes the following components shown for example in FIG. 37: 911.—Micro SD Control; 912.—Micro SD Slot; 913.—Micro SD Chip; 914.—Micro USB Host Controller; 915.—Micro USB Slot; 916.—Bluetooth Module; 917.—Camera Control; 918.—Ringer Beeper component; 919.—Audio Controller; 920.—Flash; 921.—Battery; 922.—Battery Charger; 923.—Power Management; 924.—Fingerprint Sensor; 925.—Flash memory; 926.—SD RAM; 927. —Solar Charge Control; 928.—C.P.U. Processor; 929.—SD RAM; 930.—Cellular RF Subsystem; 931.—Wifi BT; 932.—Solar Film; 933.—Volume Control Toggle Switch Up; 934.—Volume Control Toggle Switch Down; and 977.—Fingerprint Main.

The device may also have a Secure MyData Application Platform, which includes an application processor and optionally include the following components for shown, for example, in FIG. 37: 958.—Faraday Cage/Shield; 959.—SD Ram; 960.—Flash memory; 961.—Audio Controller; 962.—Solar Voltage Regulator (Solar Charge Control); 963.—Solar Film; 964.—Camera Control; 965.—Switch Control Logic; 966.—Fingerprint Sensor; 967.—Audio component; 968. —Micro SD Control; 969.—Power Mgmt; 970.—Micro SD Slot; 971.—Micro SD Chip; 972.—Micro SD coiled Springs; 973.—Pin Latch Micro SD; 974.—Micro SD Slide Lock; 975.—Facial/Cranial Scanner-Identifier; 976.—Fingerprint MyData; 978.—Battery; 979.—Battery Charger.

The device may also have additional components that may be operatively connected to either the Main Platform or the Secure MyData Platform, including as shown, for example, in FIG. 37: 909.—Shell; 910.—Display; 940.—Retina/Iris Scanner Camera; 941.—Ear Speaker; 942. Display Touch Screen; 935.—Camera on left; 936.—Camera on center; 937.—Camera on right. The Retina/Iris Scanning Camera 940 may be Camera 937 or may be a separate camera. The device may also include an LED indicator light 938, which could display various colors to indicate whether the device is on or off, or whether the Main Platform or Secure Platform is operating. The light may indicate other information, for example, whether the user has an email as well. The light may also operate as a flash for a camera or emit various spectra of light including infrared light. The rear of the device may also feature an LED light 998 capable of emitting various spectra of light at varying intensities, a sensor or scanner 997, and a camera 996.

Figure 52:
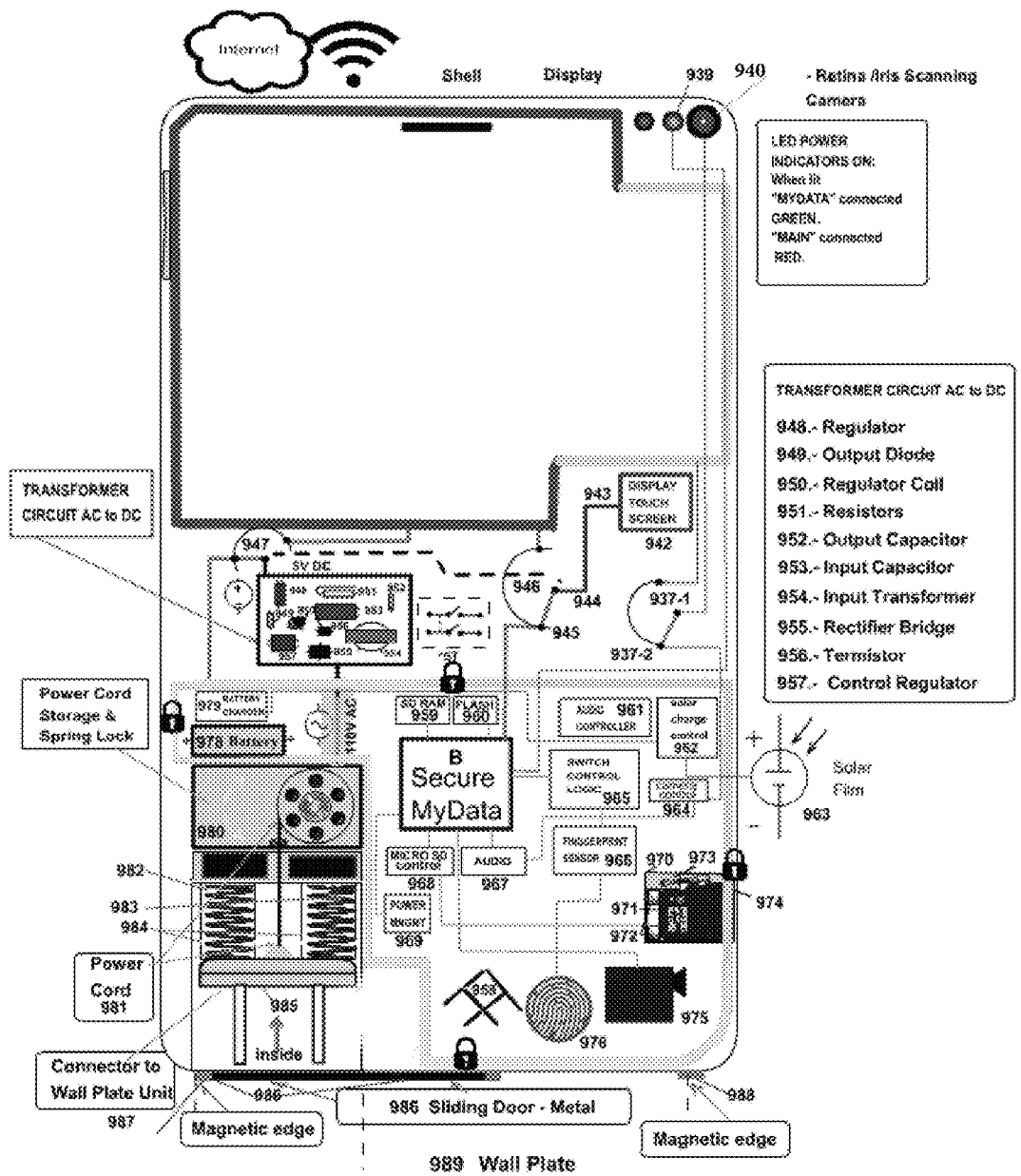
FIG. 52 illustrates the components of and accessible to the secure platform in accordance with an embodiment of the invention.

The device may include toggle switches to provide operative connectivity between various interface, data capture, input, or output components. Those toggle switch may be linked to operate in unison, tandem, or sequence as required by the user. For example, In FIG. 37, the connection line 943 from the Display Touch Screen 942 runs to Toggle Switch 946, which provides connectivity to either the Main Platform or the Secure MyData Platform via connection 944 or 945, respectively. As another example. Toggle Switch 947 provides similar selective connectivity to the charging mechanism. The Retina/Iris Scanning Camera can also be operatively connected to either the main platform or the MyData platform via a switch as shown in FIG. 52.

The device may also include a retractable charging cord as shown, for example, in FIG. 37, including: 980.—Retraction Wheel; 981.—AC Extension Cord (110V) * ; 982.—Extension Springs left; 983.—Extension Springs Right; 984.—Extension Springs Housing; 985.—AC Male Plug; 986.—Sliding Door; 987.—Magnetic secure closed door; 988.—Magnetic secure open door.

In an embodiment of the invention a Main Platform, which runs the general purpose operating system (for example, iOS or Android) and connects to the internet or other communications networks by various network adapters. The Main Platform has a Main Processor A. The Main Platform may connect via a Universal Serial Bus (USB) Host Controller 914 to a USB port 915. Main Platform can be any mobile communication platform, with components for external access, that is, externally accessible by mobile communications networks that may be connected or disconnected at any time. The Audio Controller 919 or audio interface component may include audio playback and recording components and may operate in conjunction with the camera controller to record videos with sound, for example.

Figure 49:
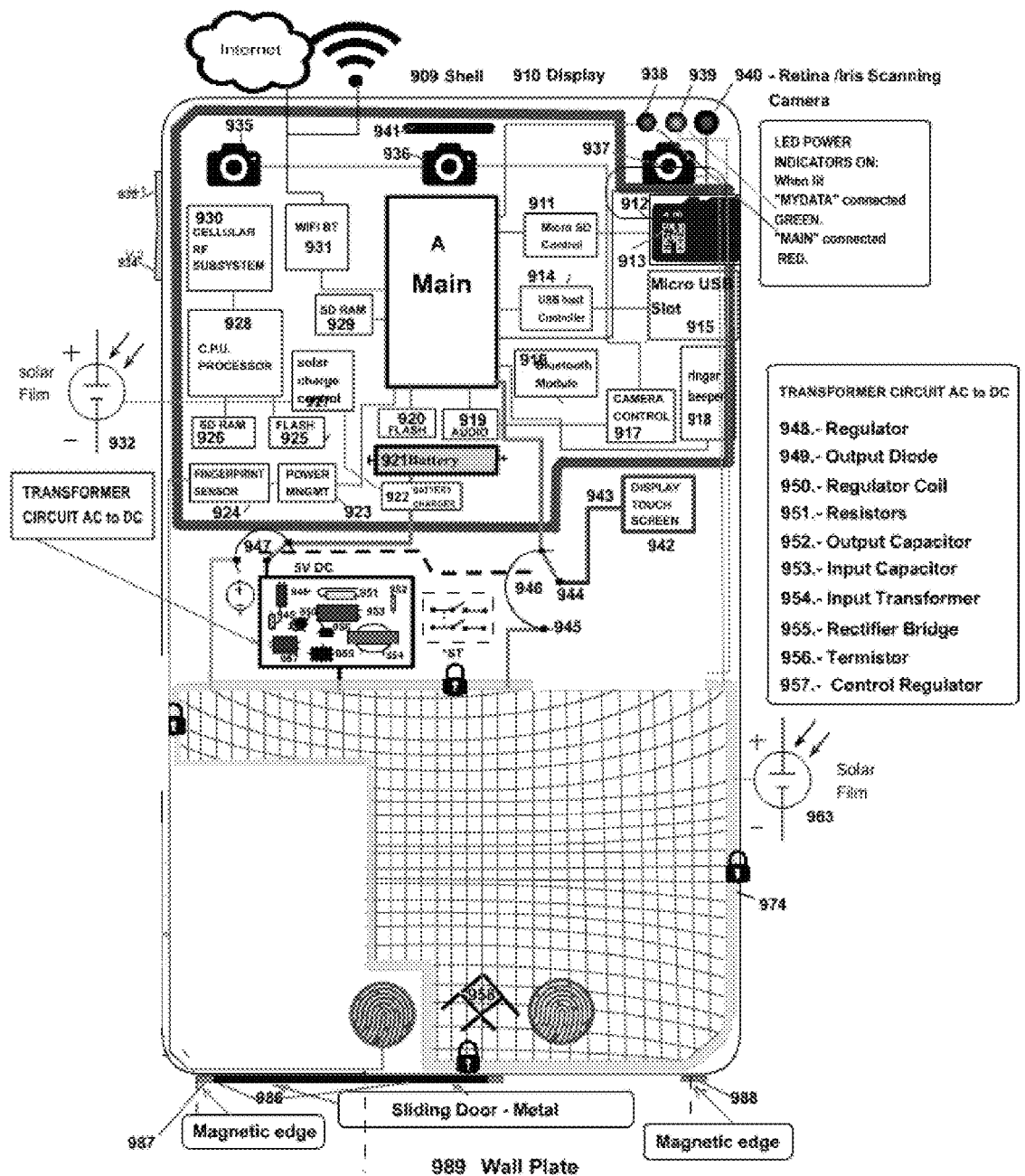
FIG. 49 illustrates the coverage of a faraday cage in a device in accordance with an embodiment of the invention.

In an embodiment, the device would also have a Secure Platform that lacks network connectivity. The Secure Platform would accesses a memory chip 971 (for example, a Secure Digital (SD) card or microSD card) that may be held in a memory slot 970. The Secure Platform may have internal memory components which may be accessed and modified by an authorized user through various user interfaces. Internal memory may also be accessed by physical connection to upload or download data once the Secure Platform is activated by an authorized user. The Secure Platform may be surrounded by a Faraday Cage 958 comprised of polyester-aluminum, cobalt, nickel, or other suitable material, significantly blocking electromagnetic radiation emitted by or incident to the Secure Platform. The coverage of a faraday cage in accordance with an embodiment of the invention is shown in FIG. 49 as a lattice obscuring the component of the Secure Platform. The Secure Platform has a Secure processor, which has no network connectivity. The Secure Audio Interface 967 may include the same functionality as Audio 919 but is accessible only to the processor on the Secure MyData Platform. The Micro SD Port 970 may accommodate SD cards, microSD cards, or other data-storage formats. The Micro SD Port 970 provides a data path through which the user can load data to or from the Secure Platform.

In an embodiment, the device would incorporate physical security measures in addition to other features.

Figure 44:
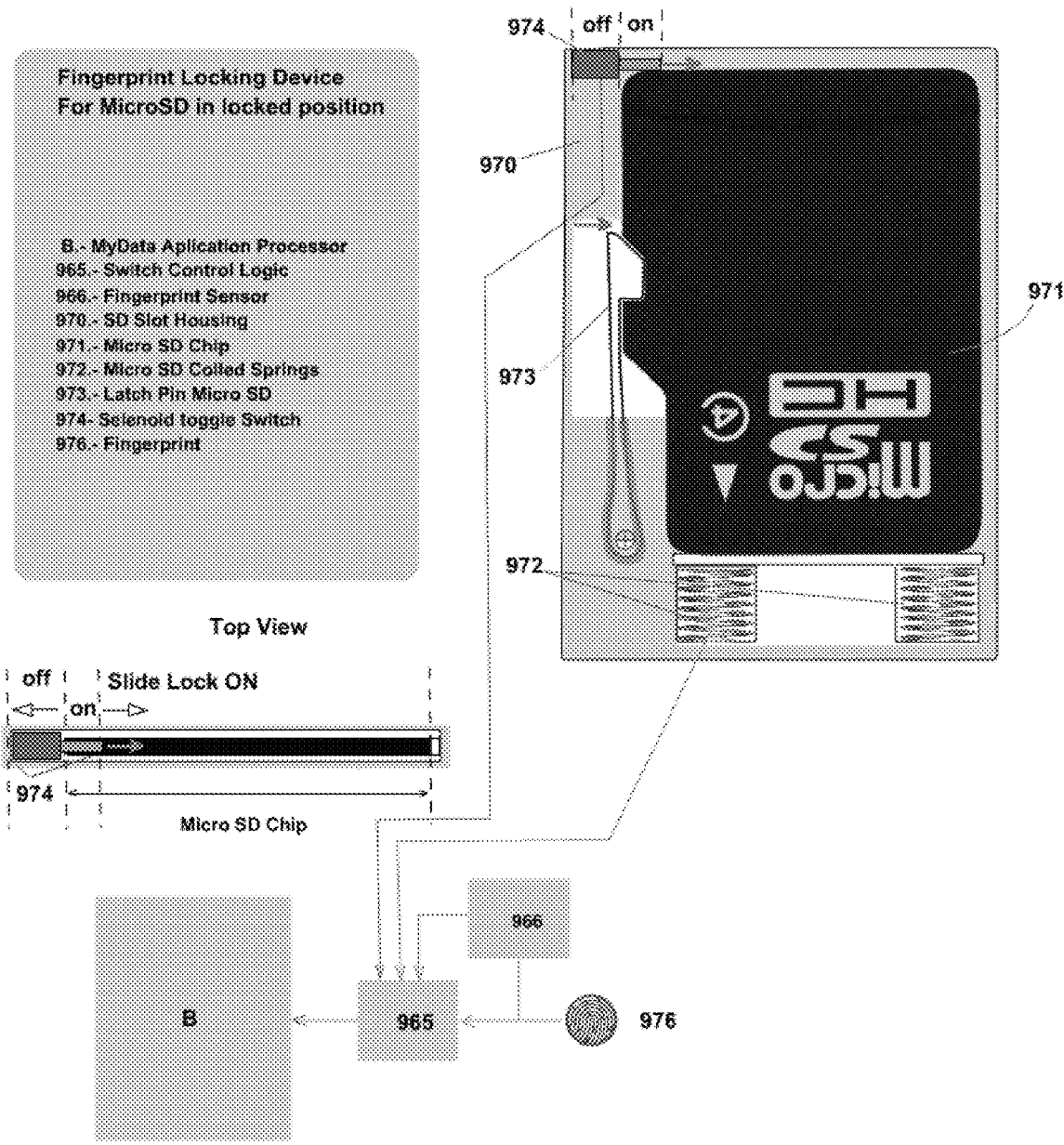
FIG. 44 is a schematic illustrating the micro SD slot lock in a locked state in a device in accordance with an embodiment of the invention.
Figure 45:
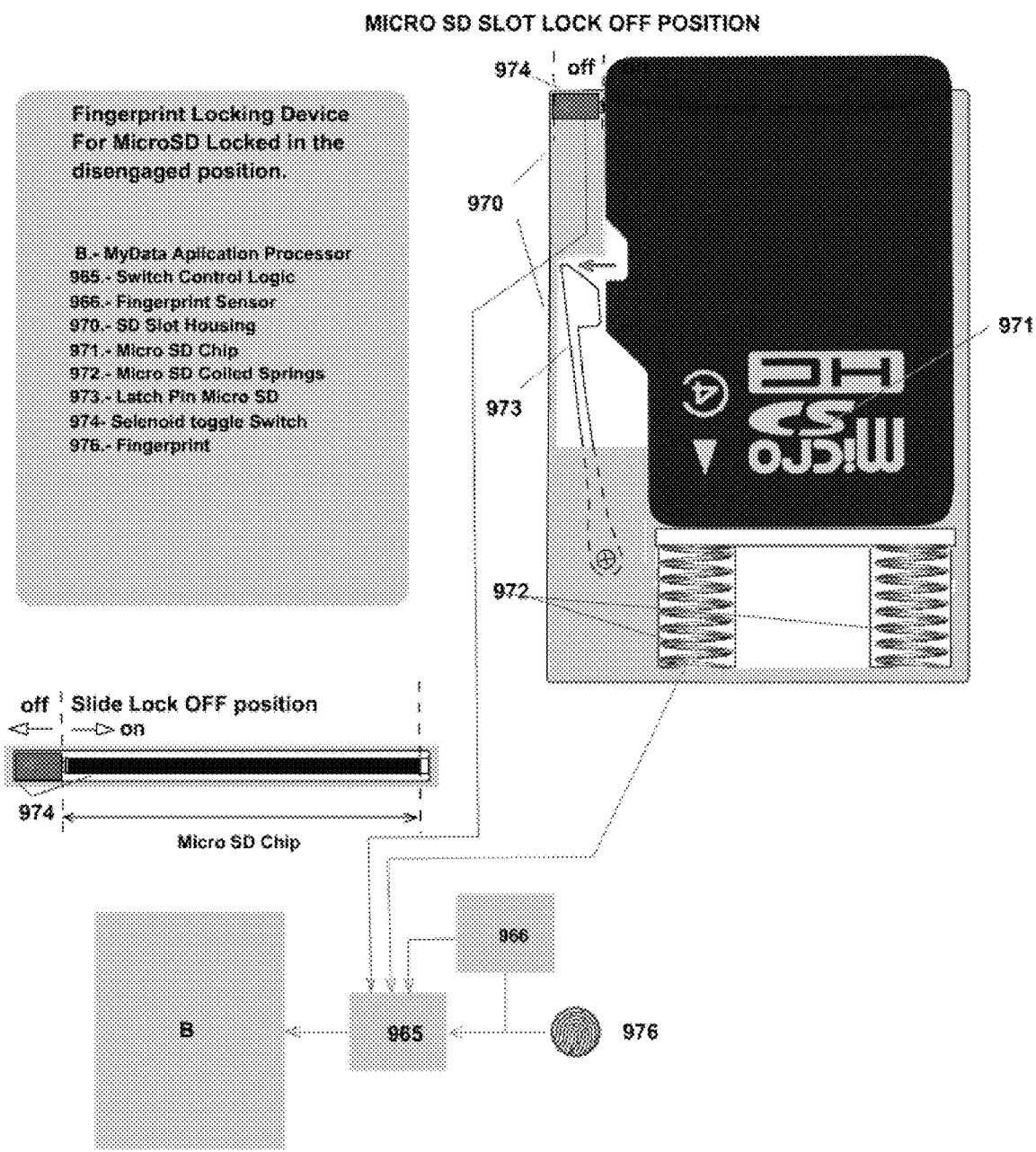
FIG. 45 is a schematic illustrating the micro SD slot lock in an unlocked state in a device in accordance with an embodiment of the invention.
Figure 46:
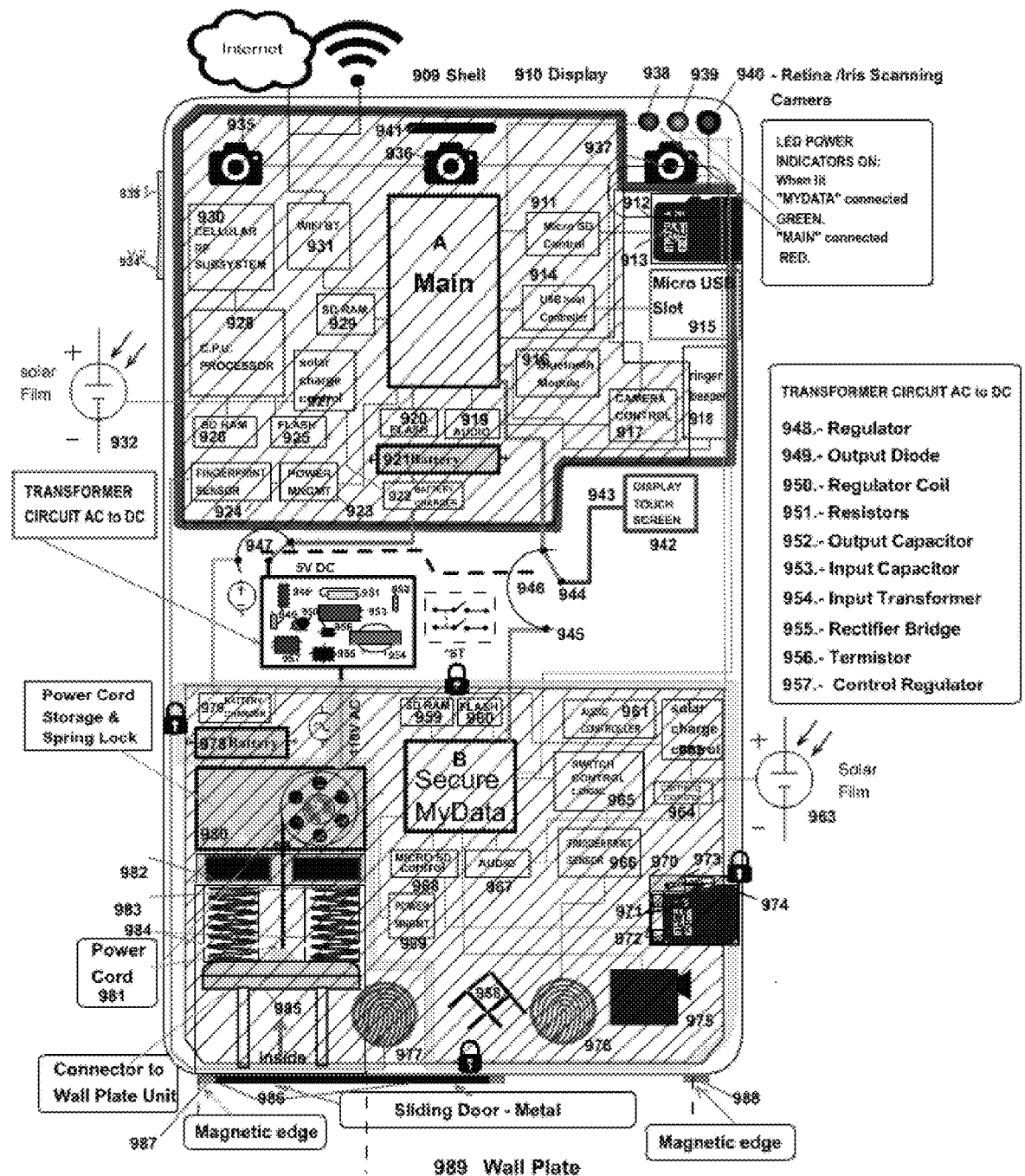
FIG. 46 is a schematic illustrating the components of a device with solar films, a main platform, and a secure platform in accordance with an embodiment of the invention.

As shown in FIGS. 44 and 45, the Micro SD Port 970 may prevent removal of the Micro SD Chip 971, which the user may use to store sensitive personal data. FIG. 44 shows the micro SD slot in a locked state. FIG. 45 shows the micro SD slot in an unlocked state. The Micro SD Port 970 may feature a latch pin 973 and toggle switch 974, which prevent the micro SD chip 971 from being removed. The toggle switch 974 may be controlled by the Switch Control Logic 965, which, for example, would allow the Micro SD Chip to be removed when the user provides a fingerprint matching a stored fingerprint. It will be appreciated that other biometric sensors and data could be similarly employed, for example, iris scans, retinal scans, facial scans, or DNA scans. It will also be appreciated that the latch pin 974 may be a magnetic door that could fully enclose the port opening. The Micro SD Port may also engage automatically if the Micro SD Chip is not removed after a limited period of time. The device may also feature Springs 972 to facilitate authorized removal of the Micro SD Chip or another chip, casing, or adapter.

In an embodiment, Fingerprint Sensor 966 verifies the fingerprint from Fingerprint Scanner 976 by comparing the scanned fingerprint to stored biometric data. Fingerprint Sensor 966 then provides access to the Secure MyData platform through various user interfaces by operation of Switch Control Logic 965. In other embodiments different or additional biometric data may be required to access some or all of the components of the Secure Platform. Examples of various biometric data include a fingerprint, handprint, facial scan, cranial scan, iris scan, retina scan, voice sample, or DNA information. The user may also require that a specific sequence or combination of biometric data be provided to access some or all portions of the Secure Platform. Certain biometric data may be required based on varying prompts provided by the device during an attempt to access the Secure Platform or other features of the device.

In an embodiment, the user would attempt to access the Secure Platform, and the device would display a code word or phrase. The user may respond to while holding the device at arm's length and sweeping the device in a semicircular motion so that one or more cameras or other sensors on the device can capture various angles of the user's facial features. Through this sequence, the device could capture one or more fingerprints from various surfaces, the user's arm length, a voice sample, and a three-dimensional rendering of a portion of the user's face. The device may also recognize whether the user's spoken response was correct given the prompt. The prompt may also indicate which hand the user should hold the device in when performing the sequence. For example, a left thumb print may be required to initially access the Secure Platform and commence the unlock procedures, but various prompts may indicate whether the user should hold the device in the user's left or right hand during the sequence. The prompt may also indicate that the user should switch hands or maintain the same hand that was used to begin the unlock sequence.

In some embodiments, the Switch Control Logic 965 may allow access to the Main Platform, the Secure MyData Platform, or various portions thereof depending on the level of access available to the member or user associated with the biometric profile. Toggle Switch 946 is a physical or logical switch that provides connectivity to Display Touch Screen 942, either to the Main Platform or to the Secure MyData Platform. Audio or other means of interface like cameras, keyboards, and other sensors maybe be similarly connected to either the Main Platform or the Secure MyData Platform. FIG. 52 illustrates the Secure Platform and its components, including external component associated with the Secure Platform. During operation of the Secure Platform, the user may command those associated components. The Main Platform may be separated from any shared components by a physical gap created by connectors or toggle switches during operation of the Secure Platform. The gap between the Main Platform and the components ensures that data housed in the Secure Platform is Fort Knox secure at all times.

Figure 50:
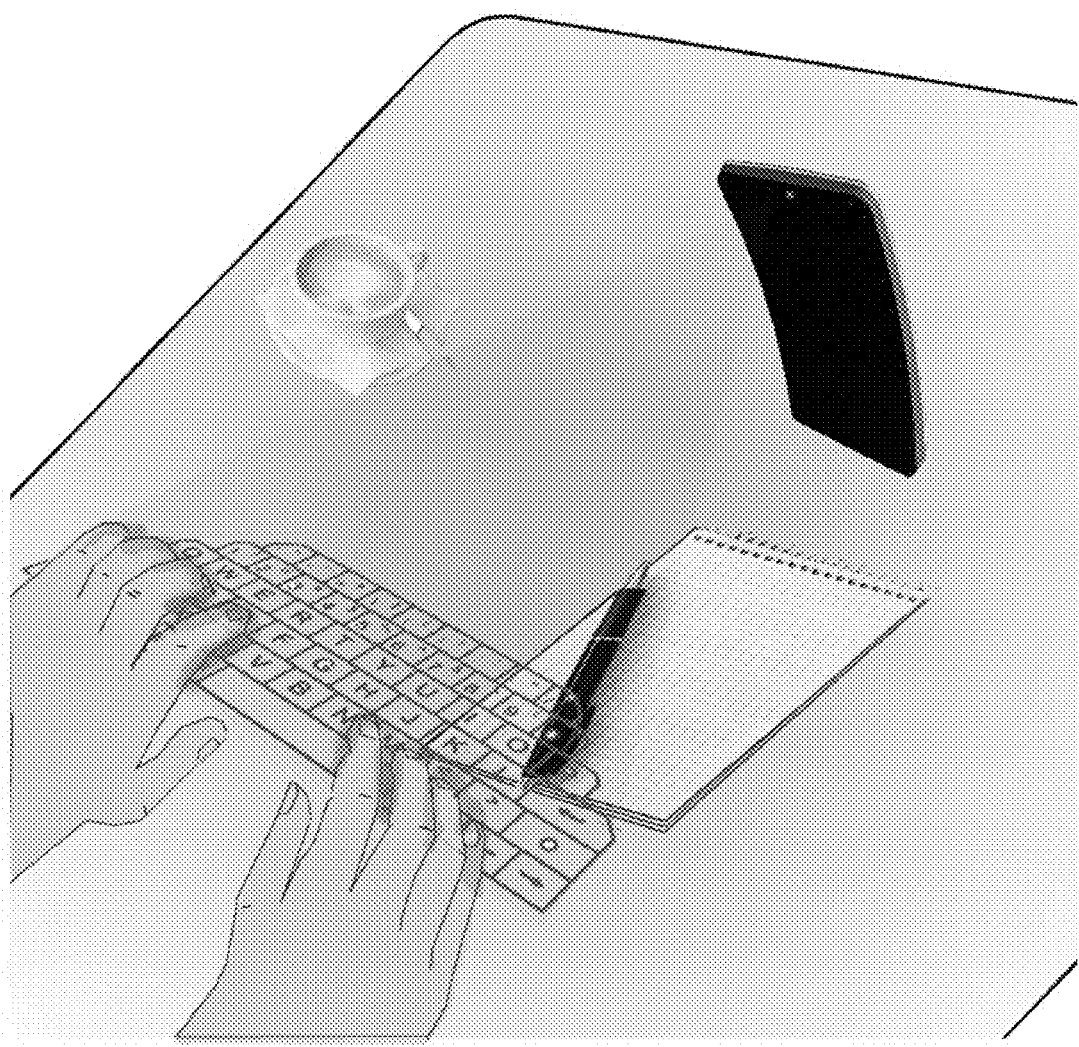
FIG. 50 illustrates the operation of an inboard projector displaying a virtual keyboard in accordance with an embodiment of the invention.
Figure 51:
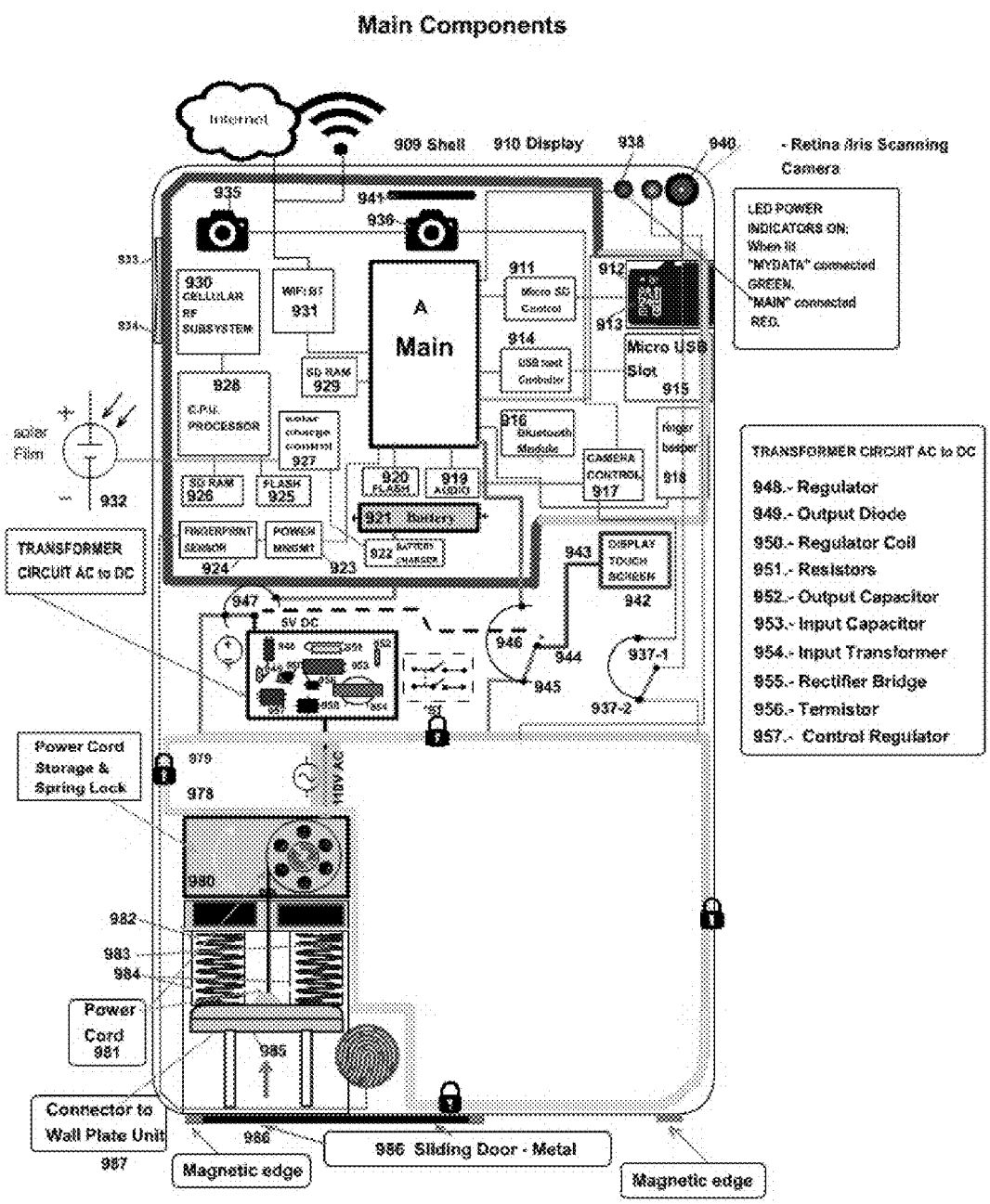
FIG. 51 illustrates the components of and accessible to the main platform in accordance with an embodiment of the invention.

In an embodiment, Display 910 is a high resolution display that may include or operate in conjunction with a transparent touch input layer and/or one or more solar film layers. Collectively or separately, the Display and audio components may provide a user interface. Other forms or methods of providing interactivity to the user are also understood, for example, keyboards, rollerballs, or touchpads. FIG. 50 shows how the device may utilize an inboard projector and one or more cameras, by infrared, visible, other spectra, or any combination therefore, to display and receive user input from a virtual keyboard or similar interface. It will be appreciated that the users movements and inputs may also be tracked by Lidar (light radar, light detection and ranging, or laser imaging, detection, and ranging).

Figure 41:
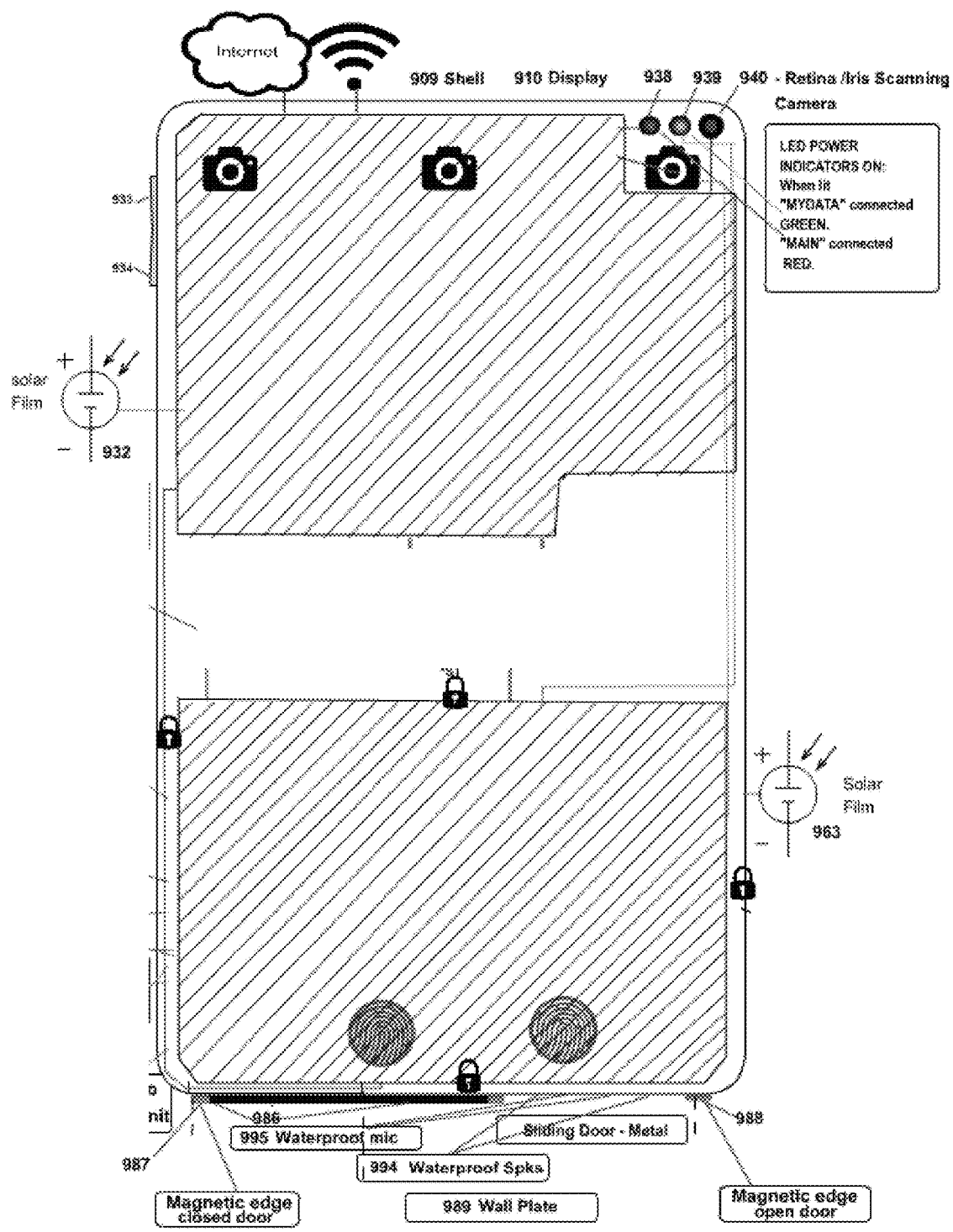
FIG. 41 is a front-view schematic illustrating the device and external components in accordance with an embodiment of the invention.

In an embodiment, Solar Films 932 and 963 is a thin, practically invisible photovoltaic film imbedded within a flexible polymer/metal substrate as part of or in connection with the Display 910 and producing electricity from incident natural or artificial light. The Solar Film may also be configured to produce electricity from other forms of electromagnetic radiation. Alternatively, Solar Film may be present on any surface of the device. FIG. 41 illustrates the external components including Solar Films 932 and 963 incorporated on top of portions of Display 910. It will be appreciated that the main platform and the secure platform may be operatively connected via switches describe above, for example, in paragraph 251, to a single or multiple Solar Films on one or more surfaces of the device.

Figure 42:
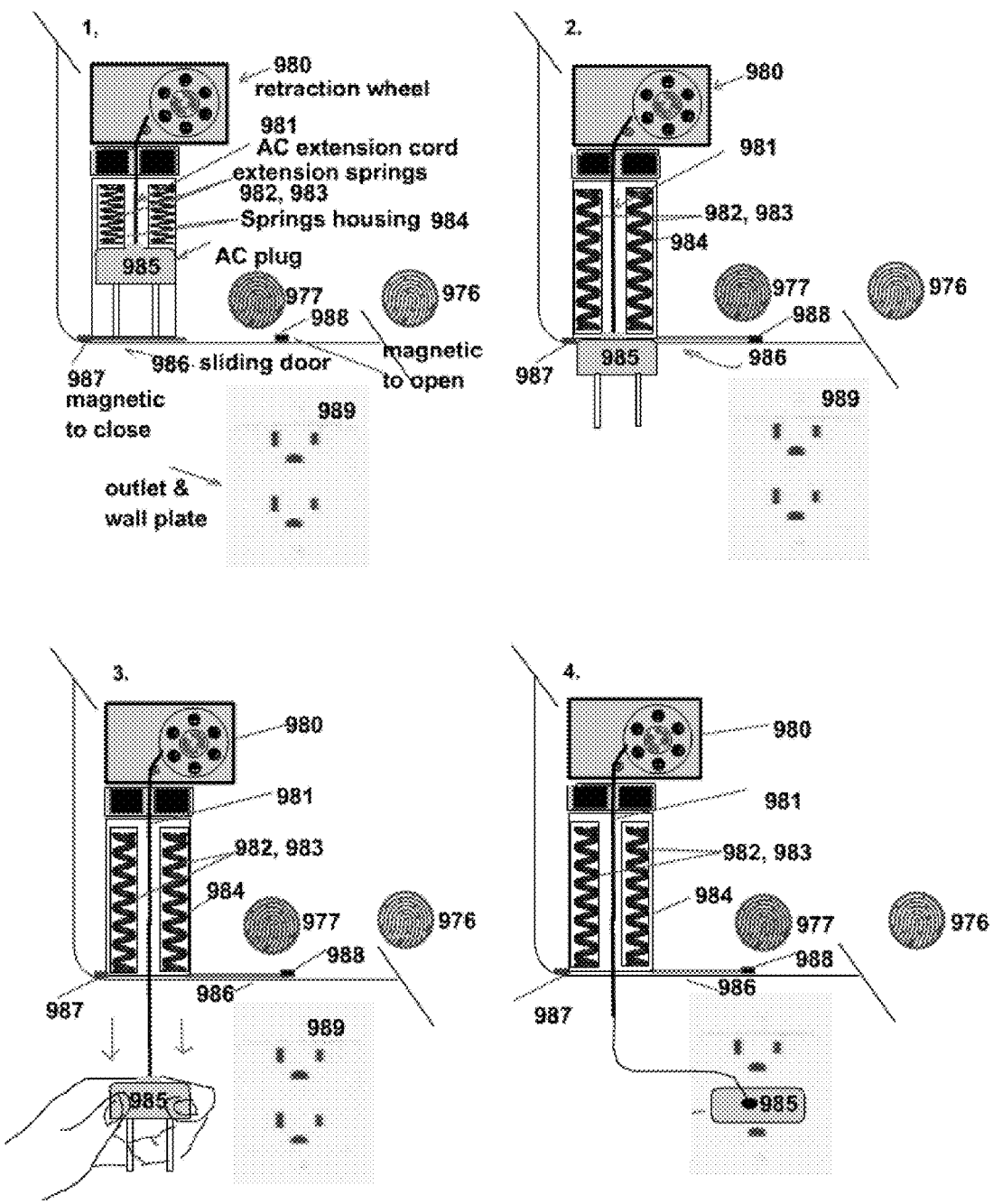
FIG. 42 illustrates the operation of the retractable power cord in accordance with an embodiment of the invention.
Figure 43:
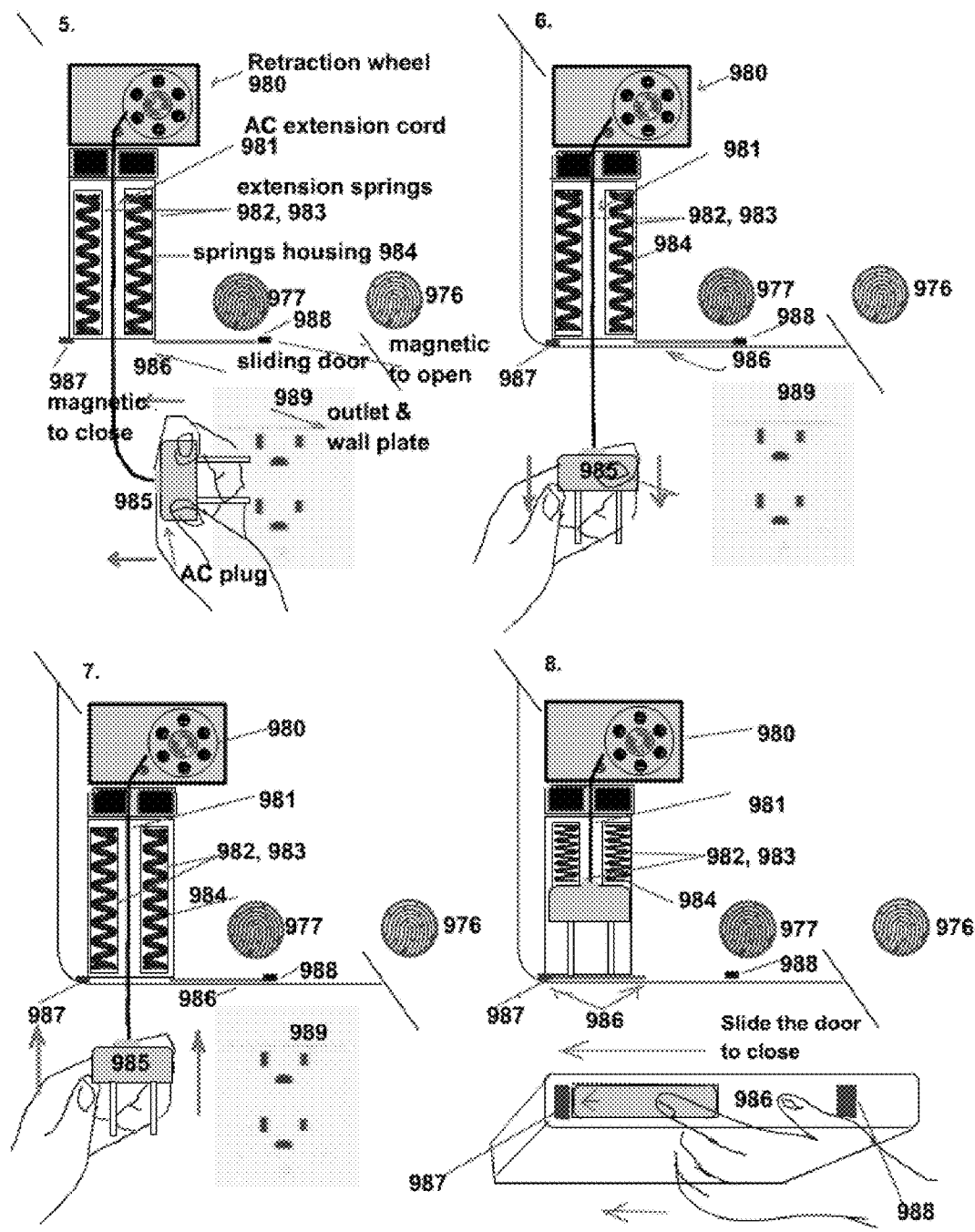
FIG. 43 further illustrates the operation of the retractable power cord in accordance with an embodiment of the invention.

In an embodiment, the device may be charged using an inboard retractable plug. An example of how an inboard retractable plug might operate is shown by FIGS. 37 and 38 and FIGS. 42 and 43. In FIG. 42, frame 1 in the top left shows the male plug retracted inside the phone with extension springs coiled. Frame 2 shows that when the magnetic sliding door 986 opens, the extension springs thrust the AC plug outside of the phone's housing while the sliding door is held open by a magnetic force 988. Frame 3 shows that the plug may then be extended by pulling it away from the phone housing to the desired length. Frame 4 shows the plug connected to a wall outlet. In FIG. 43, frame 5 show the user removing the plug from the wall. Frame 6 shows the plug being pulled slightly outward from the housing to release the brake on the retraction wheel mechanism 980. Frame 7 shows the plug being pulled back into the device housing. Frame 8 shows that once the plug is fully inside the device housing, the user can close the sliding door, which will be held closed by magnetic force 987. While many mobile devices currently use combination power and data connectors, such arrangements could provide a vulnerable access point to the Secure MyData Platform. Therefore, having inboard or designated charging components is a security feature of the current invention. Alternative wireless methods of delivering power, for example, induction, photoelectric, or thermoelectric components, could be used in conjunction with or in place of the retractable charging features.

In an embodiment, the Biometric Scanner Identifier 975 may be, for example, a camera for scanning a user's fingerprint, iris, facial, or skeletal features or any combination thereof to confirm the user's identity. The Biometric Scanner Identifier 975 may also receive a user's DNA information. It will be appreciated that any and all combinations of the disclosed biometric qualities could be used separately or in combination to identify the user.

Figure 40:
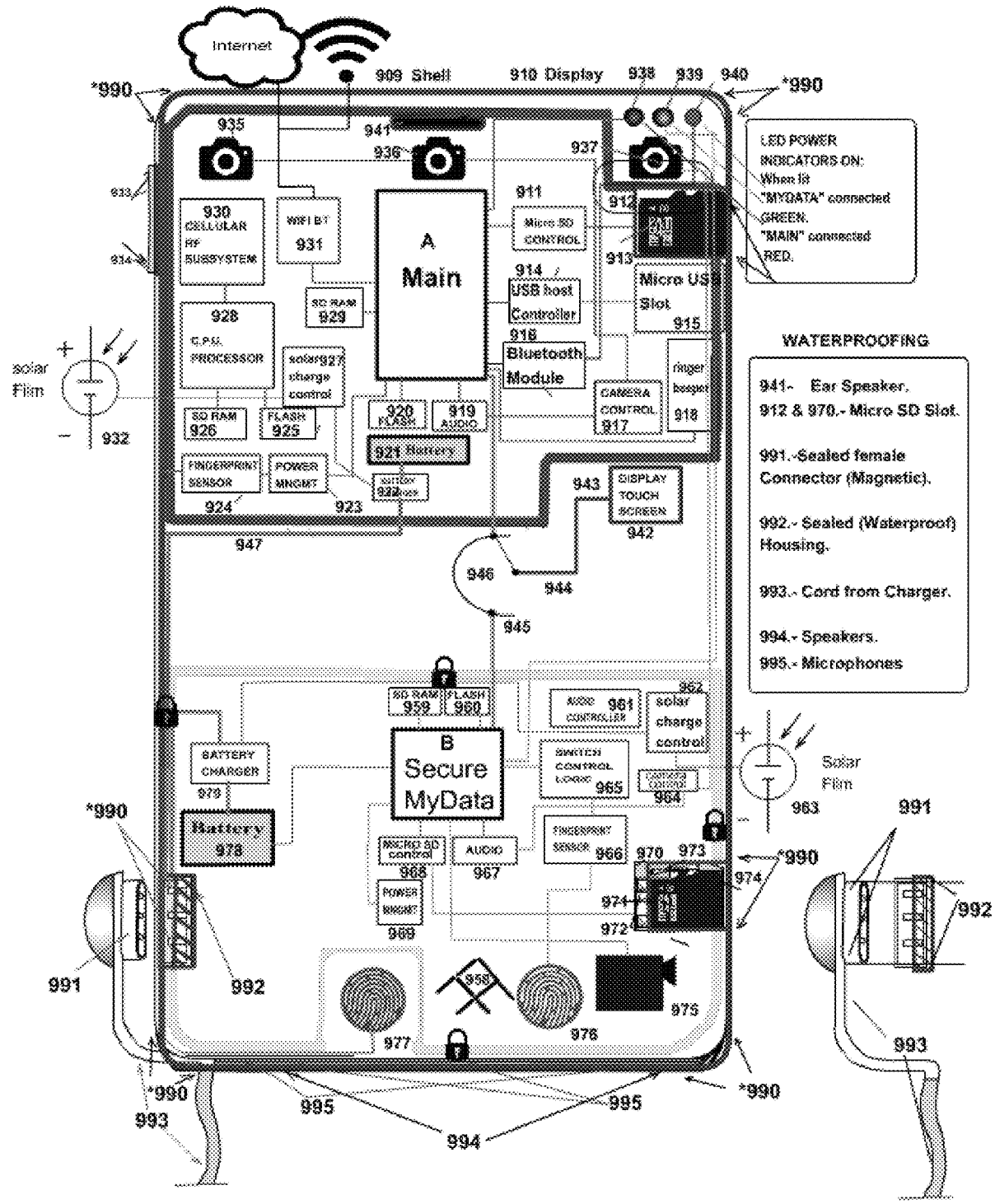
FIG. 40 is a schematic illustrating the components of a device with waterproof housing, an external charging cord, a main platform, and a secure platform in accordance with an embodiment of the invention.

In an embodiment, shown for example in FIG. 40, the device may include a Sealed Housing 990. The Sealed Housing may act as waterproofing. The Sealed Housing may include magnetic elements. For example, the Sealed Housing may include magnetic doors to prevent physical access by water or unauthorized users to various external ports, including, for example, micro SD cards, USB slots, or charging features. The device as shown in FIG. 40 may include an external charger 991 and Solar Film 932 and 963, but it will be appreciated that any plurality of charging methods disclosed in this application could be utilized.

Figure 47:
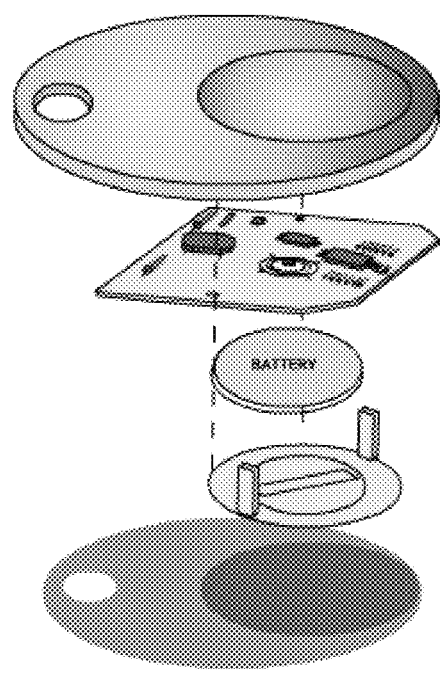
FIG. 47 illustrates a transceiver device in accordance with an embodiment of the invention.
Figure 48:
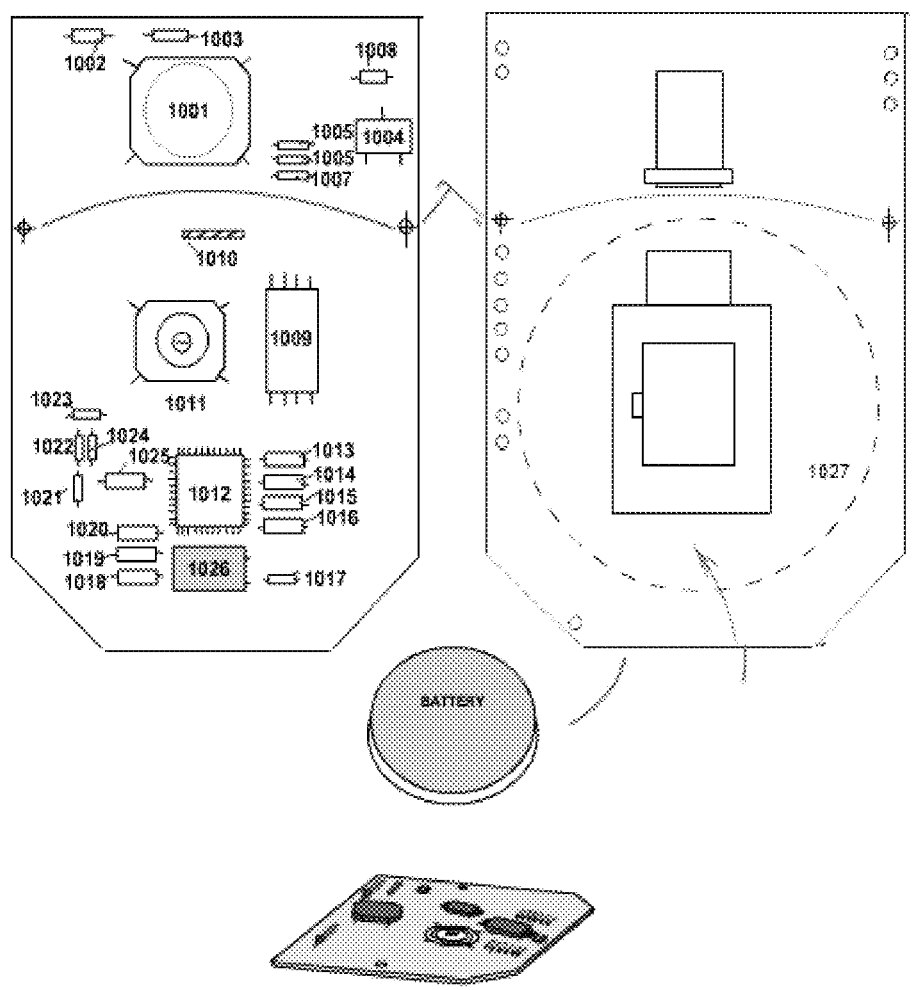
FIG. 48 illustrates the internal components of the transceiver device shown in FIG. 47.

FIGS. 47 and 48 show the transceiver device associated with the Ringer Beeper component 918 shown in FIGS. 37, 38, 40, 46, and 51. The transceiver device may be optionally attached to, carried or embedded in a personal or sensitive item to prevent the user from losing either the device or the other personal or sensitive item or both. For example, the user may attach the transceiver device to a set of car keys. If the user leaves the car keys somewhere and travels a certain programmable distance away, for example, thirty feet, then the transceiver device and/or the Ringer Beeper component shown in FIG. 37, for example, would emit a signal to notify the user that the car keys were not in the users possession. This signal could be a beeping noise or a signal to other components of the device to trigger an alert to the user. In an embodiment, the transceiver device and/or ringer beeper may emit a wireless signal to not only notify the user, but also aide in locating the device, whether through GPS or other means known in the art. As another example, if the user leaves the cell phone or communication device somewhere and has the transceiver device in a briefcase, then the transceiver device would signal by beeping and/or flashing, for example, and the frequency of the signaling could indicate proximity to the other device. Alternatively, transceiver may have a screen component that could show the direction of the other device. Additionally, other characteristics of the signal could change to indicate the distance and/or direction of the other device, for example, the pitch of an audio signal could change. The potential combination of signaling from both devices is an optional but noteworthy security feature of the device. While a user may lose her communication device, briefcase, keys, purse, glasses, or wallet separately, the user is unlikely to loss multiple or all personal or sensitive items at the same time. Therefore, by utilizing the Ringer Beeper feature of the invention and transceiver device in combination, the user protects her personal data and other possessions to a greater degree.

Referring again to FIG. 37, for example, it will be noted that two Fingerprint Scanners 976 and 977 are shown and respectively and separately associated with the Secure MyData Platform and the Main Platform. In an embodiment of the invention, any and all surfaces including Display 910 may act as fingerprint scanners. In this way, the user may optionally designate different fingerprints with different access. Alternatively, the user may designate different locations on the device for fingerprints to verify identity and gain access. For example, a single right pointer finger placed at the bottom middle of the Display 910 could unlock the Main Platform. Alternatively, the combination of the thumb, pointer, and middle finger fingerprints in different positions could unlock the Secure MyData Platform. Security is further enhanced by this feature because the user must not only provide biometric data but also provide the correct biometric data in the correct combination, orientation, and/or sequence. It will be appreciated that any and all varieties of biometric data and sensors disclosed could be used separately or in combination to provide access to the various features of the device. For example, removing the data storage component, shown, for example, as a Micro SD card in FIG. 37, from the Secure MyData Platform could be seen as a most sensitive operation in that the data storage component would no longer be protected by the Secure MyData Platform. Therefore, the user may require a plurality of combinations or sequences of different biometric readings to release the data storage component from the Secure MyData Platform.

The device allows various levels of access to personal information based on the needs of the user. This can allow to user, for example, to store and disclose personal information that might be relevant to air travel without also disclosing personal information that might be needed in other situations, for example, financial or medical records.

As explained above, embodiments of the system of the invention and various processes of embodiments are described herein. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing described herein. Such a set of instructions for performing a particular task may be characterized as a program, software program, or simply software.

The processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a micro-computer, mini-computer or mainframe for example, a programmed microprocessor, a micro-controller, a CPU (Central Processing Unit) a peripheral integrated circuit element, a CSIC (Consumer Specific Integrated Circuit) or ASIC (Application Specific Integrated Circuit) or other integrated circuit, a logic circuit, a digital signal processor, a programmable logic device such as a such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. Platform also refers to the cloud platform or silicon platform, including the MyData OS and all of its hardware systems, with the exception of the display, and its connectors, and switches, the biometric identifiers and gateways and audio/text communicators.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory or divisible, segmented, or plug-n-play memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two or more memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

Various networks may be implemented in accordance with embodiments of the invention, including a wired or wireless local area network (LAN) and a wide area network (WAN), the Internet, wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism.

Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa, Wi-Fi, 2G, 3G, Ultra-Wideband and Long Term Evolution (LTE) or other suitable protocols. The wireless communications protocol may also include short-range communications devices and protocols, such as RFID, or Near-Field Communication radio transmissions. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable format such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example. The module design allows for easy exchange of an encrypted module that on other platforms may have been breached.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database may use any desired arrangement of files such as a flat file arrangement or a relational database arrangement.

The memory will include at least one set of instructions that is either permanently or temporarily stored. The processor executes the instructions that are stored in order to process data. The set of instructions may include various instructions that perform a particular task or tasks. Such a set of instructions for performing a particular task may be characterized as a program, software program, software, engine, module, component, mechanism, or tool. The computer may include a plurality of software processing modules stored in a memory as described above and executed on a processor in the manner described herein. The program modules may be in the form of any suitable programming language, which is converted to machine language or object code to allow the processor or processors to read the instructions.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or nonremovable memory interface.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

In the system and method of the invention, a variety of "user interfaces" may be utilized to allow a user to interface with the processing machine or machines that are used to implement the invention. A user may enter commands and information into the computer through a user interface. The user interface may include any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the invention, it is not necessary that a human user actually interact with a user interface used by the processing machine of the invention. Rather, it is also contemplated that the user interface of the invention might interact, i.e., convey and receive information, with another processing machine, rather than a human user. Further, it is contemplated that a user interface utilized in the invention may interact partially with another processing machine or processing machines, while also interacting partially with a human user.

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Further, the embodiments of the invention described herein may be applied to a mobile or portable device. Mobile devices or portable devices can take various forms. In one approach, the mobile device may be a personal device that the customer owns, such as a personal smartphone or tablet, and brings into the physical store. As described in more detail below, mobile devices may include mobile personal computers, such as laptops, notebooks, netbooks, tablets (e.g., iPad, Samsung Galaxy Tab 10.7, Google Nexus 10, mini-iPad, Samsung Galaxy 7.7, Google Nexus 7, Amazon Kindle and Kindle Fire etc.), PDAs (personal digital assistants), smart phones (e.g., the iPhone, Samsung S3, Samsung S4, Samsung Note 2, etc.), and other forms of portable computer devices. Mobile devices that can support wireless communications such as NFC or RFID can communicate using those capabilities The mobile device may be programmed with a software application that enables the mobile device to communicate to the vendor. In an embodiment, the software application may be a mobile app developed by the vendor, and distributed to customers through an app store such as Apple iTunes, or Google Play. In other embodiments of the invention, the software application may be a third-party application, such as a mobile browser, connected to a web app hosted by the vendor. For example, the software application may be a mobile browser such as the Safari Mobile Browser, connected to a website. In other embodiments, the software application may also be specialized native software designed for use on mobile devices. In these embodiments, the software applications may be installed and maintained privately, without being distributed through a public third party app distributor, such as Apple iTunes, or Google Play.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, applications, components, data structures, etc., that perform particular tasks or implement particular abstract data types.

Those skilled in the art will appreciate that the invention may be practiced with various computer system configurations, including hand-held wireless devices such as mobile phones, tablets or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. A mobile communication device with secure data storage, comprising:
    a user interface including a display;
    a power storage unit;
    a biometric sensor that receives biometric information and is configured to verify a user's identity; and
    a housing that houses:
        a secure platform having a processor, a data storage unit, and no network connection;
        a main mobile platform having a processor, a data storage unit, and a wireless network connection;
        a switch; and
        a switch control that operates the switch to provide selective connectivity between either the display and the secure platform or the display and the main platform, but not both simultaneously, wherein the switch control operates the switch to provide connectivity between the secure platform and the display only if the biometric sensor receives the biometric information and the user's identity is verified.

2. The device of claim 1 further comprising:
    at least two biometric sensors, wherein each biometric sensors receives distinct biometric information.

3. The device of claim 1 wherein biometric information includes at least one type of information selected from the group consisting of fingerprint, handprint, facial scan, cranial scan, iris scan, retina scan, voice sample, and DNA information.

4. The device of claim 1 further comprising:
    a detachable ringing component that communicates with the main platform wirelessly, wherein the ringing component and the main mobile platform each emit a signal when separated by greater than a preset limited distance.

5. The device of claim 1 wherein the housing is sealed and prevents water from entering the device.

6. The device of claim 1 further comprising:
a retractable cord for charging the power storage unit.

7. The device of claim 1 further comprising:
a photovoltaic film that produces electricity from incident electromagnetic radiation.

8. The device of claim 1 further comprising:
an induction unit that produces electricity from an alternating electromagnetic field.

9. The device of claim 1 further comprising:
a data storage unit slot with connectivity to the secure platform for a removable data storage unit; and
a disc lock that secures the removable data storage unit in the data storage slot, wherein the disc lock is operated by the switch control.

10. The device of claim 1 further comprising:
a Faraday cage, wherein the Faraday cage surrounds the secure platform and at least partially obstructs electromagnetic radiation.

11. The device of claim 1, wherein the switch is a toggle switch.

12. The device of claim 11, wherein, when the toggle switch is positioned to provide connectivity between the display and the secure platform, the main platform is separated from any components of the secure platform by a physical gap so that there is never connectivity between the main platform and the secure platform.

13. The device of claim 1, wherein the main platform is configured to run a first operating system and the secure platform is configured to run a second operating system.

14. The device of claim 1, wherein the power storage unit includes a transformer that provides electrical connectivity to a charging mechanism, and the device includes a switch that is configured to be actuated to provide selective connectivity between either (i) the charging mechanism and the secure platform, or (ii) the charging mechanism and the main platform, but not both simultaneously.

15. A method of securely storing data on a mobile device, in which the mobile device comprises:
a user interface including a display;
a power storage unit;
a biometric sensor that receives biometric information and is configured to verify a user's identity; and
a housing that houses:
a secure platform having a processor, a data storage unit, and no network connection;
a main platform having a processor, a data storage unit, and a wireless network connection;
a switch; and
a switch control that operates the switch,
and wherein the method includes the steps of:
verifying the user's identity by using the biometric sensor to obtain a first piece of biometric information;
operating the switch to provide connectivity selectively between either the display and the secure platform or the display and the main platform, but not both simultaneously, wherein connectivity is provided to the secure platform only after the user's identity is verified.

16. The method of claim 15 further comprising:
verifying the user's identity by a second piece of biometric information that is distinct from the first piece of biometric information.

* * * * *